United States Patent
Ray et al.

(10) Patent No.: US 11,956,470 B2
(45) Date of Patent: Apr. 9, 2024

(54) PREDICTOR INDEX SIGNALING FOR PREDICTING TRANSFORM IN GEOMETRY-BASED POINT CLOUD COMPRESSION

(71) Applicant: QUALCOMM Incorporated, San Diego, CA (US)

(72) Inventors: Bappaditya Ray, San Diego, CA (US); Adarsh Krishnan Ramasubramonian, Irvine, CA (US); Louis Joseph Kerofsky, San Diego, CA (US); Geert Van der Auwera, Del Mar, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 209 days.

(21) Appl. No.: 17/223,780

(22) Filed: Apr. 6, 2021

(65) Prior Publication Data
US 2021/0314616 A1 Oct. 7, 2021

Related U.S. Application Data

(60) Provisional application No. 63/090,567, filed on Oct. 12, 2020, provisional application No. 63/087,774, (Continued)

(51) Int. Cl.
*H04N 19/61* (2014.01)
*H04N 13/161* (2018.01)
*H04N 19/44* (2014.01)

(52) U.S. Cl.
CPC ........... *H04N 19/61* (2014.11); *H04N 13/161* (2018.05); *H04N 19/44* (2014.11)

(58) Field of Classification Search
CPC ....... H04N 13/161; H04N 19/44; H04N 19/61
See application file for complete search history.

(56) References Cited

U.S. PATENT DOCUMENTS

2019/0311499 A1 10/2019 Mammou et al.
2021/0012535 A1* 1/2021 Yea ......................... H04N 19/96
(Continued)

FOREIGN PATENT DOCUMENTS

WO 2020123469 A1 6/2020

OTHER PUBLICATIONS

International Search Report and Written Opinion—PCT/US2021/026207—ISA/EPO—dated Aug. 16, 2021, 11 pages.
(Continued)

*Primary Examiner* — Jessica M Prince
(74) *Attorney, Agent, or Firm* — QUALCOMM Incorporated; Espartaco Diaz Hidalgo

(57) ABSTRACT

A method for decoding point cloud data comprises, based on a comparison of a maximum difference value and a threshold, applying an inverse function to a set of one or more jointly coded values to recover (i) residual values for attribute values of a current point of point cloud data and (ii) a predictor index that indicates a predictor in a predictor list, wherein predictors in the predictor list are based on attribute values of one or more neighbor points; determining predicted attribute values based on the predictor index; and reconstructing the attribute values of the current point based on the residual values and the predicted attribute values.

32 Claims, 18 Drawing Sheets

Related U.S. Application Data filed on Oct. 5, 2020, provisional application No. 63/043,596, filed on Jun. 24, 2020, provisional application No. 63/012,557, filed on Apr. 20, 2020, provisional application No. 63/010,519, filed on Apr. 15, 2020, provisional application No. 63/006,634, filed on Apr. 7, 2020.

(56) References Cited

U.S. PATENT DOCUMENTS

| | | | | |
|---|---|---|---|---|
| 2021/0104013 | A1* | 4/2021 | Hur | G06T 3/40 |
| 2021/0104090 | A1* | 4/2021 | Hur | H04N 13/15 |
| 2021/0407142 | A1* | 12/2021 | Hur | H04N 19/30 |
| 2022/0210471 | A1* | 6/2022 | Zhang | H04N 19/593 |
| 2023/0051652 | A1* | 2/2023 | Zhu | H04N 13/161 |
| 2023/0059625 | A1* | 2/2023 | Hur | G06T 9/40 |

OTHER PUBLICATIONS

ITU-T H.265: "Series H: Audiovisual and Multimedia Systems Infrastructure of Audiovisual Services—Coding of Moving Video High Efficiency Video Coding", The International Telecommunication Union, Jun. 2019, 696 Pages.

3DG: "Draft DoC for ISO/IEC CD 23090-9 Geometry-Based Point Cloud Compression", 128, MPEG Meeting, International Organisation for Standardisation Organisation Internationale De Normalisation ISO/IEC JTC 1/SC 29/WG11 Coding of Moving Pictures and Audio, ISO/IEC JTC 1/SC 29/WG 11 N18895, Geneva, CH—Oct. 2019, Nov. 5, 2019 (Nov. 5, 2019), XP030225592, 12 Pages, [Retrieved on Nov. 5, 2019].

3DG: "G-PCC Codec Description v6", Coding of Moving Pictures and Audio, ISO/IEC JTC1/SC29/WG11, N19091, Jan. 2020, Brussels, BE, Mar. 27, 2020, 92 pages.

"G-PCC Future Enhancements", 130, MPEG Meeting, Apr. 20, 2020-Apr. 24, 2020, Alpbach, (Motion Picture Expert Group or ISO/IEC JTC1/SC29/WG11), No. n19328, Jul. 21, 2020, XP030289574, 140 Pages.

Sugio T., et al., "[G-PCC] On Dependency Issue of Predicting Transform in TMC13", 127, MPEG Meeting, Jul. 8, 2019-Jul. 12, 2019, International Organisation for Standardisation Organisation Internationale De Normalisation ISO/IEC JTC1/SC29/WG11 Coding of Moving Pictures and Audio, ISO/IEC JTC1/SC29/WG11 MPEG2019/m49630, Jul. 2019, Gothenburg, SE, Jul. 4, 2019 (Jul. 4, 2019). XP030208027, 5 Pages, [Retrieved on Jul. 4, 2019].

"Text of ISO/IEC 23090-9 DIS Geometry-Based Point Cloud Compression", 129. MPEG Meeting, Jan. 13, 2020-Jan. 17, 2020, Brussels, (Motion Picture Expert Group or ISO/IEC JTC1/SC29/WG11), No. n19088, Apr. 20, 2020 (Apr. 20, 2020), XP030287970, 126 Pages, Retrieved from the Internet: URL:http://phenix.int-evry.fr/mpeg/doc_end_user/documents/129_Brussels/wg11/w19088.zip w19088_d10_clean.pdf [retrieved on—Apr. 20, 2020].

* cited by examiner

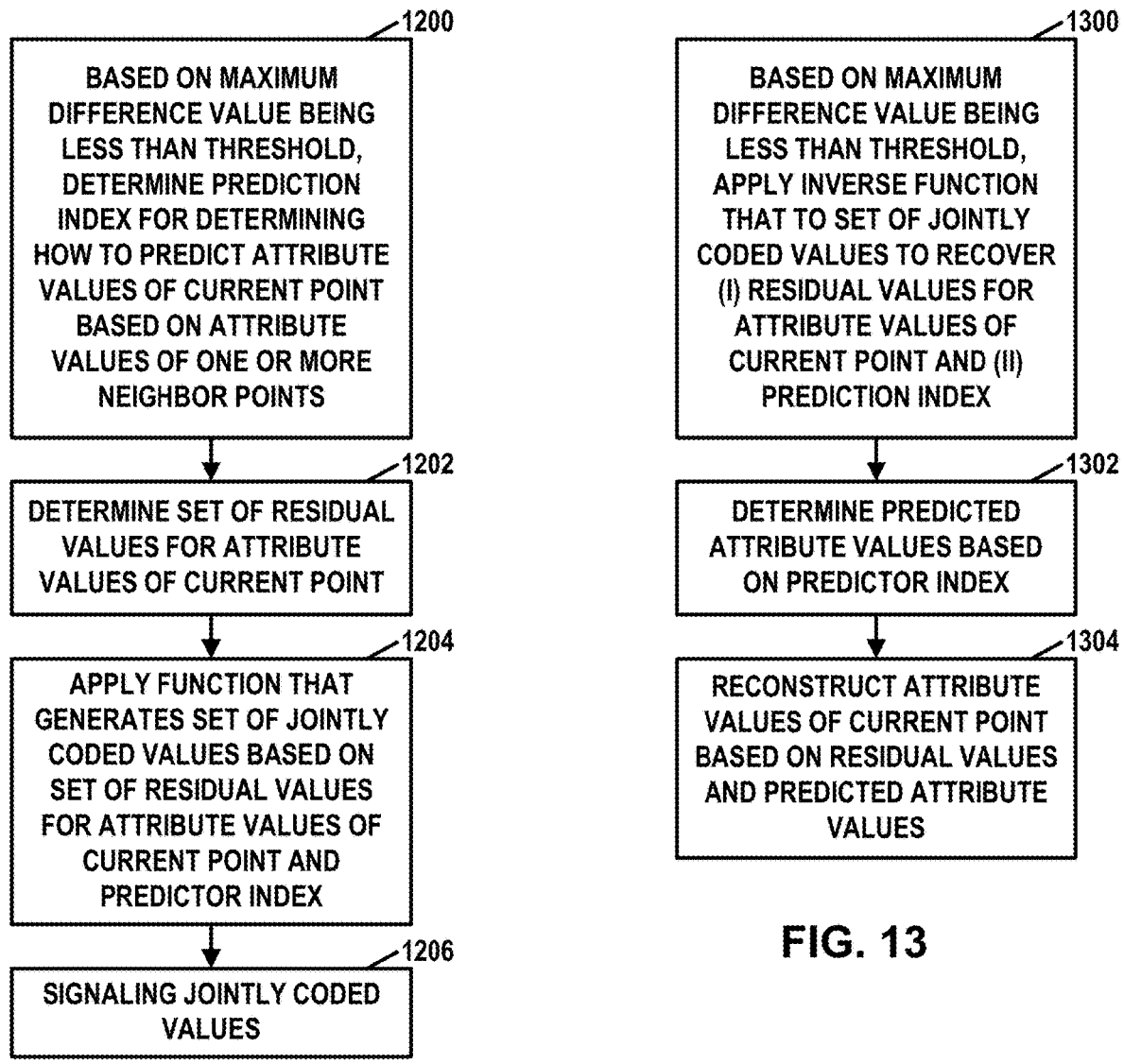

PREDICTOR INDEX SIGNALING FOR PREDICTING TRANSFORM IN GEOMETRY-BASED POINT CLOUD COMPRESSION

This application claims the benefit of U.S. Provisional Patent Application 63/006,634, filed Apr. 7, 2020, U.S. Provisional Patent Application 63/010,519, filed Apr. 15, 2020, U.S. Provisional Patent Application 63/012,557, filed Apr. 20, 2020, U.S. Provisional Patent Application 63/043,596, filed Jun. 24, 2020, U.S. Provisional Patent Application 63/087,774, filed Oct. 5, 2020, and U.S. Provisional Patent Application 63/090,567, filed Oct. 12, 2020, the entire content of each of which is incorporated by reference.

TECHNICAL FIELD

This disclosure relates to point cloud encoding and decoding.

BACKGROUND

A point cloud is a collection of points in a 3-dimensional space. The points may correspond to points on objects within the 3-dimensional space. Thus, a point cloud may be used to represent the physical content of the 3-dimensional space. Point clouds may have utility in a wide variety of situations. For example, point clouds may be used in the context of autonomous vehicles for representing the positions of objects on a roadway. In another example, point clouds may be used in the context of representing the physical content of an environment for purposes of positioning virtual objects in an augmented reality (AR) or mixed reality (MR) application. Point cloud compression is a process for encoding and decoding point clouds. Encoding point clouds may reduce the amount of data required for storage and transmission of point clouds.

SUMMARY

In general, this disclosure describes techniques for geometry-based point cloud compression (G-PCC), including techniques for signaling predictor indexes for predicting transforms in G-PCC. As described herein, the techniques of this disclosure may decouple signaling of a predictor index of a current point of a point cloud from reconstruction of attribute values of points in a neighborhood of the current point. This decoupling may reduce computational complexity in a parsing process that determines whether a bitstream includes a syntax element indicating the predictor index of the current point.

In one example, this disclosure describes a method for decoding point cloud data, the method comprising: based on a comparison of a maximum difference value and a threshold, applying an inverse function to a set of one or more jointly coded values to recover (i) residual values for attribute values of a current point of the point cloud data and (ii) a predictor index that indicates a predictor in a predictor list, wherein predictors in the predictor list are based on attribute values of one or more neighbor points; determining predicted attribute values based on the predictor index; and reconstructing the attribute values of the current point based on the residual values and the predicted attribute values.

In another example, this disclosure describes a method of encoding point cloud data, the method comprising: based on a maximum difference value being less than a threshold, determining a predictor index for a current point of the point cloud that indicates a predictor in a predictor list, wherein predictors in the predictor list are based on attribute values of one or more neighbor points; determining a set of residual values for the attribute values of the current point; applying a function that generates a set of one or more jointly coded values based on (i) the set of residual values for attribute values of the current point and (ii) the predictor index; and signaling the jointly coded values.

In another example, this disclosure describes a device for decoding a point cloud, the device comprising: a memory to store the data representing the point cloud; and one or more processors coupled to the memory and implemented in circuitry, the one or more processors configured to: based on a comparison of a maximum difference value and a threshold, apply an inverse function to a set of one or more jointly coded values to recover (i) residual values for attribute values of a current point and (ii) a predictor index that indicates a predictor in a predictor list, wherein predictors in the predictor list are based on attribute values of one or more neighbor points; determine predicted attribute values based on the predictor index; and reconstruct the attribute values of the current point based on the residual values and the predicted attribute values.

In another example, this disclosure describes a device for encoding a point cloud, the device comprising: a memory to store the data representing the point cloud; and one or more processors coupled to the memory and implemented in circuitry, the one or more processors configured to: based on a maximum difference value being less than a threshold, determine a predictor index for a current point of the point cloud that indicates a predictor in a predictor list, wherein predictors in the predictor list are based on attribute values of one or more neighbor points; determine a set of residual values for the attribute values of the current point; apply a function that generates a set of one or more jointly coded values based on (i) the set of residual values for attribute values of the current point and (ii) the predictor index; and signal the jointly coded values.

In another example, this disclosure describes a device for decoding a point cloud, the device comprising: a device for decoding a point cloud, the device comprising: means for applying, based on a comparison of a maximum difference value and a threshold, an inverse function to a set of one or more jointly coded values to recover (i) residual values for attribute values of a current point of point cloud data and (ii) a predictor index that indicates a predictor in a predictor list, wherein predictors in the predictor list are based on attribute values of one or more neighbor points; means for determining predicted attribute values based on the predictor index; and means for reconstructing the attribute values of the current point based on the residual values and the predicted attribute values.

In another example, this disclosure describes a device for encoding a point cloud, the device comprising: means for determining, based on a maximum difference value being less than a threshold, a predictor index for a current point of the point cloud that indicates a predictor in a predictor list, wherein predictors in the predictor list are based on attribute values of one or more neighbor points; means for determining a set of residual values for the attribute values of the current point; means for applying a function that generates a set of one or more jointly coded values based on (i) the set of residual values for attribute values of the current point and (ii) the predictor index; and means for signaling the jointly coded values.

In another example, this disclosure describes a computer-readable storage medium having stored thereon instructions that, when executed, cause one or more processors to: based on a comparison of a maximum difference value and a threshold, apply an inverse function to a set of one or more jointly coded values to recover (i) residual values for attribute values of a current point of point cloud data and (ii) a predictor index that indicates a predictor in a predictor list, wherein predictors in the predictor list are based on attribute values of one or more neighbor points; determine predicted attribute values based on the predictor index; and reconstruct the attribute values of the current point based on the residual values and the predicted attribute values.

In another example, this disclosure describes a computer-readable storage medium having stored thereon instructions that, when executed, cause one or more processors to: based on a maximum difference value being less than a threshold, determine a predictor index for a current point of the point cloud that indicates a predictor in a predictor list, wherein predictors in the predictor list are based on attribute values of one or more neighbor points; determine a set of residual values for the attribute values of the current point; apply a function that generates a set of one or more jointly coded values based on (i) the set of residual values for attribute values of the current point and (ii) the predictor index; and signal the jointly coded values.

The details of one or more examples are set forth in the accompanying drawings and the description below. Other features, objects, and advantages will be apparent from the description, drawings, and claims.

BRIEF DESCRIPTION OF THE DRAWINGS

FIG. 12 is a flowchart illustrating an example encoding process in accordance with one or more techniques of this disclosure.

FIG. 13 is a flowchart illustrating an example decoding process in accordance with one or more techniques of this disclosure.

DETAILED DESCRIPTION

A G-PCC encoder may signal a predictor index for a current point of a point cloud if a maximum variation of attribute values of points in a neighborhood of the current point is less than a predetermined threshold. A G-PCC decoder may use the predictor index for the current point to determine predicted attribute values for the current point. The G-PCC decoder may reconstruct the attribute values of the current point based on residual values for the current point and the predicted attribute values for the current point.

Conventionally, the G-PCC encoder signals the predictor index only if the maximum variation of the attribute values of points in the neighborhood of the current point is less than the threshold. Thus, it is necessary to fully reconstruct the attribute values of the points in the neighborhood of the current point in order for the G-PCC decoder to determine whether the bitstream includes a predictor index for the current point. In this way, the parsing of the predictor index of the current point and the reconstruction of the attribute values of the points in the neighborhood of the current point are coupled. This coupling may introduce computational complexity. In contrast, if the parsing of the predictor index of the current point and the reconstruction of the attribute values of the points in the neighborhood of the current point are decoupled, the G-PCC decoder may be able to parse the bitstream and later reconstruct the attribute values of points.

This disclosure describes techniques that may decouple the parsing of the predictor index of the current point from the reconstruction of the attribute values of the points in the neighborhood of the current point. Thus, the techniques of this disclosure may reduce the computational complexity. For instance, the predictor index and residual values for the current point may be jointly coded. The jointly coded values for the current point are signaled independently of the attribute values of the points in the neighborhood of the current point.

Figure 1:
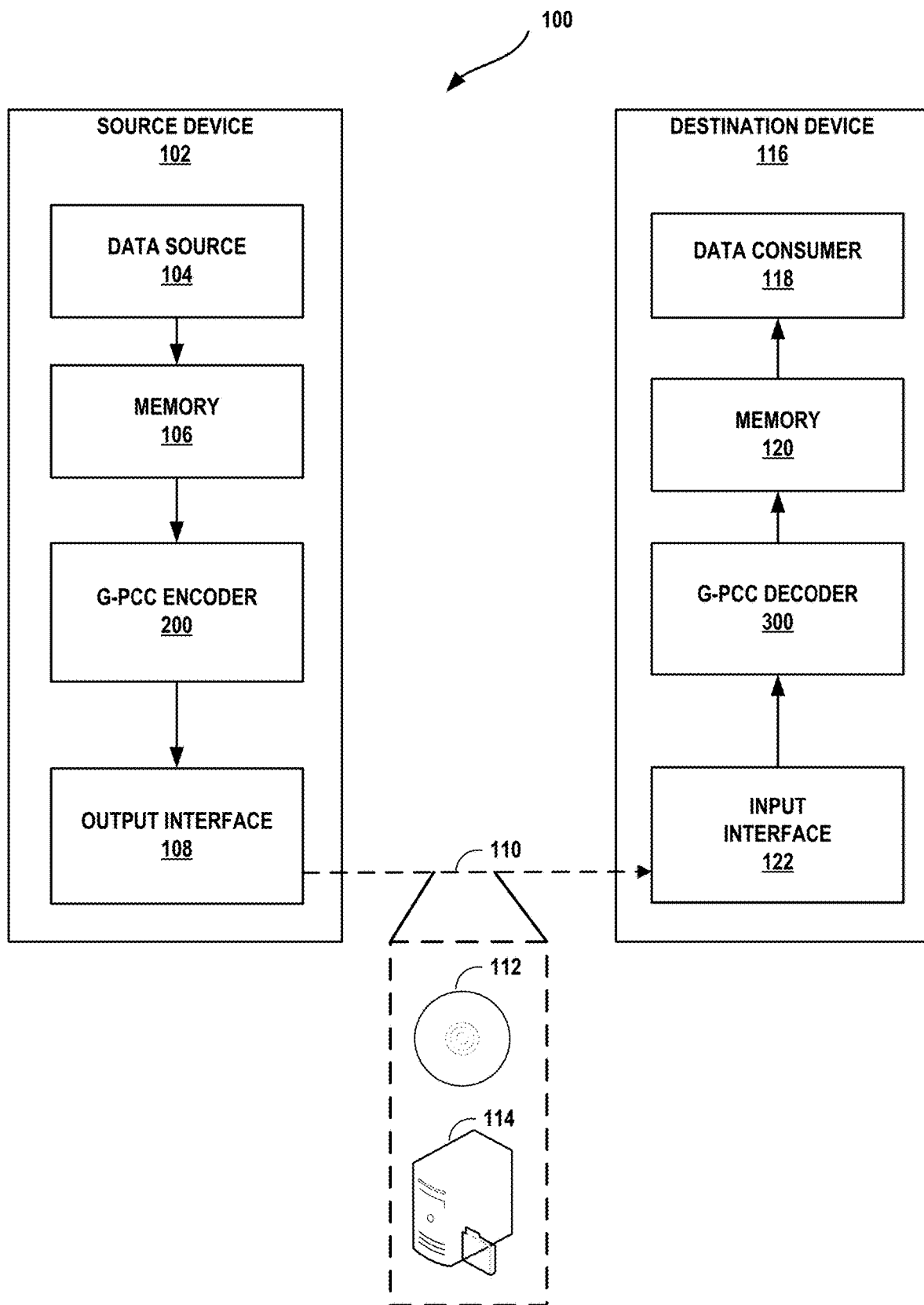
FIG. 1 is a block diagram illustrating an example encoding and decoding system that may perform the techniques of this disclosure.

FIG. 1 is a block diagram illustrating an example encoding and decoding system 100 that may perform the techniques of this disclosure. The techniques of this disclosure are generally directed to coding (encoding and/or decoding) point cloud data, i.e., to support point cloud compression. In general, point cloud data includes any data for processing a point cloud. The coding may be effective in compressing and/or decompressing point cloud data.

As shown in FIG. 1, system 100 includes a source device 102 and a destination device 116. Source device 102 provides encoded point cloud data to be decoded by a destination device 116. Particularly, in the example of FIG. 1, source device 102 provides the point cloud data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, LIDAR devices, satellites, or the like. In some cases, source device 102 and destination device 116 may be equipped for wireless communication.

In the example of FIG. 1, source device 102 includes a data source 104, a memory 106, a G-PCC encoder 200, and an output interface 108. Destination device 116 includes an input interface 122, a G-PCC decoder 300, a memory 120, and a data consumer 118. In accordance with this disclosure, G-PCC encoder 200 of source device 102 and G-PCC decoder 300 of destination device 116 may be configured to apply the techniques of this disclosure related to geometry-based point cloud compression. Thus, source device 102 represents an example of an encoding device, while destination device 116 represents an example of a decoding device. In other examples, source device 102 and destination device 116 may include other components or arrangements. For example, source device 102 may receive data (e.g., point cloud data) from an internal or external source. Likewise, destination device 116 may interface with an external data consumer, rather than include a data consumer in the same device.

System 100 as shown in FIG. 1 is merely one example. In general, other digital encoding and/or decoding devices may perform of the techniques of this disclosure related to geometry point cloud compression. Source device 102 and destination device 116 are merely examples of such devices in which source device 102 generates coded data for transmission to destination device 116. This disclosure refers to a "coding" device as a device that performs coding (encoding and/or decoding) of data. Thus, G-PCC encoder 200 and G-PCC decoder 300 represent examples of coding devices, in particular, an encoder and a decoder, respectively. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (i.e., raw, unencoded point cloud data) and may provide a sequential series of "frames") of the data to G-PCC encoder 200, which encodes data for the frames. Data source 104 of source device 102 may include a point cloud capture device, such as any of a variety of cameras or sensors, e.g., a 3D scanner or a light detection and ranging (LIDAR) device, one or more video cameras, an archive containing previously captured data, and/or a data feed interface to receive data from a data content provider. Alternatively or additionally, point cloud data may be computer-generated from scanner, camera, sensor or other data. For example, data source 104 may generate computer graphics-based data as the source data, or produce a combination of live data, archived data, and computer-generated data. Thus, in some examples, source device 102 may generate a point cloud. In each case, G-PCC encoder 200 encodes the captured, pre-captured, or computer-generated point cloud data. G-PCC encoder 200 may generate one or more bitstreams including encoded point cloud data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from G-PCC decoder 300. Additionally or alternatively, memory 106 and memory 120 may store software instructions executable by, e.g., G-PCC encoder 200 and G-PCC decoder 300, respectively. Although memory 106 and memory 120 are shown separately from G-PCC encoder 200 and G-PCC decoder 300 in this example, it should be understood that G-PCC encoder 200 and G-PCC decoder 300 may also include internal memories for functionally similar or equivalent purposes. Furthermore, memory 106 and memory 120 may store encoded data, e.g., output from G-PCC encoder 200 and input to G-PCC decoder 300. In some examples, portions of memory 106 and memory 120 may be allocated as one or more buffers, e.g., to store raw, decoded, and/or encoded data. For instance, memory 106 and memory 120 may store data representing a point cloud.

Computer-readable medium 110 may represent any type of medium or device capable of transporting the encoded data from source device 102 to destination device 116. In one example, computer-readable medium 110 represents a communication medium to enable source device 102 to transmit encoded data directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a website), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to G-PCC encoder 200 and/or output interface 108, and destination device 116 may include an SoC device to perform the functionality attributed to G-PCC decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

Input interface 122 of destination device 116 receives an encoded bitstream from computer-readable medium 110 (e.g., a communication medium, storage device 112, file server 114, or the like). The encoded bitstream may include signaling information defined by G-PCC encoder 200, which is also used by G-PCC decoder 300, such as syntax elements having values that describe characteristics and/or processing of coded units. Data consumer 118 uses the decoded data. For example, data consumer 118 may use the decoded data to determine the locations of physical objects. In some examples, data consumer 118 may comprise a display to present imagery based on a point cloud.

G-PCC encoder 200 and G-PCC decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of G-PCC encoder 200 and G-PCC decoder 300 may be included in one or more encoders or decoders, either of which may be integrated as part of a combined encoder/decoder (CODEC) in a respective device. A device including G-PCC encoder 200 and/or G-PCC decoder 300 may comprise one or more integrated circuits, microprocessors, and/or other types of devices.

G-PCC encoder 200 and G-PCC decoder 300 may operate according to a coding standard, such as video point cloud compression (V-PCC) standard or a geometry point cloud compression (G-PCC) standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, G-PCC encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

ISO/IEC MPEG (JTC 1/SC 29/WG 11) is studying the potential need for standardization of point cloud coding technology with a compression capability that significantly exceeds that of the current approaches and will target to create the standard. The group is working together on this exploration activity in a collaborative effort known as the 3-Dimensional Graphics Team (3DG) to evaluate compression technology designs proposed by their experts in this area.

Point cloud compression activities are categorized in two different approaches. The first approach is "Video point cloud compression" (V-PCC), which segments the 3D object, and project the segments in multiple 2D planes (which are represented as "patches" in the 2D frame), which are further coded by a legacy 2D video codec such as a High Efficiency Video Coding (HEVC) (ITU-T H.265) codec. The second approach is "Geometry-based point cloud compression" (G-PCC), which directly compresses 3D geometry i.e., position of a set of points in 3D space, and associated attribute values for each point associated with the 3D geometry. G-PCC addresses the compression of point clouds in both Category 1 (static point clouds) and Category 3 (dynamically acquired point clouds). A recent draft of the G-PCC standard is available in G-PCC DIS, ISO/IEC JTC1/SC29/WG11 w19088, Brussels, Belgium, January 2019, and a description of the codec is available in G-PCC Codec Description v6, ISO/IEC JTC1/SC29/WG11 w19091, Brussels, Belgium, January 2019.

A point cloud contains a set of points in a 3D space and may have attributes associated with the point. The attributes may be color information such as R, G, B or Y, Cb, Cr, or reflectance information, or other attributes. In this example, a set of R, G, B values for a point is referred to as an attribute of the point and each individual R, G, and B value is referred to as a "component" of the attribute. The number of components of an attribute is referred to as the "dimension" of the attribute. For instance, the attribute having R, G, and B components has a dimension of 3. In another example, an attribute of a point may have Y, Cb, and Cr components. In another example, an attribute of a point may have a reflectance component. A single point may have multiple attributes. For instance, a point may have a first attribute with R, G, and B components and a second attribute with a reflectance component. The components of an attribute are associated with a predefined order. For instance, in an attribute having R, G, and B components, the R component may be first, followed by the G component, followed by the B component.

Point clouds may be captured by a variety of cameras or sensors such as LIDAR sensors and 3D scanners and may also be computer-generated. Point cloud data are used in a variety of applications including, but not limited to, construction (modeling), graphics (3D models for visualizing and animation), and the automotive industry (LIDAR sensors used to help in navigation).

The 3D space occupied by a point cloud data may be enclosed by a virtual bounding box. The position of the points in the bounding box may be represented by a certain precision; therefore, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles. Each tile may be coded into one or more slices. The partitioning of the bounding box into slices and tiles may be based on number of points in each partition, or based on other considerations (e.g., a particular region may be coded as tiles). The slice regions may be further partitioned using splitting decisions similar to those in video codecs.

Figure 2:
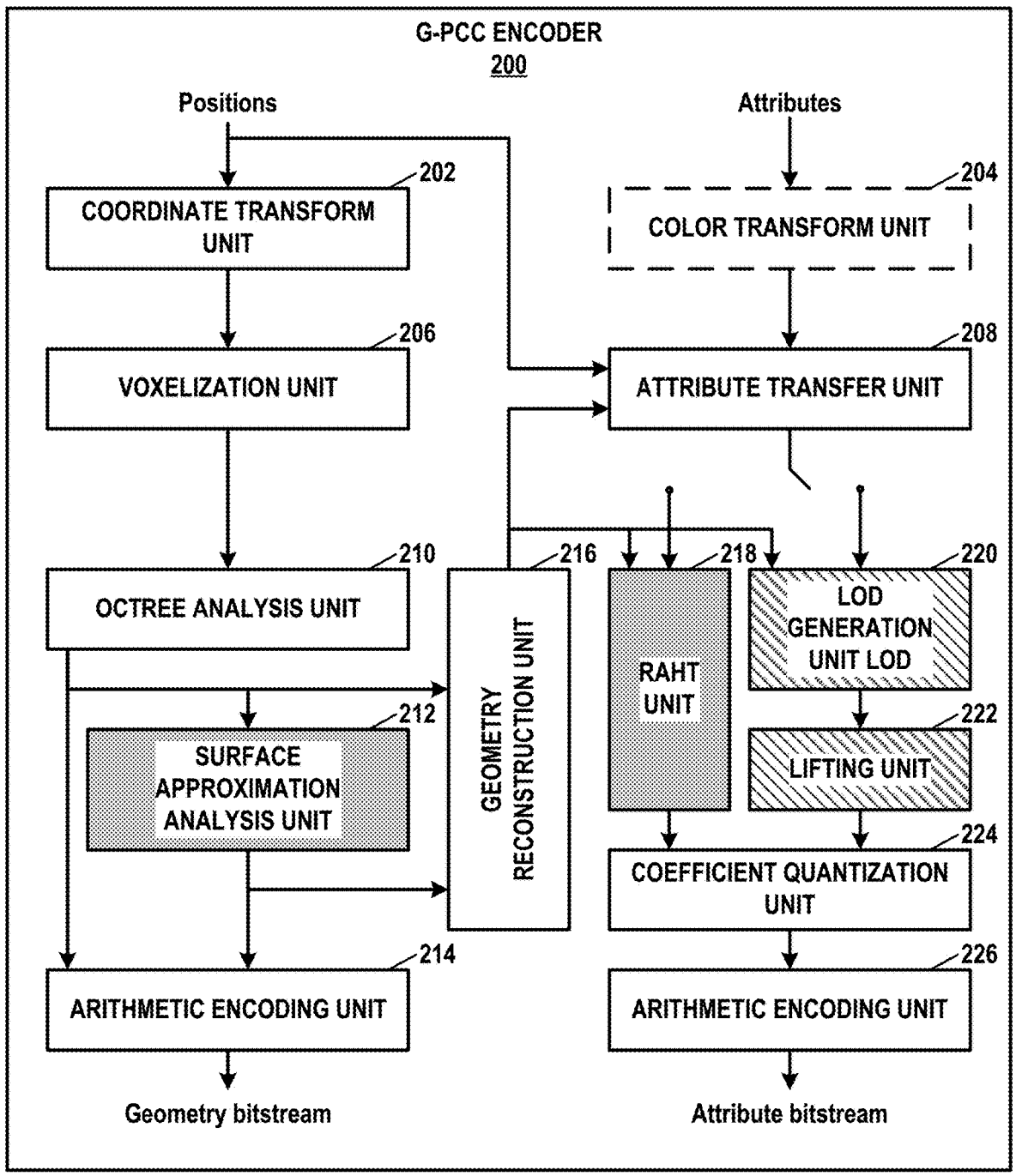
FIG. 2 is a block diagram illustrating an example overview of a Geometry Point Cloud Compression (G-PCC) encoder.
Figure 3:
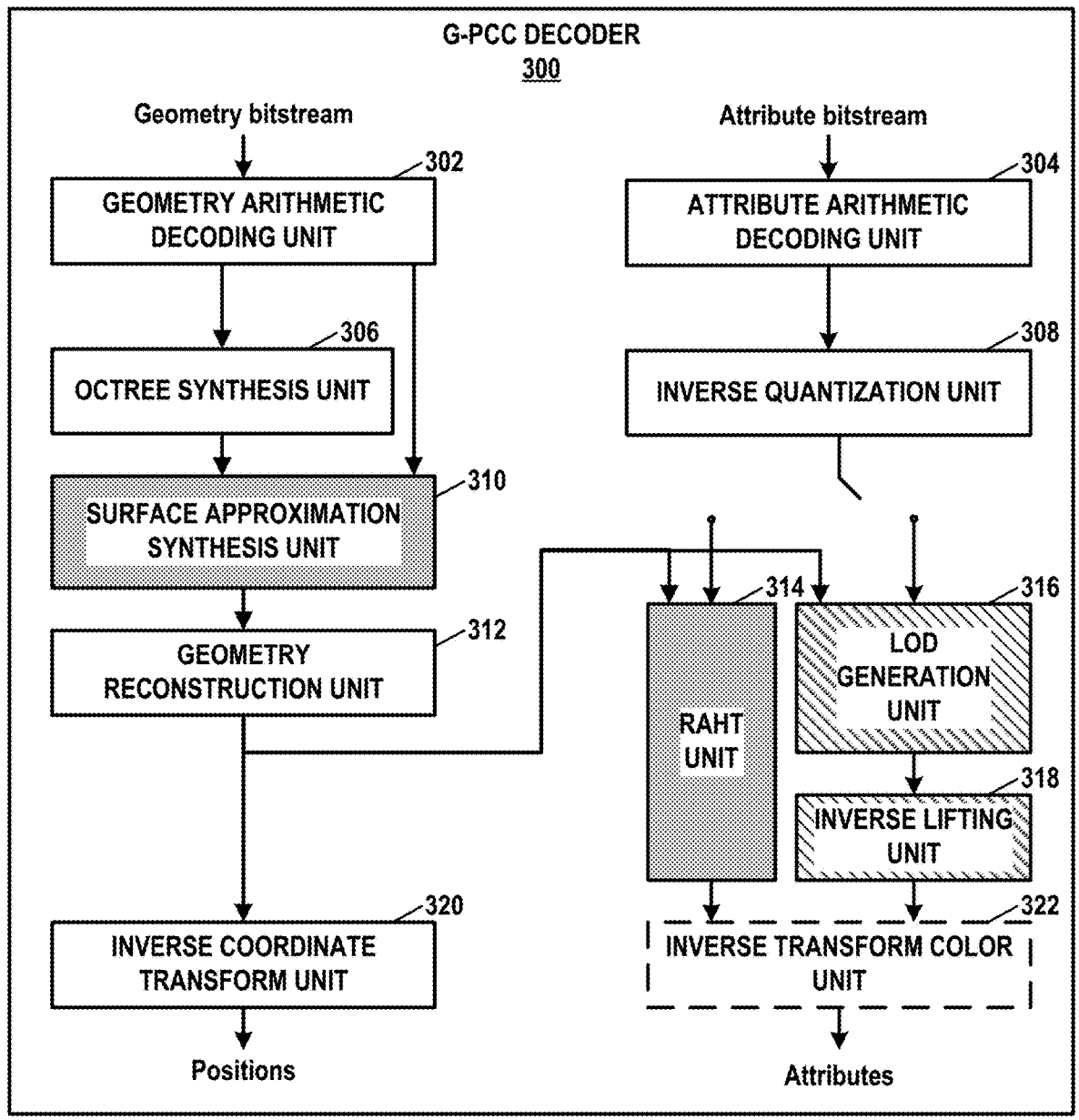
FIG. 3 is a block diagram illustrating an example overview of a G-PCC decoder.

FIG. 2 is a block diagram illustrating an example overview of G-PCC encoder 200. FIG. 3 is a block diagram illustrating an example overview of G-PCC decoder 300. The modules shown are logical, and do not necessarily correspond one-to-one to implemented code in the reference implementation of a G-PCC codec, i.e., TMC13 test model software studied by ISO/IEC MPEG (JTC 1/SC 29/WG 11).

In both G-PCC encoder 200 and G-PCC decoder 300, point cloud positions are coded first. Attribute coding depends on the decoded geometry. In FIG. 2 and FIG. 3, the gray-shaded modules are options typically used for Category 1 data. Diagonal-crosshatched modules are options typically used for Category 3 data. All the other modules are common between Categories 1 and 3.

For Category 3 data, the compressed geometry is typically represented as an octree from the root all the way down to a leaf level of individual voxels. For Category 1 data, the compressed geometry is typically represented by a pruned octree (i.e., an octree from the root down to a leaf level of blocks larger than voxels) plus a model that approximates the surface within each leaf of the pruned octree. In this way, both Category 1 and 3 data share the octree coding mechanism, while Category 1 data may in addition approximate the voxels within each leaf with a surface model (known as trisoup coding). The surface model used is a triangulation comprising 1-10 triangles per block, resulting in a triangle soup. The Category 1 geometry codec may therefore be known as the Trisoup geometry codec, while the Category 3 geometry codec is known as the Octree geometry codec.

At each node of an octree, an occupancy is signaled (when not inferred) for one or more of its child nodes (up to eight nodes). Multiple neighborhoods are specified including (a) nodes that share a face with a current octree node, (b) nodes that share a face, edge or a vertex with the current octree node, etc. Within each neighborhood, the occupancy of a node and/or its children may be used to predict the occupancy of the current node or its children. For points that are sparsely populated in certain nodes of the octree, the codec also supports a direct coding mode where the 3D position of the point is encoded directly. A flag may be signaled to indicate that a direct mode is signaled. At the lowest level, the number of points associated with the octree node/leaf node may also be coded.

Once the geometry is coded, the attributes corresponding to the geometry points are coded. When there are multiple attribute points corresponding to one reconstructed/decoded geometry point, an attribute value may be derived that is representative of the reconstructed point.

There are three attribute coding methods in G-PCC: Region Adaptive Hierarchical Transform (RAHT) coding, interpolation-based hierarchical nearest-neighbor prediction (Predicting Transform), and interpolation-based hierarchical nearest-neighbor prediction with an update/lifting step (Lifting Transform). RAHT and Lifting are typically used for Category 1 data, while Predicting is typically used for Category 3 data. However, either method may be used for any data, and, just like with the geometry codecs in G-PCC, the attribute coding method used to code the point cloud is specified in the bitstream.

The coding of the attributes may be conducted in a level-of-detail (LoD), where with each level of detail, a finer representation of the point cloud attribute may be obtained. Each level of detail may be specified based on distance metric from the neighboring nodes or based on a sampling distance.

At G-PCC encoder 200, the residuals obtained as the output of the coding methods for the attributes are quantized. The quantized residuals may be coded using context adaptive arithmetic coding.

In the example of FIG. 2, G-PCC encoder 200 may include a coordinate transform unit 202, a color transform unit 204, a voxelization unit 206, an attribute transfer unit 208, an octree analysis unit 210, a surface approximation analysis unit 212, an arithmetic encoding unit 214, a geometry reconstruction unit 216, an RAHT unit 218, a LoD generation unit 220, a lifting unit 222, a coefficient quantization unit 224, and an arithmetic encoding unit 226.

As shown in the example of FIG. 2, G-PCC encoder 200 may receive a set of positions and a set of attributes. The positions may include coordinates of points in a point cloud. The attributes may include information about points in the point cloud, such as colors associated with points in the point cloud.

Coordinate transform unit 202 may apply a transform to the coordinates of the points to transform the coordinates from an initial domain to a transform domain. This disclosure may refer to the transformed coordinates as transform coordinates. Color transform unit 204 may apply a transform to transform color information of the attributes to a different domain. For example, color transform unit 204 may transform color information from an RGB color space to a YCbCr color space.

Furthermore, in the example of FIG. 2, voxelization unit 206 may voxelize the transform coordinates. Voxelization of the transform coordinates may include quantization and removing some points of the point cloud. In other words, multiple points of the point cloud may be subsumed within a single "voxel," which may thereafter be treated in some respects as one point. Furthermore, octree analysis unit 210 may generate an octree based on the voxelized transform coordinates. Additionally, in the example of FIG. 2, surface approximation analysis unit 212 may analyze the points to potentially determine a surface representation of sets of the points. Arithmetic encoding unit 214 may entropy encode syntax elements representing the information of the octree and/or surfaces determined by surface approximation analysis unit 212. G-PCC encoder 200 may output these syntax elements in a geometry bitstream.

Geometry reconstruction unit 216 may reconstruct transform coordinates of points in the point cloud based on the octree, data indicating the surfaces determined by surface approximation analysis unit 212, and/or other information. The number of transform coordinates reconstructed by geometry reconstruction unit 216 may be different from the original number of points of the point cloud because of voxelization and surface approximation. This disclosure may refer to the resulting points as reconstructed points. Attribute transfer unit 208 may transfer attributes of the original points of the point cloud to reconstructed points of the point cloud.

Furthermore, RAHT unit 218 may apply RAHT coding to the attributes of the reconstructed points. Alternatively or additionally, LoD generation unit 220 and lifting unit 222 may apply LoD processing and lifting, respectively, to the attributes of the reconstructed points. RAHT unit 218 and lifting unit 222 may generate coefficients based on the attributes. Coefficient quantization unit 224 may quantize the coefficients generated by RAHT unit 218 or lifting unit 222. Arithmetic encoding unit 226 may apply arithmetic coding to syntax elements representing the quantized coefficients. G-PCC encoder 200 may output these syntax elements in an attribute bitstream.

In the example of FIG. 3, G-PCC decoder 300 may include a geometry arithmetic decoding unit 302, an attribute arithmetic decoding unit 304, an octree synthesis unit 306, an inverse quantization unit 308, a surface approximation synthesis unit 310, a geometry reconstruction unit 312, a RAHT unit 314, a LoD generation unit 316, an inverse lifting unit 318, an inverse transform coordinate unit 320, and an inverse transform color unit 322.

G-PCC decoder 300 may obtain a geometry bitstream and an attribute bitstream. Geometry arithmetic decoding unit 302 of decoder 300 may apply arithmetic decoding (e.g., Context-Adaptive Binary Arithmetic Coding (CABAC) or other type of arithmetic decoding) to syntax elements in the geometry bitstream. Similarly, attribute arithmetic decoding unit 304 may apply arithmetic decoding to syntax elements in the attribute bitstream.

Octree synthesis unit 306 may synthesize an octree based on syntax elements parsed from the geometry bitstream. In instances where surface approximation is used in the geometry bitstream, surface approximation synthesis unit 310 may determine a surface model based on syntax elements parsed from the geometry bitstream and based on the octree.

Furthermore, geometry reconstruction unit 312 may perform a reconstruction to determine coordinates of points in a point cloud. Inverse transform coordinate unit 320 may apply an inverse transform to the reconstructed coordinates to convert the reconstructed coordinates (positions) of the points in the point cloud from a transform domain back into an initial domain.

Additionally, in the example of FIG. 3, inverse quantization unit 308 may inverse quantize attribute values. The attribute values may be based on syntax elements obtained from the attribute bitstream (e.g., including syntax elements decoded by attribute arithmetic decoding unit 304).

Depending on how the attribute values are encoded, RAHT unit 314 may perform RAHT coding to determine, based on the inverse quantized attribute values, color values for points of the point cloud. Alternatively, LoD generation unit 316 and inverse lifting unit 318 may determine color values for points of the point cloud using a level of detail-based technique.

Furthermore, in the example of FIG. 3, inverse transform color unit 322 may apply an inverse color transform to the color values. The inverse color transform may be an inverse of a color transform applied by color transform unit 204 of encoder 200. For example, color transform unit 204 may transform color information from an RGB color space to a YCbCr color space. Accordingly, inverse color transform unit 322 may transform color information from the YCbCr color space to the RGB color space.

The various units of FIG. 2 and FIG. 3 are illustrated to assist with understanding the operations performed by encoder 200 and decoder 300. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Figure 4:
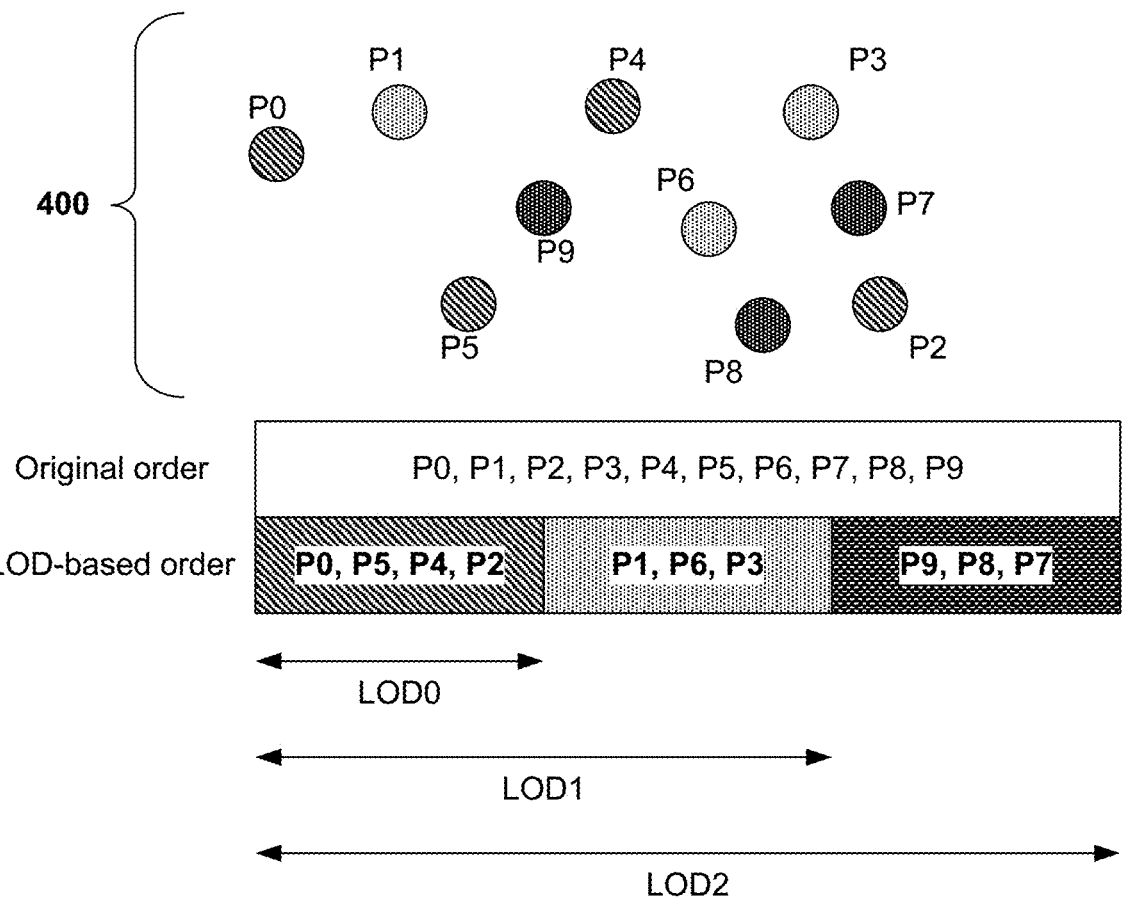
FIG. 4 is a conceptual diagram illustrating an example of applying prediction in a Level of Detail (LoD) order.

In the attribute coding aspects of Test Model under Consideration 13 (TMC13) of G-PCC, a LoD (Level of Detail) of each 3D point is generated based on distances of other points relative to the 3D point. The attribute values of the 3D points in each LoD may be encoded by applying prediction in an LoD-based order, e.g., as shown in the example of FIG. 4. For example, the attributes value of point P2 are predicted by calculating a distance-based weighted average value of points P0, P5 and P4 which were encoded or decoded prior to P2. The distance-based weighted average value may be referred to as a "default predictor."

In other words, FIG. 4 shows a set of points 400, labeled P0 through P9. G-PCC encoder 200 may group points 400 into two or more LoDs. G-PCC encoder 200 may signal information associated with points 400 such that G-PCC decoder 300 may decode the information associated with a point without reference to information associated with any point in a greater LoD than the point. In the example of FIG. 4, points P0, P5, P4, and P2 are in LoD0, points P1, P6, and P3 are in LoD1, and points P9, P8, and P7 are in LoD2. Thus, G-PCC decoder 300 may decode information associated with points P0, P5, P4, and P2 without reference to information associated with points P1, P6, P3, P9, P8, and P7. G-PCC decoder 300 may decode information associated with points P1, P6, and P3 without reference to information associated with points P9, P8, and P7, but potentially with reference to points P0, P5, P4, and P2. Similarly, G-PCC decoder 300 may need to use information associated with points P0, P5, P4, P2, P1, P6, and P3 to decode information associated with points P9, P8, and P7.

As an alternative to using a default predictor based on a distance-based weighted average of attribute values of points in a neighborhood of a current point as a predictor for attribute values of the current point, the G-PCC codec also allows for selection of a predictor from among multiple predictors when a variation of the attribute values of points in the neighborhood of the current point are greater than or equal to a pre-determined threshold.

Figure 5:
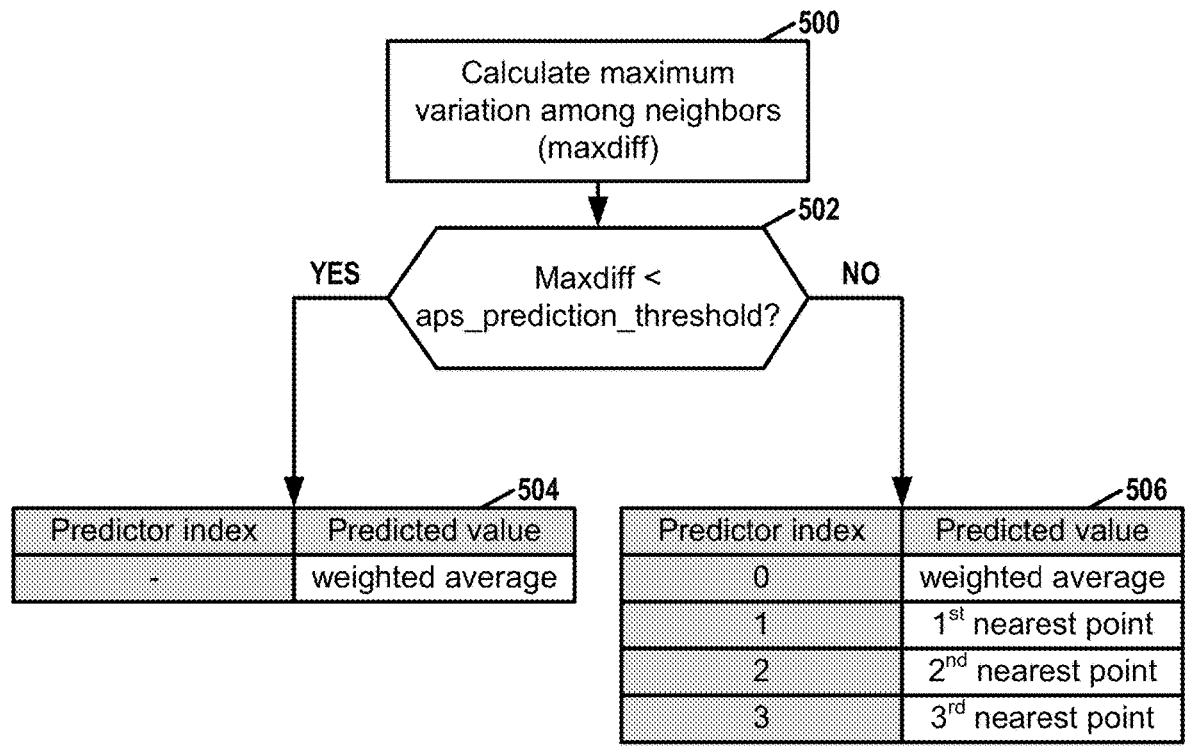
FIG. 5 is a flowchart illustrating an example process for determining an attribute predictor for a point of a point cloud.

For instance, FIG. 5 is a flowchart illustrating an example process for determining an attribute predictor for a point of a point cloud. As shown in the example of FIG. 5, a G-PCC coder (e.g., G-PCC encoder 200 or G-PCC decoder 300) may calculate a maximum variation among neighbors of a current point (i.e., points in a neighborhood of the current point) (500). For ease of explanation, this disclosure may refer to the maximum variation among neighbors of a current point as "maxdiff" or "MaxPredDiff." The G-PCC coder may determine maxdiff as a difference between a maximum attribute value of the neighboring points and a minimum attribute value of the neighboring points. Additionally, the G-PCC coder may determine whether maxdiff is less than the predetermined threshold (denoted aps_prediction_threshold) (502). In the case where maxdiff is less than the predetermined threshold ("YES" branch of 502), the G-PCC coder may use the default predictor (i.e., the distance-based weighted average of attribute values of neighbors of the current point) as a predictor for the attribute values of the current point (504). A predictor index is not signaled when maxdiff is less than the predetermined threshold. In other words, if the variation is less than the predetermined threshold, only the default predictor (weighted average) is used without signaling of the index of prediction candidate. Evaluating whether maxdiff is less than the predetermined threshold to determine whether a single (default) predictor or multiple predictors are available may reduce the overhead for signaling the predictor index (predIndex) significantly when compared with the scenario where all points use multiple predictors, i.e., when the predIndex[ ] is signaled for all points.

In the case where maxdiff is not less than the predetermined threshold (i.e., maxdiff is greater than or equal to the predetermined threshold) ("NO" branch of 502), the index of the selected prediction candidate (i.e., a predictor index) is signaled (506). The predictor index indicates whether the default predictor or attribute values of specific ones of the neighbors are used as a predictor for the attribute values of the current point. The neighbors are ordered in terms of distance in the LoD-based order and do not include neighbors in any higher LoD level than the current point.

For instance, with respect to the example of FIG. 4, when the attribute values of P2 are encoded by using multiple predictor candidates (i.e., when G-PCC encoder 200 encodes the attribute values of P2 using the weighted average of the attribute values of P0, P5, and P4), G-PCC encoder 200 sets a predictor index equal to 0. When G-PCC encoder 200 encodes the attribute values of P2 using the attribute values of the nearest neighbor point to P2 (i.e., P4), G-PCC encoder 200 sets the predictor index equal to 1. Similarly, when G-PCC encoder 200 encodes the attribute values of P2 using the attribute values of the next nearest neighbor points to P2 (i.e., P5 and P0), G-PCC encoder 200 sets the predictor index equal to 2 or 3, respectively (e.g., as shown in Table 1, below).

TABLE 1

| Predictor index | Predicted value |
| --- | --- |
| 0 | Weighted average |
| 1 | P4 ($1^{st}$ nearest point) |

TABLE 1-continued

| Predictor index | Predicted value |
| --- | --- |
| 2 | P5 ($2^{nd}$ nearest point) |
| 3 | P0 ($3^{rd}$ nearest point) |

A syntax structure related to this example is shown in Table 2, below, with emphasized portions shown with <!> ... </!> tags.

TABLE 2

| attribute_slice_data( ) { | Descriptor |
| --- | --- |
|   AttrDim = attribute_dimension_minus1[ ash_attr_sps_attr_idx ] + 1 | |
|   all_residual_values_equal_to_zero_run | ae(v) |
|   for( i = 0; i < PointCount; i++ ) { | |
|   <!>  if( attr_coding_type = = 0 && | |
|       MaxPredDiff[ i ] >= | |
| lifting_adaptive_prediction_threshold && | |
|       MaxNumPredictors > 1 ) {</!> | |
|   <!>    pred_index[ i ] </!> | <!>ae(v)</!> |
|   <!>  } </!> | |
|     if( all_residual_values_equal_to_zero_run > 0 ) { | |
|       for( k = 0; k < AttrDim; k++ ) | |
|         residual_values[ k ][ i ] = 0 | |
|       all_residual_values_equal_to_zero_run −= 1 | |
|     } | |
|     else { | |
|       attribute_coding( i ) | ae(v) |
|       all_residual_values_equal_to_zero_run | ae(v) |
|     } | |
|   } | |
|   byte_alignment( ) | |
| } | |

MaxPredDiff[ ] is calculated for each point in the point cloud. The corresponding derivation process of TMC13 is shown below.

For a single component attribute:
The variable MaxPredDiff[i] is calculated as follows . . . .

Let $N_i$ be the set of the k-nearest neighbours of the current point i and let $(\tilde{a}_j)_{j \in N_i}$ be their decoded/reconstructed attribute values. The number of nearest neighbours, k, shall be range of 1 to lifting_num_pred_nearest_neighbours. The decoded/reconstructed attribute values of neighbors are derived according to the Predictive Lifting decoding process (8.3.3).

```
For a single component attribute:
    min Value = max Value = ã₀
    for (j = 0; j < k; j++) {
        min Value = Min( minValue, ãⱼ )
        max Value = Max( max Value, ãⱼ )
    }
    MaxPredDiff[ i ] = max Value − min Value;
For a multiple component attribute:
    If attribute has N components, then
    min Value = max Value = ã₀[p]
        for(p=0; p<N; p++){
            for (j = 0; j < k; j++) {
                min Value = Min( min Value, ãⱼ[p] )
                max Value = Max( max Value, ãⱼ[p] )
            }
            MaxPredDiffComp[p] = max Value − min Value;
        }
    MaxPredDiff[i] = max argp(MaxPredDiffComp[p])
```

As shown in Table 2, the syntax element lifting_adaptive_prediction_threshold indicates a predetermined threshold. In Table 2, a syntax element (pred_index) indicating the predictor index for a current point is signaled only if MaxPredDiff[i] is greater than or equal to the predetermined threshold indicated by lifting_adaptive_prediction_threshold (among other conditions).

In TMC13, computation of MaxPredDiff[ ] requires attribute reconstruction of the previously decoded neighbor points. This also indicates that the parsing of predIndex[ ] is dependent on the attribute reconstruction. For this reason, it is not possible to decouple the parsing and the reconstruction processes for attribute coding. However, this may present a technical problem because making the parsing process independent of the reconstruction process may be beneficial for G-PCC decoder 300 because G-PCC decoder 300 may parse the whole bitstream in the first step, whereas the second step involves only the reconstruction process. For each point, the variation of the neighborhood attribute values is required to be computed in order to derive the predIndex, and the computational complexity of this computation is non-trivial.

As a second example technical problem associated with the process of TMC13 for determining whether the predictor index is signaled, maxPredDiff[ ] calculation does not consider the case when a primary component of an attribute has a different bitdepth than the secondary components of the same attribute.

As a third example technical problem associated with the process of TMC13 for determining whether the predictor index is signaled, the lifting_adaptive_prediction_threshold syntax element is always signaled, although the lifting_adaptive_prediction_threshold syntax element may not be used in some cases. For example, if the maximum number of predictors that can be used is equal to 0, there may be no need to signal the lifting_adaptive_prediction_threshold syntax element.

In this disclosure, three different approaches are described that remove the attribute reconstruction dependency for the parsing of predIndex, which automatically allows decoupling of the parsing and reconstruction processes for attribute coding. This disclosure also describes techniques that handle maxPredDiff computations for bitdepth difference in primary and secondary components. This disclosure also describes techniques for signaling of the lifting_adaptive_prediction_threshold syntax element. Examples of the various techniques of this disclosure may be used individually or in any combination.

In accordance with a first approach for removing the attribute reconstruction dependency for the parsing of predIndex, predIndex parsing is dependent on attribute residual values. The underlying assumption of the first approach is that when the local variation in the neighborhood of the current point is greater (in which case multiple predictor candidates may be beneficial), the resulting residual is likely to be high. Conversely, when local variation is low (in which case a single default predictor may be sufficient), the resulting residual is likely to be low. Following this assumption, a G-PCC coder (e.g., G-PCC encoder 200 or G-PCC decoder 300) may determine between a single predictor or multiple predictors based on the quantized attribute residual values of the neighbors. As this decision is solely based on residual values, which is among already parsed information, the parsing of the attributes is not dependent on the reconstruction process.

Figure 6:
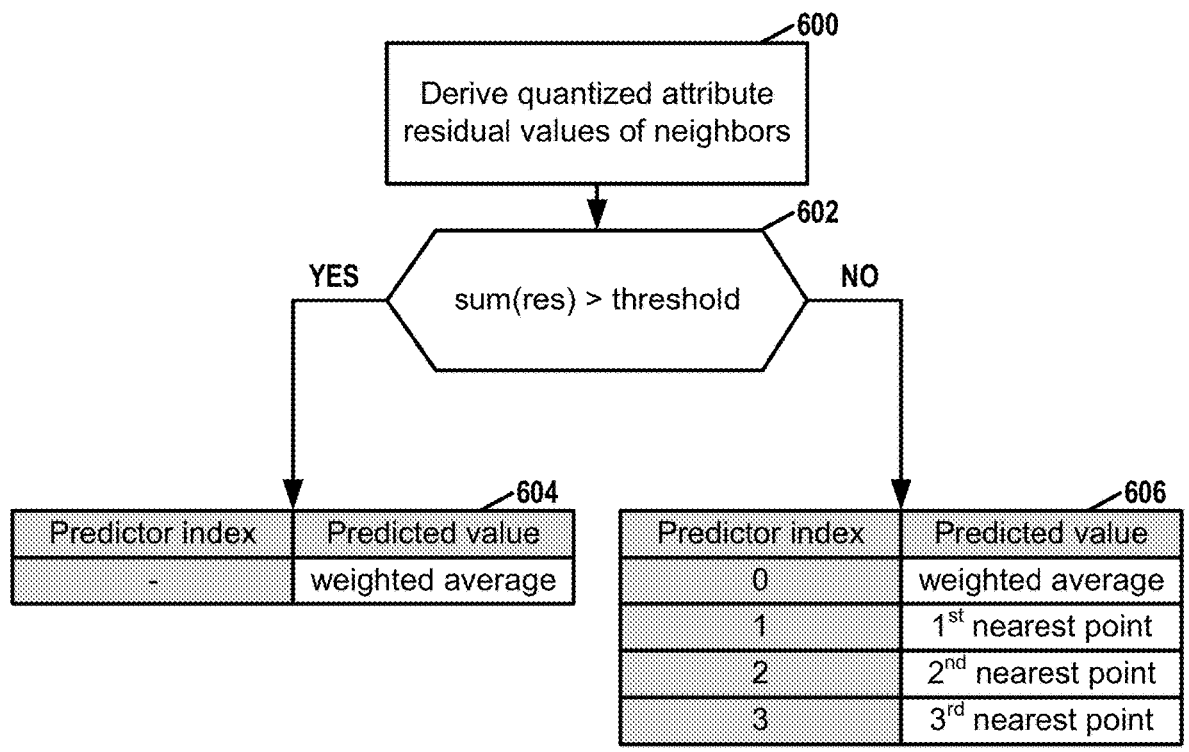
FIG. 6 is a flowchart illustrating an example process for determining an attribute predicted value for a point of a point cloud, in accordance with one or more techniques of this disclosure.

An example of such a process is shown in FIG. 6. Specifically, FIG. 6 is a flowchart illustrating an example process for determining an attribute predicted value for a point of a point cloud, in accordance with one or more techniques of this disclosure. In the example of FIG. 6, a G-PCC coder (e.g., G-PCC encoder 200 or G-PCC decoder 300) may derive quantized attribute residual values of neighbors of a current point of the point cloud (600). In the example of FIG. 6, if a sum of the quantized attribute residual values of the neighbors of the current picture is greater than a threshold ("YES" branch of 602), the predictor index is not signaled and the G-PCC coder may use the default predictor (i.e., a weighted average of the reconstructed attribute values of the neighbors) as a predictor for the attribute values of the current point (604). On the other hand, if the sum of the quantized attribute residual values of the neighbors of the current point is less than or equal to the threshold ("NO" branch of 602), the predictor index is signaled and the G-PCC coder may use a predictor indicated by the predictor index as a predictor for the attribute values of the current point (606).

Thus, in some examples, G-PCC encoder 200 may determine, based on quantized attribute residual values for points in a point cloud, whether to (i) determine that a predicted attribute value of a current point of the point cloud (i.e., a predictor for the attribute values of the current point of the point cloud) is a weighted average of a set of neighbor points or (ii) signal a value in a bitstream that indicates an index of the predicted attribute value of the current point. Additionally, G-PCC encoder 200 may determine an attribute residual value for the current point based on the predicted attribute value of the current point.

Similarly, in some examples, G-PCC decoder 300 may determine, based on quantized attribute residual values for points in a point cloud, whether to (i) determine that a predicted attribute value of a current point of the point cloud is a weighted average of a set of neighbor points or (ii) determine the predicted attribute value of the current point based on a value signaled in a bitstream. In this example, G-PCC decoder 300 may reconstruct an attribute value of the current point based on the predicted attribute value of the current point.

In examples where the attribute values of the current point are color attributes, the signaled residual values for the three color components may be denoted as res0, res1, and res2, respectively. The G-PCC coder may parse predIndex from the bitstream if |res0|+|res1|+|res2|>=Thres0. Otherwise, the G-PCC coder may use the default weighted predictor. Thres0 can be signaled in a sequence parameter set (SPS) for sequence level control, an attribute parameter set (APS) for frame level control or region level control. In some examples, the G-PCC coder derives Thres0 from an attribute quantization step size. In some examples, Thres0 is set to a predetermined value.

The G-PCC algorithm of TMC 13 signals quantized residual attribute values in se(v) (i.e., signed exponential Golomb code). The signed Golomb codes couple the sign and the magnitude into a single value, i.e., the signed value is mapped to an unsigned value prior to actual encoding, which is also shown in Table 3, below.

TABLE 3

| Unsigned value | Signed value |
|---|---|
| 0 | 0 |
| 1 | −1 |
| 2 | 1 |
| 3 | −2 |
| 4 | 2 |
| 5 | −3 |
| 6 | 3 |
| . . . | . . . |

If the unsigned values of res0, res1, and res2 values are "ures0," "ures1," and "ures2" (and therefore ures0, ures1, ures2 are greater than or equal to 0), then G-PCC encoder 200 may signal and G-PCC decoder 300 may parse predIndex if ures0+ures1+ures2>=Thres1. Otherwise, G-PCC encoder 200 and G-PCC decoder 300 may use a default predictor. This example may be slightly simpler than the condition |res0|+|res1|+|res2|>=Thres0 described above because, in this example, the G-PCC coder directly sums up the unsigned residual from the parsing process rather than converting the unsigned residual values to a signed value and then summing up the resulting magnitudes, which makes the parsing of predIndex less complex. The changes in the syntax are shown in Table 4, below. Throughout this disclosure, deleted text is marked with <d> . . . </d> tags and inserted text is marked with <i> . . . </i> tags.

TABLE 4

| attribute_slice_data( ) { | Descriptor |
|---|---|
| AttrDim = attribute_dimension_minus1[ ash_attr_sps_attr_idx ] + 1 | |
|   all_residual_values_equal_to_zero_run | ae(v) |
|   for( i = 0; i < PointCount; i++ ) { | |
| <d>  if( attr_coding_type = = 0 && | |
|     MaxPredDiff[ i ] >= | |
| lifting_adaptive_prediction threshold && | |
|     MaxNumPredictors > 1 ) {</d> | |
| <d>  pred_index[ i ]</d> | <d>ae(v)</d> |
|   } | |
|    if( all_residual_values_equal_to_zero_run > 0 ) { | |
|     for( k = 0; k < AttrDim; k++ ) | |
|      residual_values[ k ][ i ] = 0 | |
|     all residual_values_equal_to_zero run -= 1 | |
|    } | |
|    else { | |
|     attribute_coding( i ) | ae(v) |
|     all_residual_values_equal_to_zero_run | ae(v) |
|    } | |
| <i>  Sum_residual = 0</i> | |
| <i>  for( k = 0; k < AttrDim; k++ )</i> | |
| <i>   Sum_residual += residual_values[ k ][ i ] </i> | |
| <i>  if( attr_coding_type == 0 && Sum_residual >= Thres1 && | |
|    MaxNumPredictors > 1 ) {</i> | |
| <i>  pred_index[ i ]</i> | <i>ae(v)</i> |
| <i>  }</i> | |
|  } | |
|  byte_alignment( ) | |
| } | |

In Table 4, a sum of residuals is computed using all the components of the residual. As for the color attribute (dimension 3), the sum is computed using all three components. Similarly, for the reflectance residual (dimension 1) sum is computed using only one component. It is also possible for a multi-dimensional attribute to use a subset of components when computing the sum.

In some examples, a set of monotonically increasing functions $f_n$ can also be defined, and the condition for predIndex (for color attribute in this example) parsing is:

$$\text{parse predIndex if } f_0(res0)+f_1(res1)+f_2(res2)>=\text{Thres2}.$$

Otherwise, the G-PCC coder uses the default predictor. A specific subset could be the case where $f_0=f_1=f_2 \ldots =f_n=f$, i.e., functions are identical.

A monotonic function f can also be defined in attribute dimension space, e.g., $f(x1, y1, z1)>=f(x0, y0, z0)$ when x1>=x0 and y1>=y0 and z1>=z0 (using 3D space in this example and can be extended to any multiple-dimension space in general), and predIndex parsing could be:

$$\text{parse predIndex if } f(res0,res1,res2)>=\text{Thres3}.$$

Otherwise, the G-PCC coder uses the default predictor.

The functions described in the examples above can be signaled in an SPS or APS or at a region level, the functions can be predetermined. In some examples, the functions described in the examples above are dependent on the attribute quantization parameter. In some examples, residual values may be obtained from the residual of one or more points in the neighborhood of the current point. For instance, for each component, the maximum of the residuals of the points in the neighborhood may be used to determine the residual values res1, res2 and res3. In some examples, for each component, the average or variance of the residuals of the points in the neighborhood may be used to determine the residual values res1, res2 and res3. The neighborhood may include the current point.

In accordance with a second approach for removing the attribute reconstruction dependency for the parsing of predIndex, predIndex hiding is performed based on the parity of attribute residual values. This second approach avoids parsing predIndex at all. Instead, a G-PCC coder (e.g., G-PCC encoder 200 or G-PCC decoder 300) may derive the predIndex from the parity of attribute residual values when multiple predictors are available.

Figure 7:
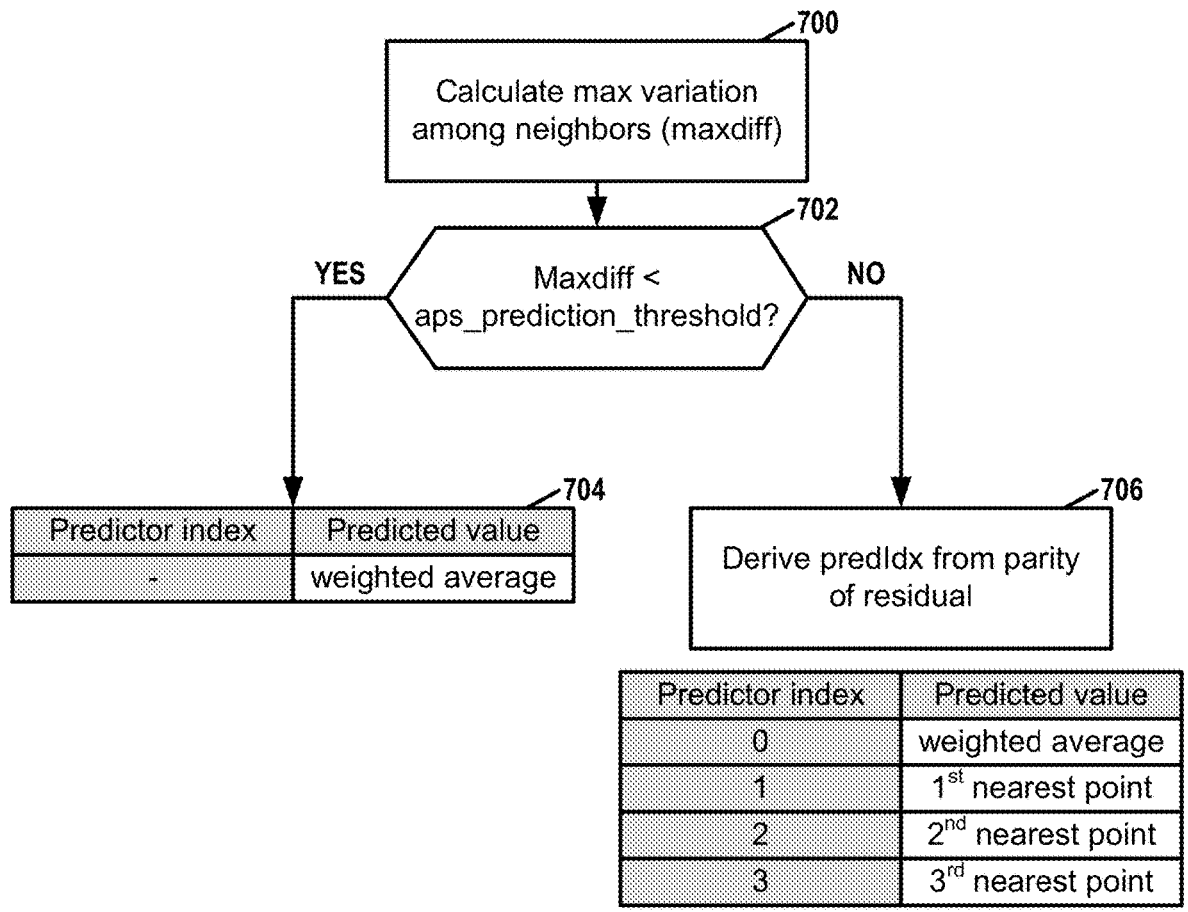
FIG. 7 is a flowchart illustrating an example process for determining an attribute predicted value for a point of a point cloud, in accordance with one or more techniques of this disclosure.

FIG. 7 is a flowchart illustrating an example process for determining an attribute predicted value for a point of a point cloud, in accordance with one or more techniques of this disclosure. The process of FIG. 7 is consistent with the second approach. In the example of FIG. 7, a G-PCC coder (e.g., G-PCC encoder 200 or G-PCC decoder 300) may calculate the maximum variation (maxdiff) of attribute values of neighbors of a current point of a point cloud (700). Additionally, the G-PCC coder may determine whether maxdiff is less than a predetermined threshold (e.g., aps_prediction_threshold) (702). In response to determining that maxdiff is less than the predetermined threshold ("YES" branch of 702), the G-PCC coder may use the default predictor (i.e., weighted average) as the predictor for attribute values of the current point (704). However, if maxdiff is greater than or equal to the predetermined threshold ("NO" branch of 706), the G-PCC coder may derive a predictor index (predIdx) for the attribute values of the current point from a parity of the attribute residual values for the neighbors of the current point (706). The G-PCC coder may use the predictor indicated by the derived predictor index as a predictor for the attribute values of the current point.

Similar to the approach of TMC13, the decision in FIG. 7 of whether to use a single predictor or to select a predictor from among multiple predictors can be based on maxPredDiff[ ], i.e., the variation in the neighborhood of attribute reconstructed values. When maxPredDiff[ ] is greater than or equal to the threshold (meaning multiple predictor candidates are being used), predIndex can be derived from the residual parity at the reconstruction stage, not at the parsing stage. Thus, there is no attribute reconstruction dependency at the parsing stage.

Figure 8:
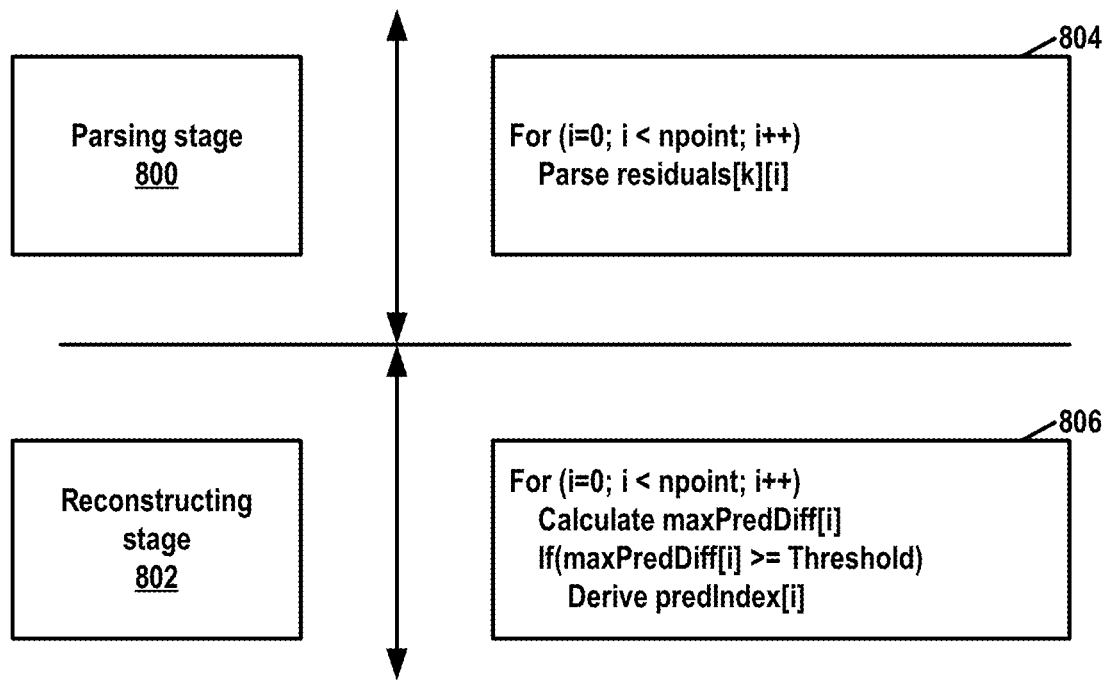
FIG. 8 is a conceptual diagram illustrating example pseudocode snippets for a parsing stage and a reconstruction stage, in accordance with one or more techniques of this disclosure.

FIG. 8 is a conceptual diagram illustrating example pseudocode snippets for a parsing stage 800 and a reconstruction stage 802, in accordance with one or more techniques of this disclosure. As shown in snippet 804 of FIG. 8, during the parsing stage 800, G-PCC decoder 300 may parse residuals for each point from a point with index 0 to a point with index npoint. As shown in snippet 806 of FIG. 8, during the reconstructing stage 802, G-PCC decoder 300 may, for each point from the point with index 0 to the point with index npoint, calculate maxPredDiff and, if maxPredDiff is greater than or equal to the predetermined threshold, derive a prediction index (predIndex) for the point.

Table 5, below, shows changes to an attribute slice data syntax structure in accordance with the second approach of this disclosure.

TABLE 5

| attribute_slice_data( ) { | Descriptor |
|---|---|
| AttrDim = attribute_dimension_minus1[ ash_attr_sps_attr_idx ] + 1 |  |
|   all_residual_values_equal_to_zero_run | ae(v) |
|   for( i = 0; i < PointCount; i++ ) { |  |
| <d>   if( attr_coding_type = = 0 && |  |
|      MaxPredDiff[ i ] >= lifting_adaptive_prediction_threshold && |  |
|      MaxNumPredictors > 1 ) {</d> |  |
| <d>    pred_index[ i ]</d> | <d>ae(v)</d> |
|    } |  |
|    if( all_residual_values_equal_to_zero_run > 0 ) { |  |
|     for( k = 0; k < AttrDim; k++ ) |  |
|      residual_values[ k ][ i ] = 0 |  |
|     all_residual_values_equal_to_zero_run -= 1 |  |
|    } |  |
|    else { |  |
|     attribute_coding( i ) | ae(v) |
|     all_residual_values_equal_to_zero_run | ae(v) |
|    } |  |
|   } |  |
|   byte_alignment( ) |  |
| } |  |

Thus, in some examples, G-PCC encoder 200 may derive, based on a parity of attribute residual values for neighboring points in a point cloud, a predictor index for a current point of the point cloud. Additionally, G-PCC encoder 200 may determine, based on the predictor index for the current point, a predicted attribute value for the current point. G-PCC encoder 200 may determine an attribute residual value for the current point based on the predicted attribute value of the current point.

Similarly, G-PCC decoder 300 may derive, based on a parity of attribute residual values for neighboring points in a point cloud, a predictor index for a current point of the point cloud. G-PCC decoder 300 may determine, based on the predictor index for the current point, a predicted attribute value for the current point. Furthermore, G-PCC decoder 300 may reconstruct an attribute value of the current point based on the predicted attribute value of the current point.

In some examples, a G-PCC coder may compute the parity using the modulo operation (shown as mod). For example, for color attributes having three residuals res0, res1, and res2, four different predictor candidates be used (as in the common test condition of G-PCC, with predIndex 0, 1, 2 and 3). In this example, the G-PCC coder may compute the parity using one of the following methods:

Parity=(res0+res1+res2) mod 4.
Parity=(|res0|+|res1|+|res2|) mod 4.
Or, for unsigned residual explained earlier, i.e., ures0, ures1, ures2, parity=(ures0+ures1+ures2) mod 4.

In general, mod N may be used instead of mod 4, if the total number of candidates is N. The number N (i.e., total number of candidates) may be signaled/pre-determined for each attribute. Different attributes may use different values of N.

In some examples, the parity is equal to predIndex. In some examples, the parity is another one-to-one-mapping between parity and predIndex (basically different permutations between parity and predIndex are possible), which could be pre-defined or signaled explicitly in a SPS, APS or region level. The one-to-one-mapping between parity and predIndex can also be adaptive in a single slice. For example, as the attribute values are decoded, the statistics for different predIndex usage can be updated. Depending on the statistics, the mapping can be updated after (de)coding of every point attribute.

An example of adaptive mapping between predIndex and parity so the parity 0 is mapped to the most probable predIndex may provide better coding performance. In general, smaller parity can be mapped to the most probable predIndex, e.g., as shown in Table 6, below.

TABLE 6

| predIndex | Parity (bits) |
|---|---|
| Most probable predindex | 0 (00) |
| 2nd most probable predindex | 1 (01) |
| 3rd most probable predindex | 2 (10) |
| Least probable predindex | 3 (11) |

In some examples, the G-PCC coder uses an exponential moving average based probability update, with the following parameters: scale, and log 2_window. The scale dictates the precision of the probability and the log 2_window is the logarithm (base 2) of the exponential moving average window size.

```
for (int i=0; i<4; i++)
{
    if (i==predMode)
    {
        pVal[i]+=(scale-pVal[i])>>log 2_window;
    }
    else
    {
        pVal[i]-=(pVal[i])>>log 2_window;
    }
}
```

For example, when the precision of the probability estimate is N bits, the value of scale is set as (1<<N). Other probability estimation methods (e.g., simple moving average, etc.) may also be used.

After the derivation of predIndex for each point, the G-PCC coder may update the probability is updated. The G-PCC coder may then sort predIndex based on the probability and update the mapping between predIndex and parity. The G-PCC coder may then use the updated mapping for the mapping of the next symbol.

The G-PCC coder may also compute parity from a subset of the residual values. For example, the G-PCC coder may use only res1 and res2, such that parity=(res1+res2) mod N and so on. Other examples of this disclosure may be modified so that the G-PCC coder uses a subset of the residual values to derive parity.

A specific case may occur when the G-PCC coder computes parity from a subset of the residual values when N=4 (i.e., when there are four total candidates), so 2 bit parity can be hidden into the even/odd parity of res1 and res2, i.e., parity=2*(res1% 2)+(res2% 2), as shown in Table 7, below.

TABLE 7

| | |
|---|---|
| res1 is even, res2 is even | parity = 0 (00) |
| res1 is even, res2 is odd | parity = 1 (01) |
| res1 is odd, res2 is even | parity = 2 (10) |
| res1 is odd, res2 is odd | parity = 3 (11) |

Another case may occur when N=2, so one bit can be hidden into the even/odd parity of residual (res0), as shown in Table 8, below.

TABLE 8

| | |
|---|---|
| res0 is even | parity = 0 |
| res0 is odd | parity = 1 |

Figure 9:
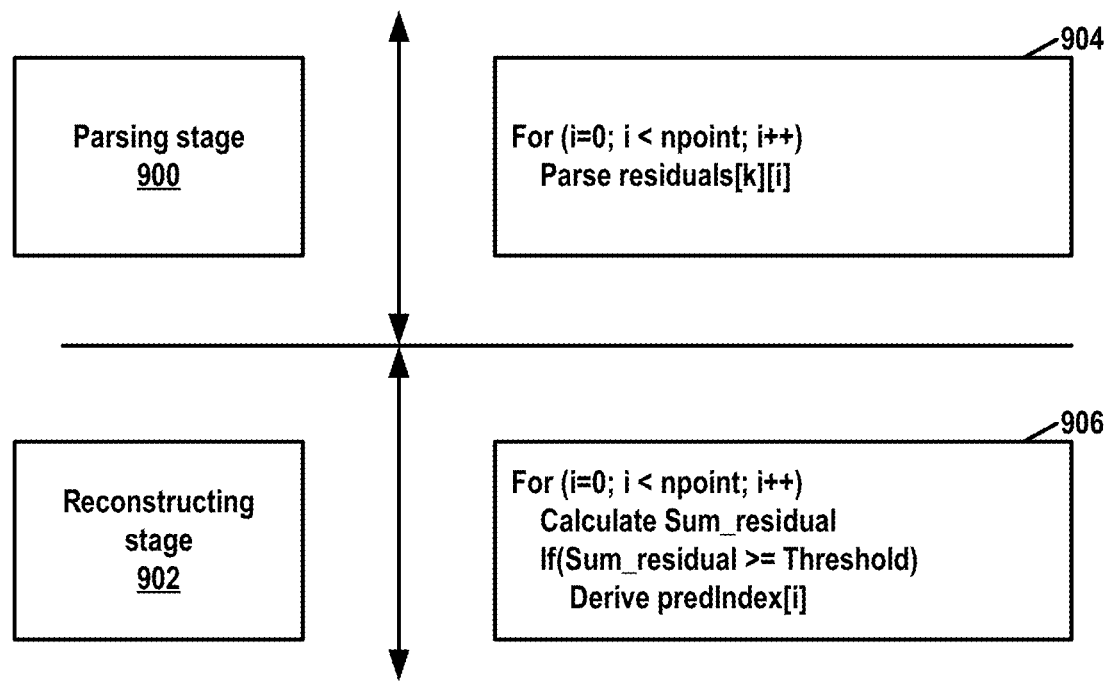
FIG. 9 is a conceptual diagram illustrating example pseudocode snippets for a parsing stage and a reconstruction stage, in accordance with one or more techniques of this disclosure.

Examples of using parity may be combined with examples in which the decision for using a single predictor or multiple predictors is based on a sum of residual values instead of maxPredDiff value. For instance, FIG. 9 is a conceptual diagram illustrating example pseudocode snippets for a parsing stage 900 and a reconstruction stage 902, in accordance with one or more techniques of this disclosure. As shown in snippet 904 of FIG. 9, during the parsing stage 800, G-PCC decoder 300 may parse residuals for each point from a point with index 0 to a point with index npoint. As shown in snippet 906 of FIG. 9, during the reconstructing stage 902, G-PCC decoder 300 may, for each point from the point with index 0 to the point with index npoint, calculate a sum of residual values (Sum_residual) and, if Sum_residual is greater than or equal to the predetermined threshold, derive a prediction index (predIndex) for the point.

To meet the constraint of having parity matched with predIndex, G-PCC encoder 200 may need to change or modify the residual values by a small amount. Therefore, for lossless reconstruction, hiding may not be possible, because hiding is typically a lossy technique.

In some examples, the sum of residual computation for parity derivation involves either a subset or over all the components. Therefore, for single dimension attribute, the parity is computed as parity=(res0) mod N.

As mentioned above, in some examples, to match the parity with predIndex, G-PCC encoder 200 cannot use all the allowed combinations of residual values. This can be viewed equivalently as a step size increase in the quantization process. To combat this increase, the actual quantization parameter value for an attribute can be lowered by using a negative QP offset (or reducing the QP value) when hiding needs to be done. This QP offset can be pre-determined or signaled. This equivalent quantization step size increase is low when an attribute has multiple components (e.g., colors) compared to single or low number of components (e.g., reflectance). Accordingly, depending on the number of components, QP offset may be set when the QP offset needs to be pre-determined (or not signaled).

A third approach for removing the attribute reconstruction dependency for the parsing of predIndex involves multiple predictor signaling with candidate reordering. In other words, the third approach involves examples for decoupling parsing and reconstruction process using multiple predictor candidates for every point, so that the parsing process does not have an impact on the reconstruction. However, at the reconstruction stage, when the variation of the reconstructed attribute values is higher than the threshold, candidates can be reordered.

Thus, in some examples consistent with the third approach, G-PCC encoder 200 may determine, based on a comparison of a variation of reconstructed attribute values for neighboring points of a point cloud, an order of candidates in a list of candidates. The list of candidates includes a candidate for a weighted average of the reconstructed attribute values for the neighboring points and candidates for individual reconstructed attribute values for the neighboring points. G-PCC encoder 200 may determine a predictor index for a current point. Additionally, G-PCC encoder 200 may determine, based on an indicated candidate in the list of candidates, a predicted attribute value for the current point. The predictor index for the current point indicates the indicated candidate. G-PCC encoder 200 may determine an attribute residual value for the current point based on the predicted attribute value of the current point.

In some examples consistent with the third approach, G-PCC decoder 300 may determine, based on a comparison of a variation of reconstructed attribute values for neighboring points of a point cloud, an order of candidates in a list of candidates. The list of candidates includes a candidate for a weighted average of the reconstructed attribute values for the neighboring points and candidates for individual reconstructed attribute values for the neighboring points. G-PCC decoder 300 may determine a predictor index for a current point. Additionally, G-PCC decoder 300 may determine, based on an indicated candidate in the list of candidates, a predicted attribute value for the current point. The predictor index for the current point indicates the indicated candidate. G-PCC decoder 300 may reconstruct an attribute value of the current point based on the predicted attribute value of the current point.

Figure 10:
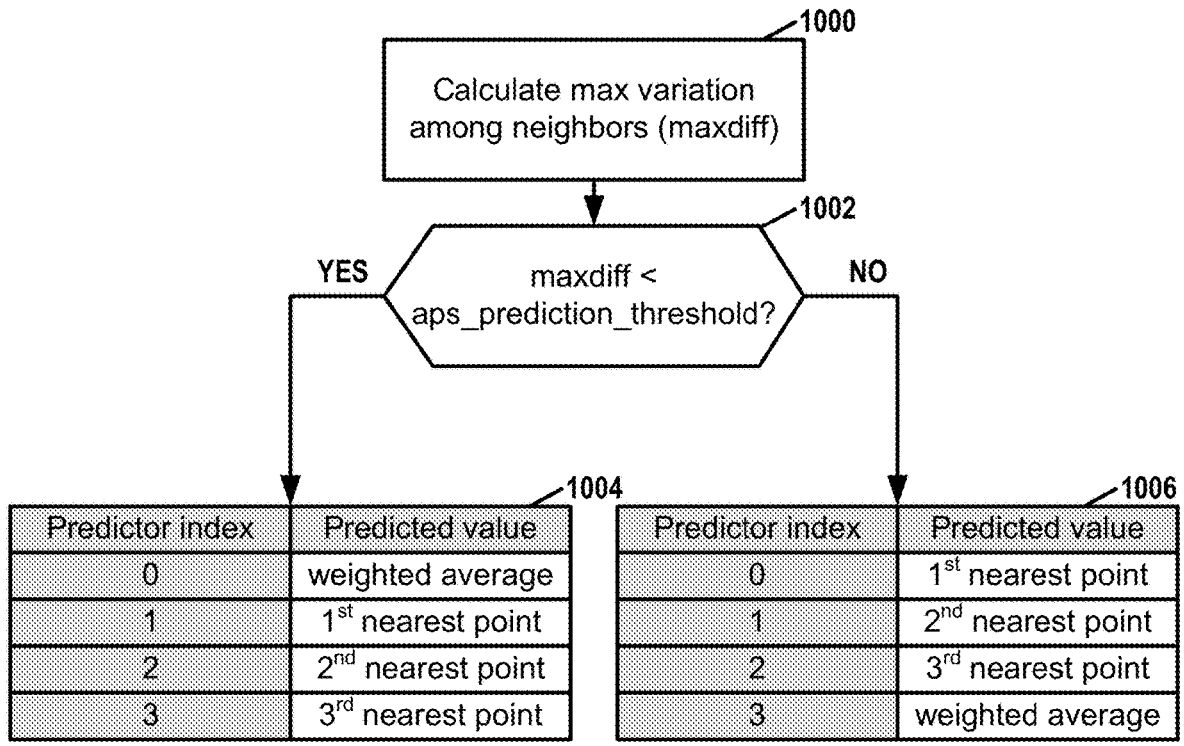
FIG. 10 is a flowchart illustrating an example process for determining an attribute predicted value for a point of a point cloud, in accordance with one or more techniques of this disclosure.

FIG. 10 is a flowchart illustrating an example process for determining an attribute predicted value for a point of a point cloud, in accordance with one or more techniques of this disclosure. The process of FIG. 10 is consistent with the third approach. As shown in FIG. 10, if the variation is greater than the threshold, a weighted average predictor is moved to the end of the list (predictor index 3). This may be particularly useful for sparse point cloud data. The reordering can be pre-determined, signaled explicitly in an APS or as a region level flag or derived implicitly based on neighbor attribute values.

More specifically, in the example of FIG. 10, a G-PCC coder (e.g., G-PCC encoder 200 or G-PCC decoder 300) may calculate a maximum variation among neighbors of a current point (maxdiff) (1000). The G-PCC coder may then determine whether maxdiff is less than the predetermined threshold (aps_prediction_threshold) (1002). In response to determining that maxdiff is less than the predetermined threshold ("YES" branch of 1002), the G-PCC coder may determine a predictor for the attribute values of the current point based on a first list of candidates (1004). In response to determining that maxdiff is not less than (i.e., greater than or equal to) the predetermined threshold ("NO" branch of 1002), the G-PCC coder may determine the predictor for the attribute values of the current point based on a second list of candidates (1006). In the first list of candidates, predIndex=0 corresponds to the default predictor. In the second list of candidates, predIndex=3 corresponds to the default predictor. Thus, regardless of whether maxdiff is less than the predetermined threshold or greater than or equal to the predetermined threshold, predIndex is signaled.

In some examples there may be more than two orders. In such examples, multiple reordering may be applied based on a maxdiff value, e.g., if (maxDiff<Threshold1)
        use candidate order 1
    else if(maxdiff<Threshold2)
        use candidate order 2
    else if (maxdiff<Threshold3)
        use candidate order 3
    Else if (maxdiff<Threshold N)
        Use candidate order N
    Else
        Use candidate order N+1.

maxDiff may indicate a difference between a maximum attribute value of the neighboring points and a minimum attribute value of the neighboring points.

A fourth approach for removing the attribute reconstruction dependency for the parsing of predIndex involves joint coding of residual values and predIndex. In other words, another way to decouple parsing and predictor index (predIndex) is to jointly code and predIndex and residual, and signal this resultant code as a residual.

Figure 11:
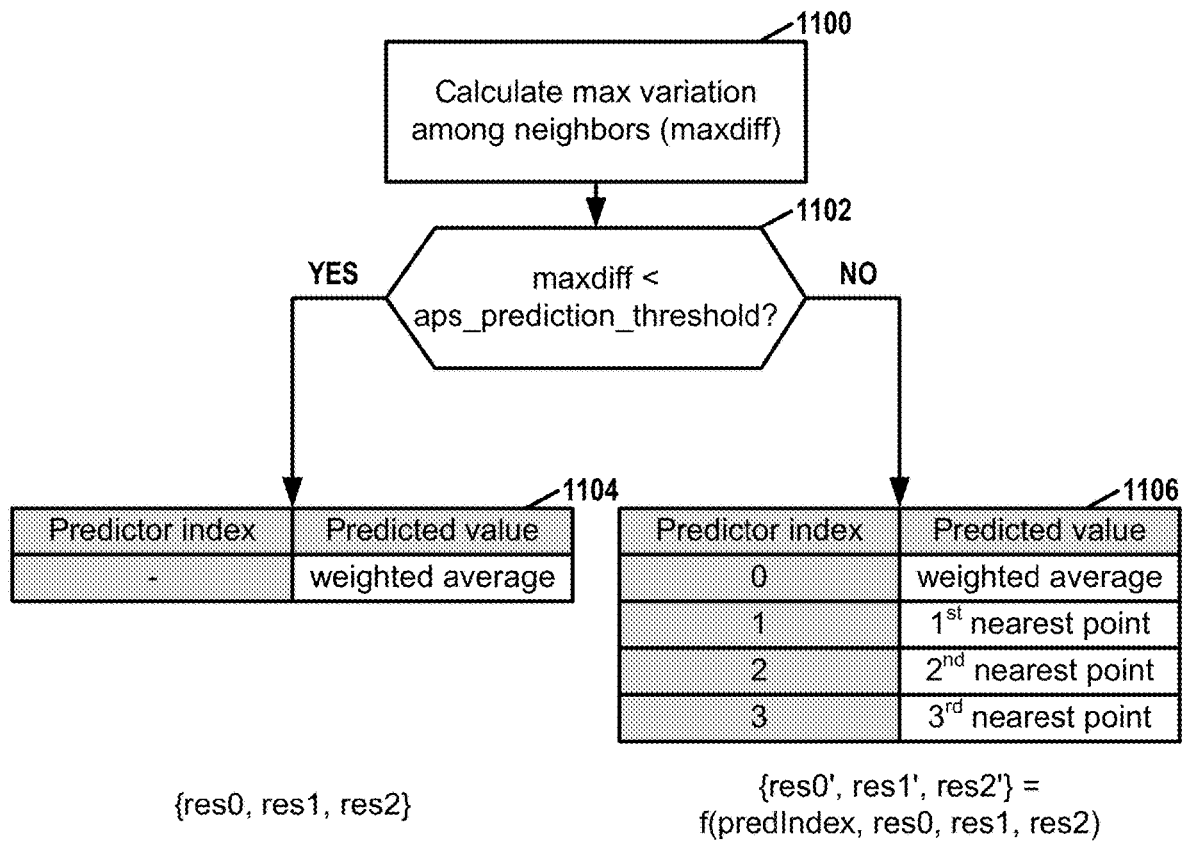
FIG. 11 is a flowchart illustrating an example process in accordance with one or more techniques of this disclosure.

FIG. 11 is a flowchart illustrating an example process in accordance with one or more techniques of this disclosure. The process of FIG. 11 is consistent with the fourth approach of this disclosure. As described in FIG. 11, when the multiple predictor process is invoked (right branch), given the residual (res0, res1 and res2, assuming three components of the residual for example color attribute) and predictor index, the residual and predictor index (predindex) are jointly coded using a predetermined/fixed or signaled/adaptive function and the jointly coded values, i.e., res0', res1', and res2' are signalled as residuals in the bitstream. On the left branch of FIG. 11, where the predictor index is not applicable, G-PCC encoder 200 directly signals the residuals in the bitstream.

At the decoder side, residuals are parsed and decoded in a normal way. During the attribute reconstruction, if G-PCC decoder 300 invokes the multiple predictor branch (right branch of FIG. 11), G-PCC decoder 300 may use an inverse function of "f" (denoted "Invf") to recover residual (res0, res1, and res2) and predIndex from jointly coded residual (res0', res1', and res2'). Note that "f" should be an invertible function, i.e., invf should exist. It can also be observed that this process can be applied to both lossless and lossy coding because the original residuals (res0, res1, and res2) can always be recovered during the process.

Specifically, in the example of FIG. 11, the G-PCC coder (e.g., G-PCC encoder 200 or G-PCC decoder 300) may calculate a maximum variation among neighbors of a current point (maxdiff) (1100). The G-PCC coder may then determine whether maxdiff is less than the predetermined threshold (aps_prediction_threshold) (1102). In response to determining that maxdiff is less than the predetermined threshold ("YES" branch of 1002), the G-PCC coder may determine that a predictor for the attribute values of the current point is the default, weighted-average predictor (1104). In response to determining that maxdiff is not less than (i.e., greater than or equal to) the predetermined threshold ("NO" branch of 1102), the G-PCC coder may, in the case where the G-PCC coder is G-PCC encoder 200, use a function that determines jointly coded values based on a predictor index and residual attribute values of the current point (1106). In the case where the G-PCC coder is G-PCC decoder 300, the G-PCC coder may use an inverse function to determine the predictor index and residual attribute values of the current point based on the jointly coded values.

For a number of predictors N, the following functions can be used. The function and inverse function may be implemented in various ways. For instance, in one example, the function f and inverse function invf may be defined in Equations (1) and (2) as:

$$f(res0, res1, res2, predindex) = \{sign(res0)*(|res0|*N + predindex), res1, res2\} = \{res0', res1', res2'\} \quad (1)$$

$$invf(res0', res1', res2') = \{|res0'| \bmod N, sign(res0')* (|res0| - (|res0| \bmod N)), res1', res2'\} = \{predIndex, res0, res1, res2\} \quad (2)$$

In Equations (1) and (2) above, res0 is jointly coded with predIndex, while res1 and res2 remain unchanged. Without loss of generality, a similar thing can be applied in other permutations, e.g., res1 is jointly coded, while res0 and res2 are unchanged.

In a second example of how the function and inverse function may be implemented, when N is a power of 2, two residuals (for res0 and res1 in the text below) can be jointly coded, and one residual is untouched, as shown in Equations (3) and (4), below.

$$f(res0, res1, res2, predindex) = \{sign(res0)*(|res0|*(N/2) + predindex/2), sign(res1)*(|res1|*(N/2) + predindex \%2), res2\} = \{res0', res1', res2'\} \quad (3)$$

$$invf(res0', res1', res2') = \{(|res0'| \bmod (N/2))*2 + (|res1'| \bmod (N/2)), sign(res0')*(|res0| - |res0| \bmod (N/2)), sign(res1')*(|res1| - |res1| \bmod (N/2)), res2'\} = \{predIndex, res0, res1, res2\} \quad (4)$$

Other permutations can also be applied. For instance, in a third example of how the function and inverse function may be implemented, only one residual, e.g., res0, is jointly coded with predindex, and the resultant jointly coded residual is res0' (res1'=res1, res2'=res2−untouched), and the derivation process of res0 and predindex from res0' is as follows.

If (|res0'|mod 2==0)
    {
        predindex=0;
        res0=sign(res0')*(|res0'|>>1);
    }
    If (|res0'|mod 4==0)
    {
        predindex=1;
        res0=sign(res0')*(|res0'|>>2);
    }
    If (|res0'|mod 8==0)
    {
        predindex=2;
        res0=sign(res0')*(|res0'|>>3);
    }
    If (|res0'|mod (1<<(N−1))==0)
    {
        predindex=N−2;
        res0=sign(res0')*(|res0'|>>(i+1));
    }
    Else if
    {
        predindex=N−1;
        res0=sign(res0')*(|res0'|>>(i+1));
    }

Other permutations can also be applied. Combinations of such examples may also be applied.

For the G-PCC v1 standard, the maximum number of direct predictors is 3. Therefore, there may be 4 predictors at maximum (considering the default weighted predictor and 3 direct predictors). To achieve better flexibility, it may also be allowed to only have direct predictors, i.e., excluding the default weighted predictor. There is an APS-level flag indicating whether only direct predictor is allowed or not. G-PCC encoder 200 may signal a value sigIndex that corresponds to a predictor index (predIndex). The determination of sigIndex may be signaled in the modulo of the joint residual. As described elsewhere in this disclosure, G-PCC decoder 300 may determine the predictor index based on sigIndex.

The process for joint coding of residual values and predictor index may be implemented in various ways. For instance, in a first example process, if an attribute has dimensions greater than 1, the last two components of the residual of the attribute are used. Otherwise, for single attribute dimension, that only components of the residual is used. The maximum number of predictors can range from 2 to 4 where such joint signaling is applicable. The details of the determination of joint residual for color (multi-component) and reflectance (single component) attribute are described in the following.

The following example applies for color (multi-component) attributes when the number of predictors is equal to 4. In this example, sigIndex may be mapped to modulo 2 of the last two components of the joint residual (i.e., res1', and res2') as described in Table 9, below.

TABLE 9

| \|res1'\| mod 2 | \|res2'\| mod 2 | sigIndex |
|---|---|---|
| 0 | 0 | 0 |
| 0 | 1 | 1 |
| 1 | 0 | 2 |
| 1 | 1 | 3 |

Given a (res1, res2, sigIndex) tuplet, i.e., original residual and the signaled index, G-PCC encoder 200 may calculate joint residuals (res1', res2') using equations (5) and (6), as follows:

$$res1'=\text{sign}(res1)*(|res1|*2+\text{sigIndex}/2) \quad (5)$$

$$res2'=\text{sign}(res2)*(|res2|*2+\text{sigIndex }\%2) \quad (6)$$

Alternatively, G-PCC encoder 200 may calculate the joint residuals (res1', res2') using equations (7) and (8) as follows:

$$res1'=\text{sign}(res1)*(|res1|<<1+\text{sigIndex}>>1) \quad (7)$$

$$res2'=\text{sign}(res2)*(|res2|*<<1+\text{sigIndex\&}1) \quad (8)$$

Thus, in some examples, based on a number of predictors in the predictor list being equal to 4, G-PCC encoder 200 may determine res1'=sign(res1)*(|res1|<<1+sigIndex>>1) and res2'=sign(res2)*(|res2|*<<1+sigIndex&1), where res1' is a first jointly coded value in a set of jointly coded values, res2' is a second jointly coded value in the set of jointly coded values, res1 is a first residual value in a set of residual values, res2 is a second residual value in the set of residual values, and sigIndex is the predictor index.

At the decoder side, G-PCC decoder 300 may perform the inverse operation using equations (9), (10), and (11) as follows:

$$res1=\text{sign}(res1')*(|res1'|-(|res1'|\%2))/2 \quad (9)$$

$$res2=\text{sign}(res2')*((|res2'|-(|res2'|\%2))/2) \quad (10)$$

$$\text{sigIndex}=(|res1'|\%2))*2+(|res2'|\%(2)) \quad (11)$$

Alternatively, G-PCC decoder 300 may perform the inverse operation using equations (12), (13), and (14), as follows:

$$res1=\text{sign}(res1')*(|res1'|>>1) \quad (12)$$

$$res2=\text{sign}(res2')*(|res2'|>>1) \quad (13)$$

$$\text{sigIndex}=(|res1'|\&1)<<1+(|res2'\&1) \quad (14)$$

Thus, in some examples, based on a number of predictors in the predictor list being equal to 4, G-PCC decoder 300 may reconstruct a first residual value by calculating: res1=sign(res1')*(|res1'|>>1), where res1 is the first residual value and res1' is a first jointly coded value. G-PCC decoder 300 may reconstruct the second residual value by calculating: res2=sign(res2')*(|res2'|>>1), where res2 is the second residual value and res2' is a second jointly coded value. G-PCC decoder 300 may determine a predictor index by calculating: sigIndex=(|res1'|&1)<<1+(|res2'|&1), where sigIndex is the predictor index, res1' is the first jointly coded value, and res2' is the second jointly coded value.

The following example may apply for a color attribute when the number of predictors is equal to 3. In this example, sigIndex may be mapped to modulo 2 of the last two components of the joint residual (i.e., res1', and res2') as described in Table 10, below:

TABLE 10

| \|res1'\| mod 2 | \|res2'\| mod 2 | sigIndex |
|---|---|---|
| 0 | — | 0 |
| 1 | 0 | 1 |
| 1 | 1 | 2 |

Thus, given an (res1, res2, sigIndex) tuplet, i.e., original residual and the signaled index, G-PCC encoder 200 may calculate joint residuals (res1', res2') using equations (15) and (16) as follows:

$$res1'=\text{sign}(res1)*(|res1|*2+(\text{sigIndex}>0)) \quad (15)$$

$$res2'=(\text{sigIndex}>0)?\text{sign}(res2)*(|res2|*2+(\text{sigIndex}-1)\%2):res2 \quad (16)$$

Alternatively, G-PCC encoder 200 may calculate the joint residuals using equations (17) and (18), as follows:

$$res1'=\text{sign}(res1)*(|res1|<<1+(\text{sigIndex}>0)) \quad (17)$$

$$res2'=(\text{sigIndex}>0)?\text{sign}(res2)*(|res2|<<1+(\text{sigIndex}-1)):res2 \quad (18)$$

Thus, in some examples, based on a number of predictors in the predictor list being equal to 3, G-PCC encoder 200 may determine res1'=sign(res1)*(|res1|<<1+(sigIndex>0)) and res2'=(sigIndex>0)? sign(res2)*(|res2|<<1+(sigIndex-1)):res2, where res1' is a first jointly coded value in a set of jointly coded values, res2' is a second jointly coded value in the set of jointly coded values, res1 is a first residual value in a set of residual values, res2 is a second residual value in the set of residual values, and sigIndex is a predictor index.

At the decoder side, G-PCC decoder 300 may perform the inverse operation using equations (19), (20), and (21), as follows:

$$res1=\text{sign}(res1')*((|res1'|-(|res1'|\%2))/2) \quad (19)$$

$$res2=(|res1'|\%2>0)?\text{sign}(res2')*((|res2'|-(|res2'|\%2))/2):res2' \quad (20)$$

$$\text{sigIndex}=(|res1'|\%2))+((|res1'|\%2>0)?(|res2'|\%(2)):0) \quad (21)$$

Alternatively, G-PCC decoder 300 may perform the inverse operation using equations (22), (23), and (24), as follows:

$$res1 = \text{sign}(res1')*(|res1'|>>1) \quad (22)$$

$$res2 = (|res1'|\&1>0)?\text{sign}(res2')*(|res2'|>>1):res2' \quad (23)$$

$$\text{sigIndex} = (|res1'|\&1)) + ((|res1'|>0)?(|res2'|\&1):0) \quad (24)$$

Thus, in some examples, based on a number of predictors in the predictor list being equal to 3, G-PCC decoder 300 may reconstruct a first residual value by calculating: res1=sign(res1')*(|res1'|>>1), where res1 is the first residual value and res1' is a first jointly coded value. G-PCC decoder 300 may reconstruct a second residual value by calculating: res2=(|res1'|&1>0)? sign(res2')*(|res2'|>>1):res2', where res2 is the second residual value and res2' is a second jointly coded value. G-PCC decoder 300 may determine a predictor index by calculating sigIndex=(|res1'|&1))+((|res1'|&1>0)? (|res2'|&1):0), where sigIndex is the predictor index, res1' is the first jointly coded value, and res2' is the second jointly coded value.

The following example applies for a color attribute when the number of predictors is equal to 2. In this example, sigIndex may be mapped to modulo 2 of last two components of the joint residual (i.e., res1', and res2') as described in Table 11, below:

TABLE 11

| \|res1'\| mod 2 | \|res2'\| mod 2 | sigIndex |
|---|---|---|
| 0 | — | 0 |
| 1 | — | 1 |

Thus, given (res1, res2, sigIndex) tuplet, i.e., original residual and the signaled index, G-PCC encoder 200 may calculate joint residuals (res1', res2') using equations (25) and (26), as follows:

$$res1' = \text{sign}(res1)*(|res1|*2+\text{sigIndex }\%2) \quad (25)$$

$$res2' = res2 \quad (26)$$

Alternatively, G-PCC encoder 200 may calculate the joint residuals using equations (27) and (28), as follows:

$$res1' = \text{sign}(res1)*(|res1|<<1+(\text{sigIndex}\&1)) \quad (27)$$

$$res2' = res2 \quad (28)$$

Thus, in some examples, based on a number of predictors being equal to 2, G-PCC encoder 200 may determine res1'=sign(res1)*(|res1|<<1+(sigIndex & 1)) and res2'=res2, where res1' is a first jointly coded value in a set of jointly coded values, res2' is a second jointly coded value in the set of jointly coded values, res1 is a first residual value in a set of residual values, res2 is a second residual value in the set of residual values, and sigIndex is the predictor index.

At the decoder side, G-PCC decoder 300 may perform the inverse operation using equations (29), (30), and (31), as follows:

$$res1 = \text{sign}(res1')*(|res1'|-(|res1'|\%2))/2 \quad (29)$$

$$res2 = res2' \quad (30)$$

$$\text{sigIndex} = (|res1'|\%2)) \quad (31)$$

Alternatively, G-PCC decoder 300 may perform the inverse operation using equations (32), (33), and (35) as follows:

$$res1 = \text{sign}(res1')*(|res1'|>>1) \quad (32)$$

$$res2 = res2' \quad (33)$$

$$\text{sigIndex} = (|res1'|\&1)) \quad (34)$$

Thus, in some examples, based on a number of predictors in the predictor list being equal to 2, G-PCC decoder 300 may reconstruct a first residual value by calculating res1=sign(res1')*(|res1'|>>1), where res1 is the first residual value and res1' is a first jointly coded value. G-PCC decoder 300 may reconstruct a second residual value by calculating: res2=res2', where res2 is the second residual value and res2' is a second jointly coded value. G-PCC decoder 300 may determine a predictor index by calculating sigIndex= (|res1'|&1)), where sigIndex is the predictor index and res1' is the first jointly coded value.

The following example applies for a reflectance (single component) attribute when the number of predictors is equal to 4. In this example, if the number of predictors is N, then given a (res, sigIndex) duplet, i.e., original residual and the signaled index, G-PCC encoder 200 may calculate the joint residual res' using equation (35), as follows:

$$res' = \text{sign}(res)*(|res|*N+res\% N) \quad (35)$$

Alternatively, G-PCC encoder 200 may calculate the joint residual using equation (36), as follows:

$$res' = \text{sign}(res)*(|res|<<2+\text{sigIndex}) \quad (36)$$

At the decoder side, G-PCC decoder 300 may perform the inverse operation using equation (37), as follows:

$$res = \text{sign}(res')*((|res'|-(|res'|\% N))/N) \quad (37)$$

Alternatively, G-PCC decoder 300 may perform the inverse operation using equation (38), as follows:

$$res = \text{sign}(res')*((|res'|>>2) \quad (38)$$

G-PCC decoder 300 may calculate the sigIndex using equation (39), as follows:

$$\text{sigIndex} = res'\&3 \quad (39)$$

The following example applies for a reflectance attribute when the number of predictors is equal to 3. In this example, given (res, sigIndex) duplet, i.e., original residual and the signaled index, G-PCC encoder 200 may calculate joint residual res' using equations (40) and (41), as follows (where res1' is an intermediate residual):

$$res1' = (\text{sigIndex}>0)?(|res|<<1+(\text{sigIndex}-1)):|res| \quad (40)$$

$$res' = \text{sign}(res)*(|res1'|<<1+(\text{sigIndex}>0)) \quad (41)$$

At the decoder side, G-PCC decoder 300 may perform the inverse operation using equations (42), (43), and (44), as follows (where res1 is an intermediate residual):

$$res1 = |res'|>>1 \quad (42)$$

$$res = ((|res'|\&1)>0)?(res1>>1):res1 \quad (43)$$

$$\text{sigIndex} = (res'\&1) + ((res'\&1)>0)?(res1\&1) \quad (44)$$

The following example applies for a reflectance attribute when the number of predictors is equal to 2. In this example, given (res, sigIndex) duplet, i.e., original residual and the signaled index, G-PCC encoder 200 may calculate the joint residual res' using equation (45), as follows:

$$res' = \text{sign}(res)*(|res|<<1+\text{sigIndex}) \quad (45)$$

At the decoder side, G-PCC decoder 300 may perform the inverse operation using equations (46) and (47), as follows:

$$res = \text{sign}(res') * ((|res'| >> 1)) \quad (46)$$

$$sigIndex = res' \& 1 \quad (47)$$

In the example of FIG. 11, when the neighbor variation (maxdiff) is greater than a predetermined threshold, a G-PCC coder (e.g., G-PCC encoder 200 or G-PCC decoder 300) may use the default predictor plus up to 3 direct predictors. However, there is no flexibility to remove the default weighted predictor in the current G-PCC standard.

In this disclosure, a flag (e.g., lifting_only_direct_predictors) at the APS level (or alternatively in a slice header) is introduced to indicate whether only direct predictors are used or not. If the flag is set to 1, the predictor list excludes the default predictor. Otherwise, if the flag is set to zero, the flag keeps the default weighted predictor. For Category 3 content, the default predictor may not be helpful when the variation is greater than the predetermined threshold. Table 12, below, shows an example syntax structure that includes the lifting_only_direct_predictors syntax element.

TABLE 12

| attribute_parameter_set( ) { | Descriptor |
|---|---|
| ... | |
| if( attr_coding_type = = 1 ) { | |
| lifting_max_num_direct_predictors | ue(v) |
| if( lifting_max_num_direct_predictors){ | |
| lifting_adaptive_prediction_threshold | ue(v) |
| lifting_only_direct_predictors | u(1) |
| } | |
| lifting_intra_lod_prediction_num_layers | ue(v) |
| inter_component_prediction_enabled_flag | u(1) |
| } | |
| } | |
| ... | |
| } | |

As noted above, G-PCC encoder 200 may signal a value sigIndex that corresponds to a predictor index (predIndex). The mapping between sigIndex and predIndex can either be fixed or adaptive. In this disclosure, the mapping and its nature (fixed or adaptive) may be predetermined, and does not require signaling. For reflectance, a fixed mapping is used when:
max_num_direct_predictors is set to 2 (or 1 or 3), and only direct predictor is set to 1.

Thus, only the first two direct neighbors are available for prediction. So, the G-PCC coder may use the mapping shown in Table 13, below:

TABLE 13

| predIndex | sigIndex |
|---|---|
| 1 | 0 |
| 2 | 1 |

For color attributes, an adaptive mapping (or fixed mapping) is used when:
For Category 1A/1B data:
  max_num_direct_predictors is set to 3, and
  only_direct_predictor is set to 0.
For Category 3 data:
  max_num_direct_predictors is set to 3, and
  only_direct_predictor is set to 1.
Category 1A and Category 1B data are typically dense point clouds, i.e., clouds in which points are arranged in a comparatively denser fashion. For instance, Category 1A and Category 1B data may be point cloud data captured by an augmented reality (AR) system. In some examples, a 3D model of a human or structure may be Category 1A or Category 1B data. Category 3 data are point clouds that are less dense, such as point clouds captured with LIDAR, point clouds representing 3D maps, and so on.

For the adaptive mapping, the main motivation is to use a smaller sigIndex for the most probable predIndex (because joint residual derived with smaller sigIndex is more efficient to code) and vice versa. Thus, in adaptive mapping, the G-PCC coder may use the mapping shown in Table 14, below:

TABLE 14

| predIndex | sigIndex |
|---|---|
| Most probable predindex | 0 |
| $2^{nd}$ most probable predindex | 1 |
| $3^{rd}$ most probable predindex | 2 |
| Least probable predindex | 3 |

To track the probability of each predIndex, the G-PCC coder may update the probability of different predIndex occurrences for each symbol. In some examples, the G-PCC coder may use an exponential moving average based probability update, where the G-PCC may use the following parameters: scale=1024 (representing the precision of probability values) and log 2_window=6 (log 2 value of the exponential moving average window size).

```
for (int i = 0; i < maxcand; i++){
    pVal[i] += (i == predMode) ? (scale - pVal[i]) >> log2_window
                                : - ((pVal[i]) >> log2_window) ;
}
```

Thus, after the derivation of predIndex for each point (where the maximum variation is greater than threshold), the G-PCC coder may update the probability, sort predIndex based on the probability, and update the mapping (between predIndex and parity). The G-PCC coder may then use the updated mapping for the derivation of predIndex from parity associated to the next symbol.

In general, multiple adaptive mapping can be realized, where each mapping is associated with a particular range of maximum variation, i.e., adaptive mapping[j] can be utilized for class j, where the maximum variation is such that threshold(j)<=maximum variation <threshold(j+1)). Using multiple classes may track the probabilities of predIndex better based on the degree of variation.

In a second example process for joint coding of residual values and predictor index, when the number of predictors is 4, and the attribute dimension is greater than 2, there is an alternative way of performing the joint coding:

The following example of the second example process may apply when the number of predictors is equal to 4. In this example, sigIndex may be mapped to modulo 2 of the last three components of the joint residual (i.e., res1', res2', res0') as described in Table 15, below.

TABLE 15

| \|res1'\| mod 2 | \|res2'\| mod 2 | \|res0'\| mod 2 | sigIndex |
|---|---|---|---|
| 0 | — | — | 0 |
| 1 | 0 | — | 1 |
| 1 | 1 | 0 | 2 |
| 1 | 1 | 1 | 3 |

Thus, given (res0, res1, res2, sigIndex) tuplet, i.e., original residual and the signaled index, G-PCC encoder 200 may calculate joint residuals (res0, res1', res2') using equations (48), (49), and (50), as follows:

$$res1'=\text{sign}(res1)*(|res1|*2+(\text{sigIndex}>0)) \quad (48)$$

$$res2'=(\text{sigIndex}>0)?\text{sign}(res2)*(|res2|*2+(\text{sigIndex}-1)\%2):res2 \quad (49)$$

$$res0'=(\text{sigIndex}>1)?\text{sign}(res0)*(|res0|*2+(\text{sigIndex}-2)\%2):res0 \quad (50)$$

At the decoder side, G-PCC decoder 300 may perform the inverse operation using equations (51), (52), (53), and (54) as follows:

$$res1=\text{sign}(res1')*((|res1'|-(|res1'|\%2))/2) \quad (51)$$

$$res2=(|res1'|\%2>0)?\text{sign}(res2')*((|res2'|-(|res2'|\%2))/2):res2' \quad (52)$$

$$res0=(|res1'|\%2>0\&\&|res2'|\%2>0)?\text{sign}(res0')*((|res0'|-(|res0'|\%2))/2):res0' \quad (53)$$

$$\text{sigIndex}=(|res1'|\%2))+((|res1'|\%2>0)?(|res2'|\%(2)):0)+((|res1'|\%2>0\&\&|res2'|\%2>0)?(|res0'|\%(2)):0) \quad (54)$$

In a third example process for joint coding of residual values and predictor index, for multi-component attributes, it may also be possible to utilize only one component for joint coding. It is similar to the single component attribute coding described in the first example process for joint coding. The component in which joint coding is applied can be either fixed/predetermined or signaled per slice/frame or at a sequence level.

FIG. 12 is a flowchart illustrating an example encoding process in accordance with one or more techniques of this disclosure. In the example of FIG. 12, based on a maximum difference value (e.g., maxdiff) being less than a threshold (e.g., aps_prediction_threshold), G-PCC encoder 200 may determine a predictor index for a current point of the point cloud that indicates predictor in a predictor list, wherein predictors in the predictor list are based on attribute values of one or more neighbor points (1200). For instance, the predictor index may indicate a method for determining how to predict attribute values of the current point based on attribute values of one or more neighbor points. G-PCC encoder 200 may determine maxdiff as a difference between a maximum attribute value of the neighboring points and a minimum attribute value of the neighboring points. In some examples, G-PCC encoder 200 may determine a predictor in a list of predictors. Each predictor in the list of predictors indicates a respective set of attribute values. The predictor index indicates a predictor in the list of predictors that indicates predicted attribute values for the current point. In some examples, G-PCC encoder 200 signals a syntax element that indicates whether the list of predictors includes a default predictor. Furthermore, in some examples, based on a maximum number of direct predictors being greater than 0, G-PCC encoder 200 may signal, in a bitstream, a lifting adaptive prediction threshold syntax element that indicates the lifting adaptive prediction threshold.

Additionally, in the example of FIG. 12, G-PCC encoder 200 may determine a set of residual values for the attribute values of the current point (1202). G-PCC encoder 200 may determine the residual values for the attribute values of the current point as differences between original values of the attribute values of the current point and the predicted attribute values for the current point.

G-PCC encoder 200 may apply a function that generates a set of one or more jointly coded values based on (i) the set of residual values for attribute values of the current point and (ii) the predictor index (1204). For instance, in some examples where the number of predictors is equal to 4, G-PCC encoder 200 may use equations (48), (49), and (50) to determine the jointly coded values. In other examples, G-PCC encoder 200 may use other equations described in this disclosure to determine the jointly coded values.

G-PCC encoder 200 may signal the jointly coded values (1206). For example, G-PCC encoder 200 may include syntax elements in a bitstream indicating the jointly coded values.

As described previously, lifting_adaptive_prediction_threshold is a signaled threshold that G-PCC decoder 300 may use in order to decide whether a single predictor is to be used (i.e., when only the default predictor can be used as a predictor for attribute values of the current point) or multiple predictors are to be used (i.e., when one of multiple predictors is used as the predictor for attribute values of the current point). Table 16, below, shows a syntax structure in which a lifting_adaptive_prediction_threshold syntax element is signaled.

TABLE 16

| if( attr_coding_type == 1 ) { | |
|---|---|
|     lifting_adaptive_prediction_threshold | ue(v) |
|     lifting_intra_lod_prediction_num_layers | ue(v) |
|     lifting_max_num_direct_predictors | ue(v) |
|     inter_component_prediction_enabled_flag | u(1) |
| } | |

The lifting_max_num_direct_predictors syntax element shown in Table 16 indicates how many direct predictors would be used along with the weighted predictor, in the case that multiple predictors are used for coding. A value of zero indicates that no direct predictor is used. Thus, a value of zero indicates that a default single predictor is used for all points, or in other words, multiple predictors cannot be used.

Therefore, the lifting_adaptive_prediction_threshold syntax element should only be signaled when lifting_max_num_direct_predictors>0, e.g., as shown in the Table 17, below.

TABLE 17

| if( attr_coding_type == 1 ) { | |
|---|---|
| *  lifting_max_num_direct_predictors* | *ue(v)* |
| *    if(lifting_max_num_predictors >0 )* | |
| *      lifting_adaptive_prediction_threshold* | *ue(v)* |
|   lifting_intra_lod_prediction_num_layers | ue(v) |
|   inter_component_prediction_enabled_flag | u(1) |
| } | |

Secondly, the maximum value of lifting_adaptive_prediction_threshold is not set in the current version of the specification. It is proposed to have a semantic constraint on the maximum value, which is 1<<max(attribute_bitdepth_minus1+1, attribute_bitdepth_secondary_minus1+1). It may be noted that when lifting_adaptive_prediction_threshold is set to this maximum value, no point will use multiple predictors. The setting of the maximum value will ease the bitstream conformance testing.

Therefore, the following changes (indicated with <i> . . . </i>tags) are presented in the following semantics for the lifting_adaptive_prediction_threshold syntax element.

lifting_adaptive_prediction_threshold specifies the threshold to enable adaptive prediction. The value of lifting_adaptive_prediction_threshold[ ] shall be in the range of 0 to <i>1<<max(attribute_bitdepth_minus1[ ]+1, attribute_bitdepth_secondary_minus1[ ]+1)</i>.

Alternatively, the semantics for the lifting_adaptive_prediction_threshold syntax element may be defined as follows, with <i> . . . </i>tags indicating changes:

lifting_adaptive_prediction_threshold specifies the threshold to enable adaptive prediction. The value of lifting_adaptive_prediction_threshold[ ] shall be in the range of 0 to <i>1<<max(attribute_bitdepth_minus[ ]+1, (attribute_dimension_minus1>0)? attribute_bitdepth_secondary_minus1[ ]+1): 0)</i>

Thus, in some examples, G-PCC encoder 200 may determine, based on a maximum number of direct predictors being greater than 0, that a bitstream includes a lifting adaptive prediction threshold syntax element that indicates a lifting adaptive prediction threshold. Based on a variation of reconstructed attribute values of neighboring points of a current point of the point cloud being greater than the lifting adaptive prediction threshold, G-PCC encoder 200 may determine a predictor index for a current point. Additionally, G-PCC encoder 200 may determine, based on an indicated candidate in the list of candidates, a predicted attribute value for the current point. The predictor index for the current point indicates the indicated candidate. G-PCC encoder 200 may determine an attribute residual value for the current point based on the predicted attribute value of the current point.

Similarly, in some examples, G-PCC decoder 300 may determine, based on a first syntax element indicating that a maximum number of direct predictors is greater than 0, that a bitstream includes a lifting adaptive prediction threshold syntax element that indicates a lifting adaptive prediction threshold. Based on a variation of reconstructed attribute values of neighboring points of a current point of the point cloud being greater than the lifting adaptive prediction threshold, G-PCC decoder 300 may determine that a list of candidates that includes one or more multiple direct predictors. Each of the one or more direct predictors is an attribute value of one of neighboring points. G-PCC decoder 300 may determine a predictor index for a current point. Additionally, G-PCC decoder 300 may determine, based on an indicated candidate in the list of candidates, a predicted attribute value for the current point. The predictor index for the current point indicates the indicated candidate. Furthermore, G-PCC decoder 300 may reconstruct an attribute value of the current point based on the predicted attribute value of the current point.

FIG. 13 is a flowchart illustrating an example decoding process in accordance with one or more techniques of this disclosure. In the example of FIG. 13, based on a comparison of a maximum difference value (e.g., maxdiff) being less than a threshold (e.g., aps_prediction_threshold), G-PCC decoder 300 may apply an inverse function to a set of one or more jointly coded values to recover (i) residual values for attribute values of a current point of point cloud data and (ii) a predictor index that indicates a predictor in a predictor list, wherein predictors in the predictor list are based on attribute values of one or more neighbor points (1300). In some examples, G-PCC decoder 300 may determine, based on a first syntax element (e.g., lifting_max_num_direct_predictors) indicating that a maximum number of direct predictors is greater than 0, that a bitstream includes a lifting adaptive prediction threshold syntax element (e.g., lifting_adaptive_prediction_threshold) that indicates the lifting adaptive prediction threshold.

In some examples, such as examples where G-PCC decoder 300 is decoding color attributes, G-PCC decoder 300 may reconstruct a first residual value based on a first jointly coded value of the set of jointly coded values, reconstruct a second residual value based on a second jointly coded value of the set of jointly coded values, and determine a predictor index (e.g., predIndex) based on the first and second jointly coded values of the set of jointly coded values. For instance, in some examples, G-PCC decoder 300 may determine the predictor index based on modulo 2 of the first jointly coded value and the second jointly coded value. In some examples where the number of predictors is equal to 4, G-PCC decoder 300 may use equations (51), (52), (53), and (54) to determine the residual values for the attribute values of the current point and the predictor index. In other examples, G-PCC decoder 300 may use other equations described in this disclosure to determine the residual values for the attribute values of the current point and the predictor index. For instance, in examples where G-PCC decoder is decoding single-dimension attributes, G-PCC decoder 300 may reconstruct a residual value based on a jointly coded value of the set of jointly coded values and determine a predictor index based on the jointly coded value of the set of jointly coded values. For instance, G-PCC decoder 300 may use equations (37), (38), (39), (42), (43), (44), (46), and (47) to reconstruct the residual value and determine the predictor index.

Additionally, in the example of FIG. 13, G-PCC decoder 300 may determine predicted attribute values based on the predictor index (1302). For instance, G-PCC decoder 300 may generate a list of candidates that correspond to different values of the predictor index. The list of candidates may include candidates that specify attribute values of individual neighbors of the current point. In some examples, the list of candidates may include a default predictor that is based on a weighted average of attribute values of two or more of the neighbors of the current point.

In some examples, G-PCC decoder 300 may determine, based on a syntax element (e.g., lifting_only_direct_predictors), whether a list of predictors includes the default predictor. In this example, each predictor in the list of predictors indicates a respective set of attribute values. In this example, G-PCC decoder 300 may determine, based on the predictor index, a predictor in the list of predictors, wherein the determined predictor indicates the predicted attribute values.

Furthermore, G-PCC decoder 300 may reconstruct the attribute values of the current point based on the residual values and the predicted attribute values (1304). For example, the G-PCC decoder 300 may add residual values to corresponding predicted attribute values to reconstruct the attribute values of the current point.

In some examples of this disclosure, a G-PCC coder (e.g., G-PCC encoder 200 or G-PCC decoder 300) may compute maxPredDiff differently for different primary and secondary bit depths. As described elsewhere in this disclosure, maxPredDiff[ ] may be computed by maximum variation across all components of an attribute. However, if the bit depths of primary and secondary components of an attribute are different, the G-PCC coder may need to compensate for the bit depths when computing maxPredDiff. If the bit depth of $i^{th}$ component of an attribute is defined as Ba, maxPredDiff computation may be modified as follows:

```
min Value = max Value = ã₀[p]
    for(p=0; p<N; p++){
        for (j = 0; j < k; j++) {
            minValue = Min( min Value, ãⱼ[p] )
            maxValue = Max( max Value, ãⱼ[p] )
        }
        MaxPredDiffComp[p] = max Value − min Value;
        <i> If (p >0 && BD₀ != BDₚ)
        {
            MaxPredDiffComp[p] = (BD₀ > BDₚ)? (MaxPredDiffComp[p]
            <<(BD₀ − BDₚ)): ((MaxPredDiffComp[p] + 1 <<( BDp − BD₀ −1))
            >>(BDₚ − BD₀))
        }
    }</i>
MaxPredDiff[i] = Max argₚ(MaxPredDiffComp[p])
```

Currently, for predicting transform, the attribute of a point in the point cloud is predicted from the attribute values of neighboring points. In common test conditions, such as G-PCC reference software, four different predictors are available: the weighted predictor, and its three direct neighbors (signaled when aps.max_num_direct_predictors=3), and the predictor index coded with truncated unary (TU) binarization with cMax=aps.max_num_direct_predictors. To reduce the associated signaling, the choice of four different predictors is only made available when the variation of the attribute values is higher than a threshold signaled in APS and the number of available neighbors is greater than 1. A neighboring point of a current point may be "available" if the attributes of the neighboring point are coded before the current point and are available for use in predicting attributes of the current point. A G-PCC coder may use a strategy, such as checking points that are inside a radius centered around the current point, to identify neighboring points and then using the attribute values of one or more of the available neighboring points as predictors. In instances where the current point is isolated or the current point is the first-coded point, the current point may have no neighbors.

In this scenario, when neighborCount=2, multiple predictors are invoked. However, the predictor index is still coded with TU binarization with cMax=aps.max_num_direct_predictors (=3) as shown in Table 18 below, although predIndex=3 is not available. Table 18, <!> . . . </!>tags indicate emphasis.

TABLE 18

| predIndex | bins |
|---|---|
| 0 | 0 |
| 1 | 10 |
| 2 | 110 |
| <!>3</!> | <!>111</!> |

This redundant case happens rarely (and therefore can be treated as a "corner" case) when a sufficient number of neighbors are not available to generate all direct predictors. Either of the following solutions (labeled Solution 1 and Solution 2) may have an impact on the compression performance. However, removal of this redundancy, although very infrequent, may be beneficial.

Figure 14:
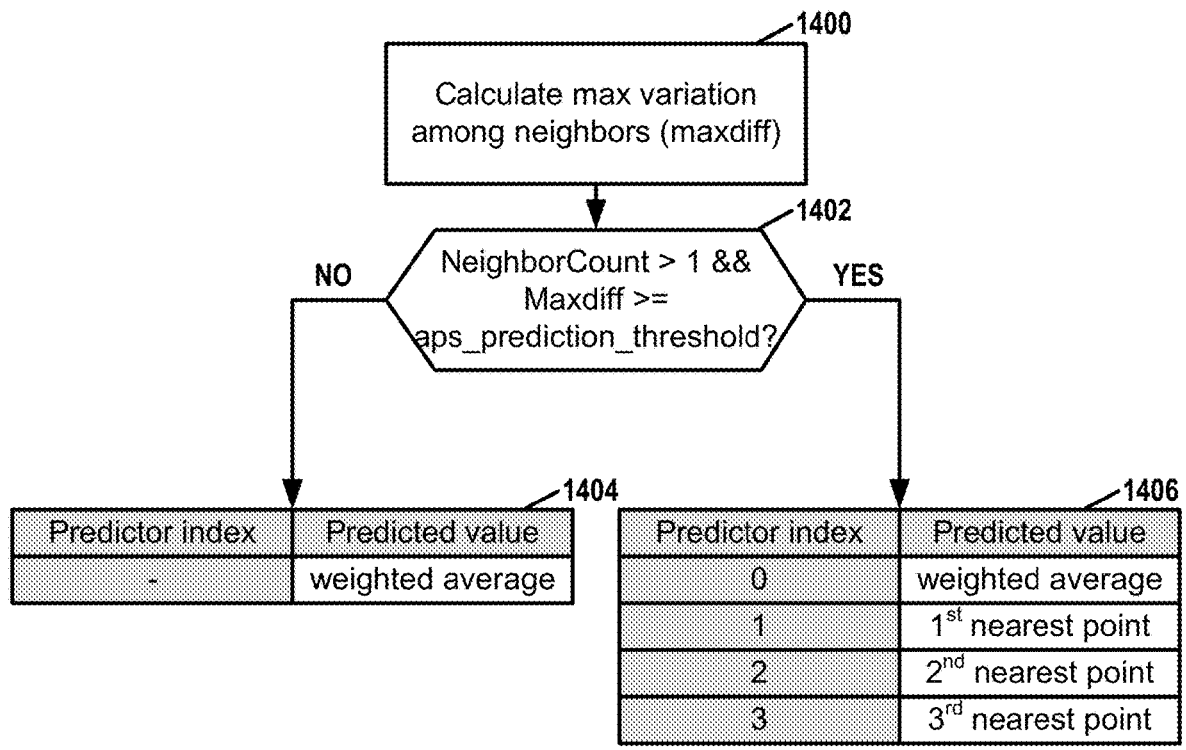
FIG. 14 is a flowchart illustrating an example process in accordance with one or more techniques of this disclosure.

Solution 1: Use truncated unary binarization with maxval=min(neighCount, aps.max_num_direct_predictor), e.g., as shown in the example of FIG. 14. FIG. 14 is a flowchart illustrating an example process in accordance with one or more techniques of this disclosure. In the example of FIG. 14, a G-PCC coder (e.g., G-PCC encoder 200 or G-PCC decoder 300) may calculate a maximum variation (maxdiff) among neighbors of a current point (i.e., points in a neighborhood of the current point) (1400). The G-PCC coder may then determine whether the neighbor count (i.e., the number of available neighbors) is greater than 1 and whether maxdiff is greater than or equal to the predetermined threshold (aps_prediction_threshold) (1402). In response to determining that either the neighbor count is less than or equal to 1 or maxdiff is less than the predetermined threshold ("NO" branch of 1402), the G-PCC coder may use the default, weighted-average predictor to predict the attribute values of the current point (1404). However, if the neighbor count is greater than 1 and maxdiff is greater than or equal to the predetermined threshold ("YES" branch of 1402), the predictor index may be signaled and G-PCC coder may predict the attribute values of the current point based on the predictor indicated by the predictor index (1406).

Example source code corresponding to the FIG. 14 is presented below with <i> . . . </i>tags indicating added text and <d> . . . </d>tags indicating deletion.

```
if (maxDiff>=aps.adaptiveprediction threshold) {
    <i>int maxMode=std::min((int)predictor.neighborCount,
        aps.max_num_direct_predictors);
    predictor.predMode=decoder.decodePredMode
        (maxMode);</i>
    <d>predictor.predMode=decoder.decodePredMode(aps-
        .max_num_direct_predictors);</d>
}.
```

For neighCount=2, the binarization table is shown in Table 19, below:

TABLE 19

| predIndex | bins |
|---|---|
| 0 | 0 |
| 1 | 10 |
| 2 | 11<d>0</d> |
| <d>3</d> | <d>111</d> |

Figure 15:
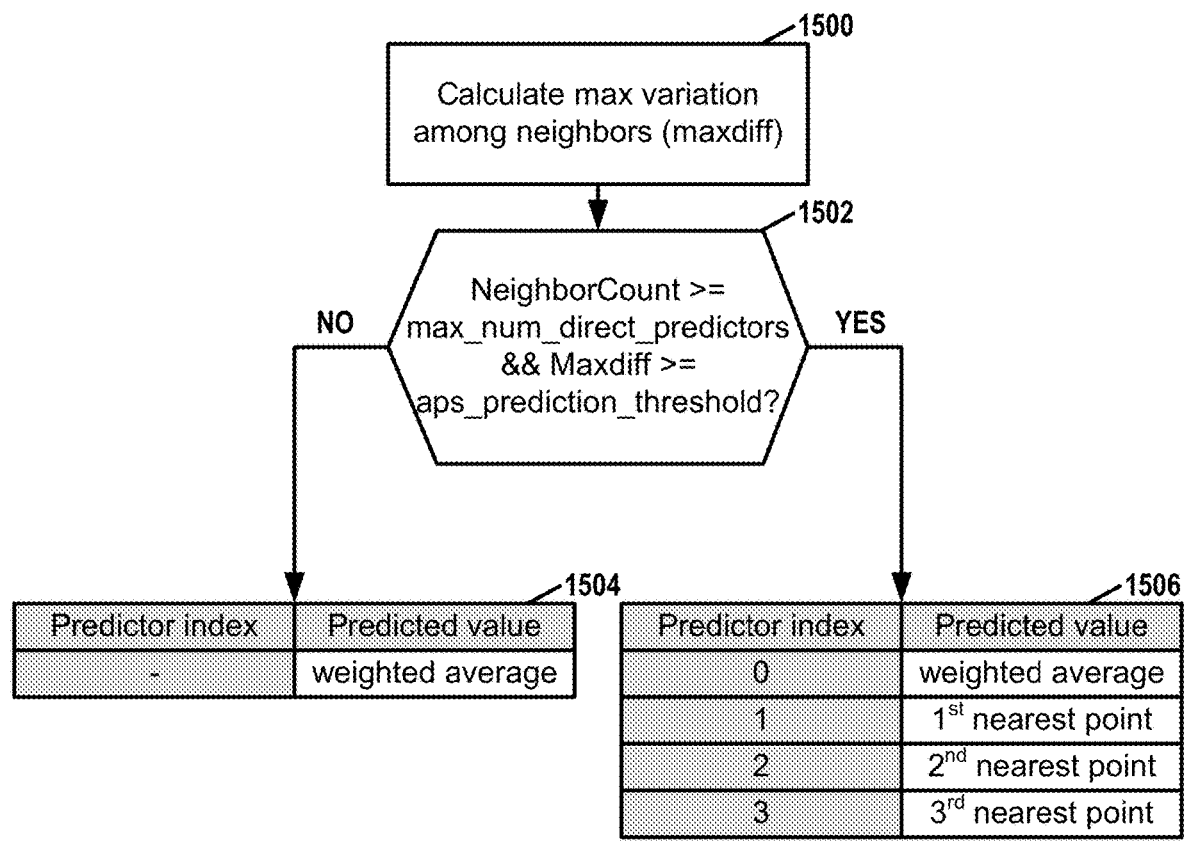
FIG. 15 is a flowchart illustrating an example process in accordance with one or more techniques of this disclosure.

In another example, the multiple predictor process is invoked when NeighborCount>=(aps.max_num_direct_predictors) && Maxdiff>=Threshold (e.g., aps_prediction_threshold), as shown in the example of FIG. 15. FIG. 15 is a flowchart illustrating an example process in accordance with one or more techniques of this disclosure. In the example of FIG. 15, a G-PCC coder (e.g., G-PCC encoder 200 or G-PCC decoder 300) may calculate a maximum variation (maxdiff) among neighbors of a current point (i.e., points in a neighborhood of the current point) (1500). The G-PCC coder may then determine whether the neighbor count (i.e., the number of available neighbors) is greater than or equal to the maximum number of direct predictors (e.g., max_num_direct_predictors) and whether maxdiff is greater than or equal to the predetermined threshold (aps_prediction_threshold) (1502). In response to determining that either the neighbor count is less than the maximum number of direct predictors or maxdiff is less than the predetermined threshold ("NO" branch of 1502), the G-PCC coder may use the default, weighted-average predictor to predict the attribute values of the current point (1504). However, if the neighbor count is greater than or equal to the maximum number of direct predictors and maxdiff is greater than or equal to the predetermined threshold ("YES" branch of 1502), the predictor index may be signaled and G-PCC coder may predict the attribute values of the current point based on the predictor indicated by the predictor index (1506).

Figure 16:
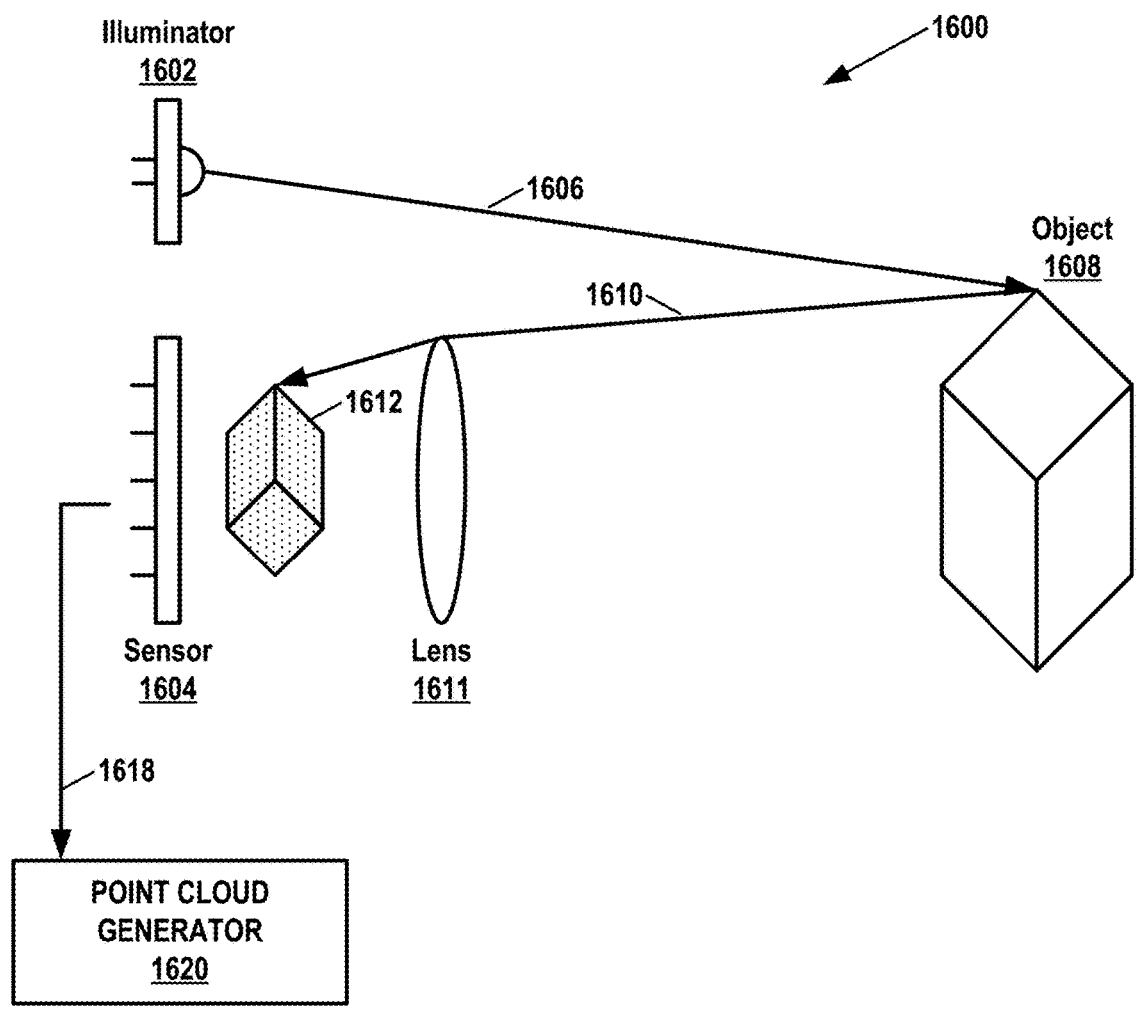
FIG. 16 is a conceptual diagram illustrating an example range-finding system that may be used with one or more techniques of this disclosure.

FIG. 16 is a conceptual diagram illustrating an example range-finding system 1600 that may be used with one or more techniques of this disclosure. In the example of FIG. 16, range-finding system 1600 includes an illuminator 1602 and a sensor 1604. Illuminator 1602 may emit light 1606. In some examples, illuminator 1602 may emit light 1606 as one or more laser beams. Light 1606 may be in one or more wavelengths, such as an infrared wavelength or a visible light wavelength. In other examples, light 1606 is not coherent, laser light. When light 1606 encounters an object, such as object 1608, light 1606 creates returning light 1610. Returning light 1610 may include backscattered and/or reflected light. Returning light 1610 may pass through a lens 1611 that directs returning light 1610 to create an image 1612 of object 1608 on sensor 1604. Sensor 1604 generates signals 1614 based on image 1612. Image 1612 may comprise a set of points (e.g., as represented by dots in image 1612 of FIG. 16).

In some examples, illuminator 1602 and sensor 1604 may be mounted on a spinning structure so that illuminator 1602 and sensor 1604 capture a 360-degree view of an environment. In other examples, range-finding system 1600 may include one or more optical components (e.g., mirrors, collimators, diffraction gratings, etc.) that enable illuminator 1602 and sensor 1604 to detect objects within a specific range (e.g., up to 360-degrees). Although the example of FIG. 16 only shows a single illuminator 1602 and sensor 1604, range-finding system 1600 may include multiple sets of illuminators and sensors.

In some examples, illuminator 1602 generates a structured light pattern. In such examples, range-finding system 1600 may include multiple sensors upon which respective images of the structured light pattern are formed. Range-finding system 1600 may use disparities between the images of the structured light pattern to determine a distance to an object 1608 from which the structured light pattern backscatters. Structured light-based range-finding systems may have a high level of accuracy (e.g., accuracy in the sub-millimeter range), when object 1608 is relatively close to sensor 1604 (e.g., 0.2 meters to 2 meters). This high level of accuracy may be useful in facial recognition applications, such as unlocking mobile devices (e.g., mobile phones, tablet computers, etc.) and for security applications.

In some examples, range-finding system 1600 comprises a time of flight (ToF)-based system. In some examples where range-finding system 1600 is a ToF-based system, illuminator 1602 generates pulses of light. In other words, illuminator 1602 may modulate the amplitude of emitted light 1606. In such examples, sensor 1604 detects returning light 1610 from the pulses of light 1606 generated by illuminator 1602. Range-finding system 1600 may then determine a distance to object 1608 from which light 1606 backscatters based on a delay between when light 1606 was emitted and detected and the known speed of light in air). In some examples, rather than (or in addition to) modulating the amplitude of the emitted light 1606, illuminator 1602 may modulate the phase of the emitted light 1404. In such examples, sensor 1604 may detect the phase of returning light 1610 from object 1608 and determine distances to points on object 1608 using the speed of light and based on time differences between when illuminator 1602 generated light 1606 at a specific phase and when sensor 1604 detected returning light 1610 at the specific phase.

In other examples, a point cloud may be generated without using illuminator 1602. For instance, in some examples, sensor 1604 of range-finding system 1600 may include two or more optical cameras. In such examples, range-finding system 1600 may use the optical cameras to capture stereo images of the environment, including object 1608. Range-finding system 1600 (e.g., point cloud generator 1620) may then calculate the disparities between locations in the stereo images. Range-finding system 1600 may then use the disparities to determine distances to the locations shown in the stereo images. From these distances, point cloud generator 1620 may generate a point cloud.

Sensors 904 may also detect other attributes of object 1608, such as color and reflectance information. In the example of FIG. 16, a point cloud generator 1620 may generate a point cloud based on signals 918 generated by sensor 1604. Range-finding system 1600 and/or point cloud generator 1620 may form part of data source 104 (FIG. 1). Point cloud generator 1620 may use the color and reflectance information to generate attributes for points of the point cloud data.

Figure 17:
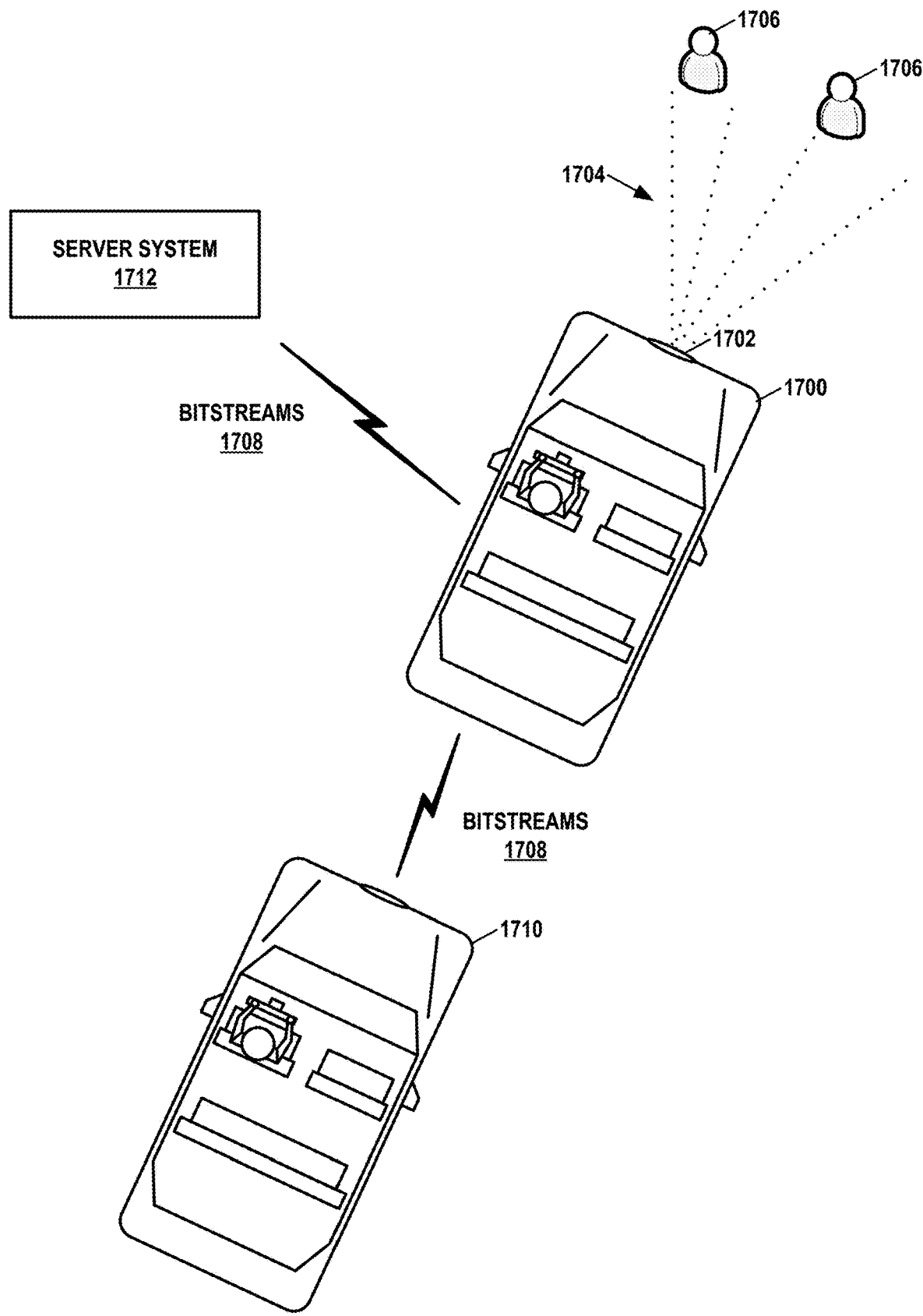
FIG. 17 is a conceptual diagram illustrating an example vehicle-based scenario in which one or more techniques of this disclosure may be used.

FIG. 17 is a conceptual diagram illustrating an example vehicle-based scenario in which one or more techniques of this disclosure may be used. In the example of FIG. 17, a vehicle 1700 includes a laser package 1702, such as a LIDAR system. Although not shown in the example of FIG. 17, vehicle 1700 may also include a data source, such as data source 104 (FIG. 1), and a G-PCC encoder, such as G-PCC encoder 200 (FIG. 1). In the example of FIG. 17, laser package 1702 emits laser beams 1704 that reflect off pedestrians 1706 or other objects in a roadway. The data source of vehicle 1700 may generate a point cloud based on signals generated by laser package 1702. The G-PCC encoder of vehicle 1700 may encode the point cloud to generate bitstreams 1708, such as geometry bitstream 203 (FIG. 2) and attribute bitstream 205 (FIG. 2). Bitstreams 1708 may include many fewer bits than the unencoded point cloud obtained by the G-PCC encoder. An output interface of vehicle 1700 (e.g., output interface 108 (FIG. 1) may transmit bitstreams 1708 to one or more other devices. Thus, vehicle 1700 may be able to transmit bitstreams 1708 to other devices more quickly than the unencoded point cloud data. Additionally, bitstreams 1708 may require less data storage capacity.

The techniques of this disclosure may further reduce the complexity associated with decoding bitstreams 1708. For instance, jointly recovering residual values and a predictor index from jointly coded values may enable a G-PCC decoder to parse bitstreams 1708 in a first step and then perform reconstruction in a second step. This may reduce the cost of implementing the G-PCC decoder.

In the example of FIG. 17, vehicle 1700 may transmit bitstreams 1708 to another vehicle 1710. Vehicle 1710 may include a G-PCC decoder, such as G-PCC decoder 300 (FIG. 1). The G-PCC decoder of vehicle 1710 may decode bitstreams 1708 to reconstruct the point cloud. Vehicle 1710 may use the reconstructed point cloud for various purposes. For instance, vehicle 1710 may determine based on the reconstructed point cloud that pedestrians 1706 are in the roadway ahead of vehicle 1700 and therefore start slowing down, e.g., even before a driver of vehicle 1710 realizes that pedestrians 1706 are in the roadway. Thus, in some examples, vehicle 1710 may perform an autonomous navigation operation, generate a notification or warning, or perform another action based on the reconstructed point cloud.

Additionally or alternatively, vehicle 1700 may transmit bitstreams 1708 to a server system 1712. Server system 1712 may use bitstreams 1708 for various purposes. For example, server system 1712 may store bitstreams 1708 for subsequent reconstruction of the point clouds. In this example, server system 1712 may use the point clouds along with other data (e.g., vehicle telemetry data generated by vehicle 1700) to train an autonomous driving system. In other example, server system 1712 may store bitstreams 1708 for subsequent reconstruction for forensic crash investigations (e.g., if vehicle 1700 collides with pedestrians 1706).

Figure 18:
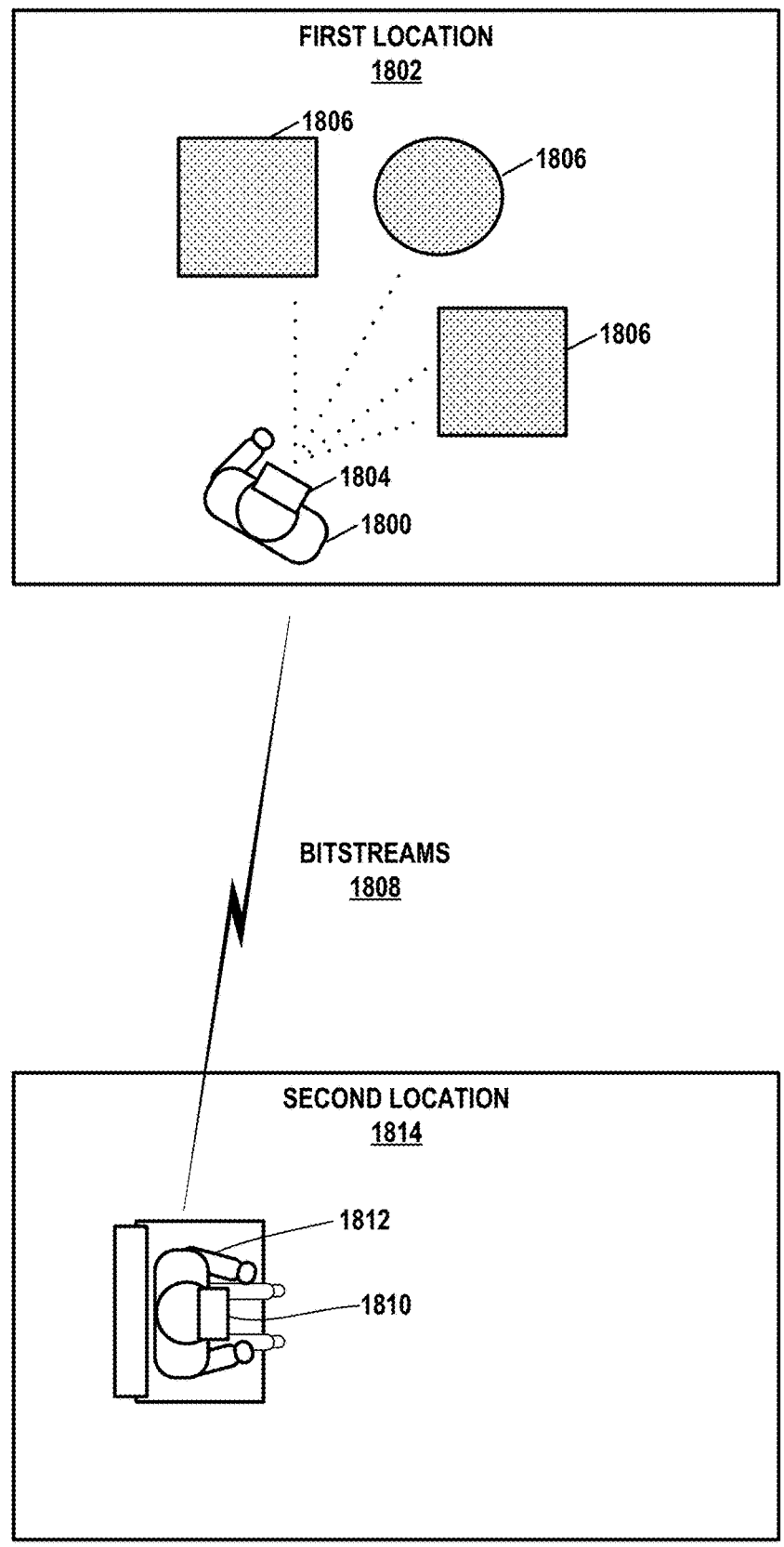
FIG. 18 is a conceptual diagram illustrating an example extended reality system in which one or more techniques of this disclosure may be used.

FIG. 18 is a conceptual diagram illustrating an example extended reality system in which one or more techniques of this disclosure may be used. Extended reality (XR) is a term used to cover a range of technologies that includes augmented reality (AR), mixed reality (MR), and virtual reality (VR). In the example of FIG. 18, a first user 1800 is located in a first location 1802. User 1800 wears an XR headset 1104. As an alternative to XR headset 1804, user 1800 may use a mobile device (e.g., mobile phone, tablet computer, etc.). XR headset 1804 may include a depth detection sensor, such as a LIDAR system, that detects positions of points on objects 1806 at location 1802. A data source of XR headset 1804 may use the signals generated by the depth detection sensor to generate a point cloud representation of objects 1806 at location 1802. XR headset 1804 may include a G-PCC encoder (e.g., G-PCC encoder 200 of FIG. 1) that is configured to encode the point cloud to generate bitstreams 1108.

The techniques of this disclosure may further reduce the complexity associated with decoding bitstreams 1808. For instance, jointly recovering residual values and a predictor index from jointly coded values may enable a G-PCC decoder to parse bitstreams 1808 in a first step and then perform reconstruction in a second step. This may reduce the cost of implementing the G-PCC decoder.

XR headset 1804 may transmit bitstreams 1808 (e.g., via a network such as the Internet) to an XR headset 1810 worn by a user 1812 at a second location 1814. XR headset 1810 may decode bitstreams 1108 to reconstruct the point cloud. XR headset 1810 may use the point cloud to generate an XR visualization (e.g., an AR, MR, VR visualization) representing objects 1806 at location 1802. Thus, in some examples, such as when XR headset 1810 generates a VR visualization, user 1812 at location 1814 may have a 3D immersive experience of location 1802. In some examples, XR headset 1810 may determine a position of a virtual object based on the reconstructed point cloud. For instance, XR headset 1810 may determine, based on the reconstructed point cloud, that an environment (e.g., location 1802) includes a flat surface and then determine that a virtual object (e.g., a cartoon character) is to be positioned on the flat surface. XR headset 1810 may generate an XR visualization in which the virtual object is at the determined position. For instance, XR headset 1810 may show the cartoon character sitting on the flat surface.

Figure 19:
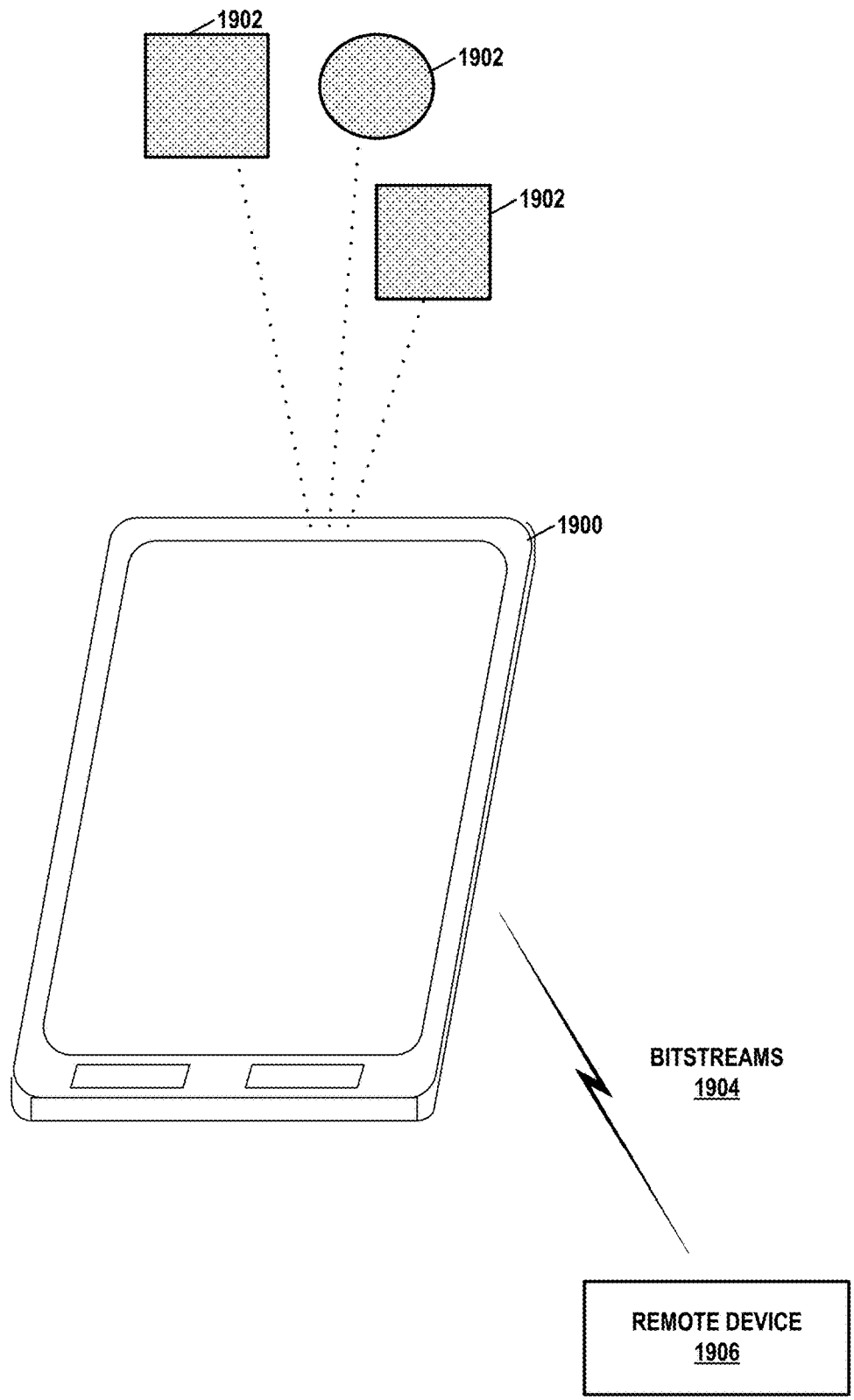
FIG. 19 is a conceptual diagram illustrating an example mobile device system in which one or more techniques of this disclosure may be used.

FIG. 19 is a conceptual diagram illustrating an example mobile device system in which one or more techniques of this disclosure may be used. In the example of FIG. 19, a mobile device 1900, such as a mobile phone or tablet computer, includes a depth detection sensor, such as a LIDAR system, that detects positions of points on objects 1902 in an environment of mobile device 1900. A data source of mobile device 1900 may use the signals generated by the depth detection sensor to generate a point cloud representation of objects 1902. Mobile device 1900 may include a G-PCC encoder (e.g., G-PCC encoder 200 of FIG. 1) that is configured to encode the point cloud to generate bitstreams 1904. In the example of FIG. 19, mobile device 1900 may transmit bitstreams 1904 to a remote device 1906, such as a server system or other mobile device. Remote device 1906 may decode bitstreams 1904 to reconstruct the point cloud. Remote device 1906 may use the point cloud for various purposes. For example, remote device 1906 may use the point cloud to generate a map of environment of mobile device 1900. For instance, remote device 1906 may generate a map of an interior of a building based on the reconstructed point cloud. In another example, remote device 1906 may generate imagery (e.g., computer graphics) based on the point cloud. For instance, remote device 1906 may use points of the point cloud as vertices of polygons and use color attributes of the points as the basis for shading the polygons. In some examples, remote device 1906 may perform facial recognition using the point cloud.

The techniques of this disclosure may further reduce the complexity associated with decoding bitstreams 1904. For instance, jointly recovering residual values and a predictor index from jointly coded values may enable a G-PCC decoder to parse bitstreams 1904 in a first step and then perform reconstruction in a second step. This may reduce the cost of implementing the G-PCC decoder.

The following is a non-limiting list of aspects that are in accordance with one or more techniques of this disclosure.

Aspect 1A: A method of decoding point cloud data includes determining, based on quantized attribute residual values for points in a point cloud, whether to (i) determine that a predicted attribute value of a current point of the point cloud is a weighted average of a set of neighbor points or (ii) determine the predicted attribute value of the current point based on a value signaled in a bitstream; and reconstructing an attribute value of the current point based on the predicted attribute value of the current point.

Aspect 2A: A method of encoding point cloud data includes determining, based on quantized attribute residual values for points in a point cloud, whether to (i) determine that a predicted attribute value of a current point of the point cloud is a weighted average of a set of neighbor points or (ii) signal a value in a bitstream that indicates an index of the predicted attribute value of the current point; and determining an attribute residual value for the current point based on the predicted attribute value of the current point.

Aspect 3A: A method of decoding point cloud data includes deriving, based on a parity of attribute residual values for neighboring points in a point cloud, a predictor index for a current point of the point cloud; determining, based on the predictor index for the current point, a predicted attribute value for the current point; and reconstructing an attribute value of the current point based on the predicted attribute value of the current point.

Aspect 4A: A method of encoding point cloud data includes deriving, based on a parity of attribute residual values for neighboring points in a point cloud, a predictor index for a current point of the point cloud; determining, based on the predictor index for the current point, a predicted attribute value for the current point; and determining an attribute residual value for the current point based on the predicted attribute value of the current point.

Aspect 5A: The method of aspect 3A or aspect 4A, wherein deriving the predictor index for the current point comprises: applying a one-to-one mapping between the parity and the predictor index for the current point to determine the predictor index for the current point based on the parity of the attribute residual values for the neighboring points in the point cloud.

Aspect 6A: The method of aspect 5A, wherein the mapping is based on probabilities of prediction indices in a plurality of prediction indices.

Aspect 7A: The method of aspect 6A, further comprising determining the probabilities of the prediction indices based on an exponential moving average.

Aspect 8A: The method of aspect 6A, further includes updating the probabilities after deriving the predictor index for the current point; and resorting the mapping based on the updated probabilities.

Aspect 9A: A method of decoding point cloud data includes determining, based on a comparison of a variation of reconstructed attribute values for neighboring points of a point cloud, an order of candidates in a list of candidates, wherein the list of candidates includes a candidate for a weighted average of the reconstructed attribute values for the neighboring points and candidates for individual reconstructed attribute values for the neighboring points; determining a predictor index for a current point; determining, based on an indicated candidate in the list of candidates, a predicted attribute value for the current point, wherein the predictor index for the current point indicates the indicated candidate; and reconstructing an attribute value of the current point based on the predicted attribute value of the current point.

Aspect 10A: A method of encoding point cloud data includes determining, based on a comparison of a variation of reconstructed attribute values for neighboring points of a point cloud, an order of candidates in a list of candidates, wherein the list of candidates includes a candidate for a weighted average of the reconstructed attribute values for the neighboring points and candidates for individual reconstructed attribute values for the neighboring points; determining a predictor index for a current point; determining, based on an indicated candidate in the list of candidates, a predicted attribute value for the current point, wherein the predictor index for the current point indicates the indicated candidate; and determining an attribute residual value for the current point based on the predicted attribute value of the current point.

Aspect 11A: A method of decoding point cloud data includes determining that a list of candidates one or more multiple direct predictors, each of the one or more direct predictors being an attribute value of one of neighboring points; determining a predictor index for a current point; determining, based on an indicated candidate in the list of candidates, a predicted attribute value for the current point, wherein the predictor index for the current point indicates the indicated candidate; and reconstructing an attribute value of the current point based on the predicted attribute value of the current point.

Aspect 12A: A method of encoding point cloud data includes determining a predictor index for a current point; determining, based on an indicated candidate in the list of candidates, a predicted attribute value for the current point, wherein the predictor index for the current point indicates the indicated candidate; and determining an attribute residual value for the current point based on the predicted attribute value of the current point.

Aspect 13A: The method of aspect 11A or 12A, wherein a standard imposes a constraint on the lifting adaptive prediction threshold syntax element that requires the lifting adaptive prediction threshold syntax element to be in a range of 0 to 1<<max(an attribute bitdepth, a secondary attribute_bitdepth).

Aspect 14A: The method of aspect 13A, further comprising generating the point cloud.

Aspect 15A: A method for decoding point cloud data includes based on a comparison of a maximum difference value and a threshold, applying an inverse function to a set of one or more jointly coded values to recover (i) residual values for attribute values of a current point and (ii) a predictor index; determining predicted attribute values based on the predictor index; and reconstructing the attribute values of the current point based on the residual values and the predicted attribute values.

Aspect 16A: The method of aspect 15A, wherein applying the inverse function comprises: reconstructing a first residual value based on a first jointly coded value of the set of jointly coded values; reconstructing a second residual value based on a second jointly coded value of the set of jointly coded values; and determining a predictor index based on the first and second jointly coded values of the set of jointly coded values.

Aspect 17A: The method of aspect 16A, wherein the predictor index is determined based on modulo 2 of the first jointly coded value and the second jointly coded value.

Aspect 18A: The method of aspect 16A or 17A, wherein reconstructing the first residual value comprises calculating res1=sign(res1')*((|res1'|% 2))/2) where res1 is the first residual value and res1' is the first jointly coded value, wherein reconstructing the first residual value comprises calculating res2=(|res1'|%2>0)? sign(res2')*((|res2'|−(|res2'|% 2))/2):res2' where res2 is the second residual value and res2' is the second jointly coded value, wherein applying the first inverse function further comprises reconstructing a third residual value by calculating: res0=(|res1'|%2>0&&|res2'|%2>0)? sign(res0')*((|res0'|−(|res0'|% 2))/2):res0' where res0 is the third residual value, res1' is the first jointly coded value, res2' is the second jointly coded value, res0' is a third jointly coded value in the set of jointly coded values, and wherein determining the predictor index comprises calculating: sigIndex=(|res1'|%2))+((|res1'|%2>0)? (|res2'|% (2)):0)+((|res1'|%2>0 &&|res2'|%2>0)? (|res0'|% (2)): 0) where sigIndex is the predictor index, res1' is the first jointly coded value, res2' is the second jointly coded value, res0' is the third jointly coded value in the set of jointly coded values.

Aspect 19A: The method of any of aspects 15A-18A, wherein determining the predicted attribute values comprises: determining, based on a syntax element, whether a list of predictors includes a default predictor, each predictor in the list of predictors indicating a respective set of attribute values; determining, based on the predictor index, a predictor in the list of predictors, wherein the determined predictor indicates the predicted attribute values.

Aspect 20A: A method of encoding point cloud data includes based on a comparison of a maximum difference value and a threshold, determining a predictor index for a current point of the point cloud that indicates a method for determining how to predict attribute values of the current point based on attribute values of one or more neighbor points; determining a set of residual values for the attribute values of the current point; applying a function that generates a set of one or more jointly coded values based on (i) the set of residual values for attribute values of the current point and (ii) the predictor index; and signaling the jointly coded values.

Aspect 21A: The method of aspect 20A, wherein applying the function comprises determining: res1'=sign(res1)*(|res1|*2+(sigIndex>0)) res2'=(sigIndex>0)? sign(res2)*(|res2|*2+(sigIndex−1)%2):res2 res0'=(sigIndex>1)? sign(res0)*(|res0|*2+(sigIndex−2)%2):res0 where res1' is a first jointly coded value in the set of jointly coded values, res2' is a second jointly coded value in the set of jointly coded values, res0' is a third jointly coded value in the set of jointly coded values, res1 is a first residual value in the set of residual values, res2 is a second residual value in the set of residual values, res0 is a third residual value in the set of residual values, and sigIndex is the predictor index.

Aspect 22A: The method of aspects 20A-21A, further includes determining a predictor in a list of predictors, wherein each predictor in the list of predictors indicates a respective set of attribute values, wherein the predictor index indicates a predictor in the list of predictors that indicates predicted attribute values for the current point; and signaling a syntax element that indicates whether the list of predictors includes a default predictor.

Aspect 23A: A method for decoding point cloud data includes based on a number of available neighbors for a current point of a point cloud being greater than 1 and a maximum difference value being greater than or equal to a threshold, determining predicted attribute values for the current point based on a predictor index; and reconstructing attribute values of the current point based on the predicted attribute values.

Aspect 24A: A method of encoding point cloud data includes based on a number of available neighbors for a current point of a point cloud being greater than 1 and a maximum difference value being greater than or equal to a threshold, determining a predictor index for the current point that indicates a method for determining how to predict predicted attribute values for the current point based on attribute values of one or more neighbor points; determining the predicted attribute values for the current point by applying the indicated method; determining residual attribute values for the current point based on the predicted attribute values for the current point; and signaling the predictor index and the residual attribute values for the current point.

Aspect 25A: A method for decoding point cloud data includes based on a number of available neighbors for a current point of a point cloud being greater than a maximum number of direct predictors and a maximum difference value being greater than or equal to a threshold, determining predicted attribute values for the current point based on a predictor index that indicates a method for determining how to predict attribute values of the current point based on attribute values of one or more neighbor points for the current point; and reconstructing the attribute values of the current point based on the predicted attribute values for the current point.

Aspect 26A: A method of encoding point cloud data includes based on a number of available neighbors for a current point of a point cloud being greater than 1 and a maximum difference value being greater than or equal to a threshold, determining a predictor index for the current point that indicates a method for determining how to predict predicted attribute values for the current point based on attribute values of one or more neighbor points for the current point; determining the predicted attribute values for the current point by applying the indicated method; determining residual attribute values for the current point based on the predicted attribute values for the current point; and signaling the predictor index and the residual attribute values for the current point.

Aspect 28A: The device of aspect 27A, wherein the one or more means comprise one or more processors implemented in circuitry.

Aspect 29A: The device of aspects 27A or 28A, further comprising a memory to store the data representing the point cloud.

Aspect 30A: The device of aspects 27A-29A, wherein the device comprises a decoder.

Aspect 31A: The device of aspects 27A-30A, wherein the device comprises an encoder.

Aspect 32A: The device of aspects 27A-31A, further comprising a device to generate the point cloud data.

Aspect 33A: The device of aspects 27A-32A, further comprising a display to present imagery based on the point cloud data.

Aspect 1B: A method for decoding point cloud data includes based on a comparison of a maximum difference value and a threshold, applying an inverse function to a set of one or more jointly coded values to recover (i) residual values for attribute values of a current point of the point cloud data and (ii) a predictor index that indicates a predictor in a predictor list, wherein predictors in the predictor list are based on attribute values of one or more neighbor points; determining predicted attribute values based on the predictor index; and reconstructing the attribute values of the current point based on the residual values and the predicted attribute values.

Aspect 2B: The method of aspect 1B, wherein applying the inverse function comprises: reconstructing a first residual value based on a first jointly coded value of the set of jointly coded values; reconstructing a second residual value based on a second jointly coded value of the set of jointly coded values; and determining the predictor index based on the first and second jointly coded values of the set of jointly coded values.

Aspect 3B: The method of aspect 2B, wherein determining the predictor index comprises determining the predictor index based on modulo 2 of the first jointly coded value and the second jointly coded value.

Aspect 4B: The method of aspect 2B, wherein, based on a number of predictors in the predictor list being equal to 4: reconstructing the first residual value comprises calculating: res1=sign(res1')*(|res1'|>>1) where res1 is the first residual value and res1' is the first jointly coded value; reconstructing the second residual value comprises calculating: res2=sign(res2')*(|res2'|>>1) where res2 is the second residual value and res2' is the second jointly coded value; and determining the predictor index by calculating: sigIndex=(|res1'|&1)<<1+(|res2'|&1) where sigIndex is the predictor index, res1' is the first jointly coded value, and res2' is the second jointly coded value.

Aspect 5B: The method of any of aspects 2B or 4B, wherein based on a number of predictors in the predictor list being equal to 3: reconstructing the first residual value comprises calculating: res1=sign(res1')*(|res1'|>>1) where res1 is the first residual value and res1' is the first jointly coded value; reconstructing the second residual value comprises calculating: res2=(|res1'|&1>0)? sign(res2')*(|res2'|>>1): res2' where res2 is the second residual value and res2' is the second jointly coded value; and determining the predictor index comprises calculating: sigIndex=(|res1'|&1))+((|res1'|&1>0)? (|res2'|&1):0) where sigIndex is the predictor index, res1' is the first jointly coded value, and res2' is the second jointly coded value.

Aspect 6B: The method of any of aspects 2B or 4B-5B, wherein based on a number of predictors in the predictor list being equal to 2: reconstructing the first residual value comprises calculating: res1=sign(res1')*(|res1'|>>1) where res1 is the first residual value and res1' is the first jointly coded value; reconstructing the second residual value comprises calculating: res2=res2' where res2 is the second residual value and res2' is the second jointly coded value; and determining the predictor index comprises calculating: sigIndex=(|res1'|&1)) where sigIndex is the predictor index and res1' is the first jointly coded value.

Aspect 7B: The method of any of aspects 1B-6B, wherein determining the predicted attribute values comprises: determining, based on a syntax element, whether a list of predictors includes a default predictor, each predictor in the list of predictors indicating a respective set of attribute values; and determining, based on the predictor index, a predictor in the list of predictors, wherein the determined predictor indicates the predicted attribute values.

Aspect 8B: The method of any of aspect 1B-7B, wherein the threshold is a lifting adaptive prediction threshold, and the method further comprises determining, based on a first syntax element indicating that a maximum number of direct predictors is greater than 0, that a bitstream includes a lifting adaptive prediction threshold syntax element that indicates the lifting adaptive prediction threshold.

Aspect 9B: The method of any of aspects 1B or 7B-8B, wherein applying the inverse function comprises: reconstructing a residual value based on a jointly coded value of the set of jointly coded values; and determining the predictor index based on the jointly coded value of the set of jointly coded values.

Aspect 10B: A method of encoding point cloud data includes based on a maximum difference value being less than a threshold, determining a predictor index for a current point of the point cloud that indicates a predictor in a predictor list, wherein predictors in the predictor list are based on attribute values of one or more neighbor points; determining a set of residual values for the attribute values of the current point; applying a function that generates a set of one or more jointly coded values based on (i) the set of residual values for attribute values of the current point and (ii) the predictor index; and signaling the jointly coded values.

Aspect 11B: The method of aspect 10B, wherein, based on a number of predictors in the predictor list being equal to 4, applying the function comprises determining: res1'=sign(res1)*(|res1|<<1+sigIndex>>1) res2'=sign(res2)*(|res2|*<<1+sigIndex&1) where res1' is a first jointly coded value in the set of jointly coded values, res2' is a second jointly coded value in the set of jointly coded values, res1 is a first residual value in the set of residual values, res2 is a second residual value in the set of residual values, and sigIndex is the predictor index.

Aspect 12B: The method of any of aspects 10B-11B, wherein, based on a number of predictors in the predictor list being equal to 3, applying the function comprises determining: res1'=sign(res1)*(|res1|<<1+(sigIndex>0)) res2'=(sigIndex>0)? sign(res2)*(|res2|<<1+(sigIndex−1)):res2 where res1' is a first jointly coded value in the set of jointly coded values, res2' is a second jointly coded value in the set of jointly coded values, res1 is a first residual value in the set of residual values, res2 is a second residual value in the set of residual values, and sigIndex is the predictor index.

Aspect 13B: The method of any of aspects 10B-12B, wherein, based on a number of predictors in the predictor list being equal to 2, applying the function comprises determining: res1'=sign(res1)*(|res1|<<1+(sigIndex & 1)) res2'=res2 where res1' is a first jointly coded value in the set of jointly coded values, res2' is a second jointly coded value in the set of jointly coded values, res1 is a first residual value in the set of residual values, res2 is a second residual value in the set of residual values, and sigIndex is the predictor index.

Aspect 14B: The method of any of aspects 10B-13B, further includes determining a predictor in a list of predictors, wherein each predictor in the list of predictors indicates a respective set of attribute values, wherein the predictor index indicates a predictor in the list of predictors that indicates predicted attribute values for the current point; and signaling a syntax element that indicates whether the list of predictors includes a default predictor.

Aspect 15B: The method of any of aspects 10B-14B, wherein the threshold is a lifting adaptive prediction threshold, and the method further comprises: based on a maximum number of direct predictors being greater than 0, signaling, in a bitstream, a lifting adaptive prediction threshold syntax element that indicates the lifting adaptive prediction threshold.

Aspect 16B: A device for decoding a point cloud includes a memory to store the data representing the point cloud; and one or more processors coupled to the memory and implemented in circuitry, the one or more processors configured to: based on a comparison of a maximum difference value and a threshold, apply an inverse function to a set of one or more jointly coded values to recover (i) residual values for attribute values of a current point and (ii) a predictor index that indicates a predictor in a predictor list, wherein predictors in the predictor list are based on attribute values of one or more neighbor points; determine predicted attribute values based on the predictor index; and reconstruct the attribute values of the current point based on the residual values and the predicted attribute values.

Aspect 17B: The device of aspect 16B, wherein the one or more processors are configured to, as part of applying the inverse function: reconstruct a first residual value based on a first jointly coded value of the set of jointly coded values; reconstruct a second residual value based on a second jointly coded value of the set of jointly coded values; and determine a predictor index based on the first and second jointly coded values of the set of jointly coded values.

Aspect 18B: The device of aspect 17B, wherein the one or more processors are configured to, as part of determining the predictor index, determine the predictor index based on modulo 2 of the first jointly coded value and the second jointly coded value.

Aspect 19B: The device of aspect 17B, wherein, based on a number of predictors in the predictor list being equal to 4: the one or more processors are configured to, as part of reconstructing the first residual value, calculate: res1=sign(res1')*(|res1'|>>1) where res1 is the first residual value and res1' is the first jointly coded value; the one or more processors are configured to, as part of reconstructing the second residual value, calculate: res2=sign(res2')*(|res2'|>>1) where res2 is the second residual value and res2' is the second jointly coded value; and the one or more processors are configured to, as part of determining the predictor index, calculate: sigIndex=(|res1'|&1)<<1+(|res2'|&1) where sigIndex is the predictor index, res1' is the first jointly coded value, and res2' is the second jointly coded value.

Aspect 20B: The device of any of aspects 17B or 19B, wherein, based on a number of predictors in the predictor list being equal to 3: the one or more processors are configured to, as part of reconstructing the first residual value, calculate: res1=sign(res1')*(|res1'|>>1) where res1 is the first residual value and res1' is the first jointly coded value; the one or more processors are configured to, as part of reconstructing the second residual value, calculate: res2=(|res1'|&1>0)? sign(res2')*(|res2'|>>1):res2' where res2 is the second residual value and res2' is the second jointly coded value; and the one or more processors are configured to, as part of determining the predictor index, calculate: sigIndex= (|res1'|&1))+((|res1'|&1>0)? (|res2'|&1):0) where sigIndex is the predictor index, res1' is the first jointly coded value, and res2' is the second jointly coded value.

Aspect 21B: The device of any of aspects 17B or 19B-20B, wherein, based on a number of predictors in the predictor list being equal to 2: the one or more processors are configured to, as part of reconstructing the first residual value, calculate: res1=sign(res1')*(|res1'|>>1) where res1 is the first residual value and res1' is the first jointly coded value, the one or more processors are configured to, as part of reconstructing the second residual value, calculate: res2=res2' where res2 is the second residual value and res2' is the second jointly coded value; and the one or more processors are configured to, as part of determining the predictor index, calculate: sigIndex=(|res1'|&1)) where sigIndex is the predictor index and res1' is the first jointly coded value.

Aspect 22B: The device of any of aspects 16B-21B, wherein the one or more processors are configured to, as part of determining the predicted attribute values: determine, based on a syntax element, whether a list of predictors includes a default predictor, each predictor in the list of predictors indicating a respective set of attribute values; and determine, based on the predictor index, a predictor in the list of predictors, wherein the determined predictor indicates the predicted attribute values.

Aspect 23B: The device of any of aspects 16B-22B, wherein the threshold is a lifting adaptive prediction threshold, and the one or more processors are further configured to determine, based on a first syntax element indicating that a maximum number of direct predictors is greater than 0, that a bitstream includes a lifting adaptive prediction threshold syntax element that indicates the lifting adaptive prediction threshold.

Aspect 24B: The device of any of aspects 16B-23B, further comprising a display to present imagery based on the point cloud data.

Aspect 25B: The device of any of aspects 16B or 22B-24B, wherein the one or more processors are configured to, as part of applying the inverse function: reconstruct a residual value based on a jointly coded value of the set of jointly coded values; and determine a predictor index based on the jointly coded value of the set of jointly coded values.

Aspect 26B: A device for encoding a point cloud includes a memory to store the data representing the point cloud; and one or more processors coupled to the memory and implemented in circuitry, the one or more processors configured to: based on a maximum difference value being less than a threshold, determine a predictor index for a current point of the point cloud that indicates a predictor in a predictor list, wherein predictors in the predictor list are based on attribute values of one or more neighbor points; determine a set of residual values for the attribute values of the current point; apply a function that generates a set of one or more jointly coded values based on (i) the set of residual values for attribute values of the current point and (ii) the predictor index; and signal the jointly coded values.

Aspect 27B: The device of aspect 26B, wherein, based on a number of predictors in the predictor list being equal to 4, the one or more processors are configured to, as part of applying the function, determine: res1'=sign(res1)* (|res1|<<+sigIndex>>1) res2'=sign(res2)*(|res2|*<<1+sig-Index&1) where res1' is a first jointly coded value in the set of jointly coded values, res2' is a second jointly coded value in the set of jointly coded values, res1 is a first residual value in the set of residual values, res2 is a second residual value in the set of residual values, and sigIndex is the predictor index.

Aspect 28B: The device of any of aspects 26B-27B, wherein, based on a number of predictors in the predictor list being equal to 3, the one or more processors are configured to, as part of applying the function, determine: res1'=sign (res1)*(|res1|<<1+(sigIndex>0)) res2'=(sigIndex>0)? sign (res2)*(|res2|<<1+(sigIndex−1)):res2 where res1' is a first jointly coded value in the set of jointly coded values, res2' is a second jointly coded value in the set of jointly coded values, res1 is a first residual value in the set of residual values, res2 is a second residual value in the set of residual values, and sigIndex is the predictor index.

Aspect 29B: The device of any of aspects 26B-28B, wherein, based on a number of predictors in the predictor list being equal to 2, the one or more processors are configured to, as part of applying the function, determine: res1'=sign (res1)*(|res1|<<1+(sigIndex & 1)) res2'=res2 where res1' is a first jointly coded value in the set of jointly coded values, res2' is a second jointly coded value in the set of jointly coded values, res1 is a first residual value in the set of residual values, res2 is a second residual value in the set of residual values, and sigIndex is the predictor index.

Aspect 30B: The device of any of aspects 26B-29B, wherein the one or more processors are further configured to: determine a predictor in a list of predictors, wherein each predictor in the list of predictors indicates a respective set of attribute values, wherein the predictor index indicates a predictor in the list of predictors that indicates predicted attribute values for the current point; and signal a syntax element that indicates whether the list of predictors includes a default predictor.

Aspect 31B: The device of any of aspects 26B-30B, wherein the threshold is a lifting adaptive prediction threshold, and the one or more processors are further configured to, based on a maximum number of direct predictors being greater than 0, signal, in a bitstream, a lifting adaptive prediction threshold syntax element that indicates the lifting adaptive prediction threshold.

Aspect 32B: The device of any of aspects 26B-31B, further comprising a device to generate the point cloud data.

Aspect 33B: A device for decoding a point cloud includes means for applying, based on a comparison of a maximum difference value and a threshold, an inverse function to a set of one or more jointly coded values to recover (i) residual values for attribute values of a current point of point cloud data and (ii) a predictor index that indicates a predictor in a predictor list, wherein predictors in the predictor list are based on attribute values of one or more neighbor points; means for determining predicted attribute values based on the predictor index; and means for reconstructing the attribute values of the current point based on the residual values and the predicted attribute values.

Aspect 34B: A device for encoding a point cloud includes means for determining, based on a maximum difference value being less than a threshold, a predictor index for a current point of the point cloud that indicates a predictor in a predictor list, wherein predictors in the predictor list are based on attribute values of one or more neighbor points; means for determining a set of residual values for the attribute values of the current point; means for applying a function that generates a set of one or more jointly coded values based on (i) the set of residual values for attribute values of the current point and (ii) the predictor index; and means for signaling the jointly coded values.

Aspect 35B: A computer-readable storage medium having stored thereon instructions that, when executed, cause one or more processors to: based on a comparison of a maximum difference value and a threshold, apply an inverse function to a set of one or more jointly coded values to recover (i) residual values for attribute values of a current point of point cloud data and (ii) a predictor index that indicates a predictor in a predictor list, wherein predictors in the predictor list are based on attribute values of one or more neighbor points; determine predicted attribute values based on the predictor index; and reconstruct the attribute values of the current point based on the residual values and the predicted attribute values.

Aspect 36B: A computer-readable storage medium having stored thereon instructions that, when executed, cause one or more processors to: based on a maximum difference value being less than a threshold, determine a predictor index for a current point of the point cloud that indicates a predictor in a predictor list, wherein predictors in the predictor list are based on attribute values of one or more neighbor points; determine a set of residual values for the attribute values of the current point; apply a function that generates a set of one or more jointly coded values based on (i) the set of residual values for attribute values of the current point and (ii) the predictor index; and signal the jointly coded values.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for decoding point cloud data, the method comprising:
based on a comparison of a maximum difference value and a threshold;
reconstructing, based on a first jointly coded value, a first residual value of a current point of a point cloud;
reconstructing, based on a second jointly coded value, a second residual value of the current point; and
determining a predictor index based on the first and second jointly coded values, wherein the predictor index indicates a predictor in a predictor list, wherein predictors in the predictor list are based on attribute values of one or more neighbor points;
determining predicted attribute values based on the predictor index; and
reconstructing attribute values of the current point based on the first and second residual values and the predicted attribute values.

2. The method of claim 1, wherein determining the predictor index comprises determining the predictor index based on modulo 2 of the first jointly coded value and the second jointly coded value.

3. The method of claim 1, wherein, based on a quantity of predictors in the predictor list being equal to 4:

reconstructing the first residual value comprises calculating:

$$res1 = \text{sign}(res1')*(|res1'| \gg 1)$$

where res1 is the first residual value and res1' is the first jointly coded value;

reconstructing the second residual value comprises calculating:

$$res2 = \text{sign}(res2')*(|res2'| \gg 1)$$

where res2 is the second residual value and res2' is the second jointly coded value; and determining the predictor index comprises calculating:

$$\text{sigIndex} = (|res1'|\&1) \ll 1 + (|res2'|\&1)$$

where sigIndex is the predictor index, res1' is the first jointly coded value, and res2' is the second jointly coded value.

4. The method of claim 1, wherein based on a quantity of predictors in the predictor list being equal to 3:

reconstructing the first residual value comprises calculating:

$$res1 = \text{sign}(res1')*(|res1'| \gg 1)$$

where res1 is the first residual value and res1' is the first jointly coded value;

reconstructing the second residual value comprises calculating:

$$res2 = (|res1'|\&1 > 0)?\text{sign}(res2')*(|res2'| \gg 1):res2'$$

where res2 is the second residual value and res2' is the second jointly coded value; and determining the predictor index comprises calculating:

$$\text{sigIndex} = (|res1'|\&1) + ((|res1'|\&1 > 0)?(|res2'|\&1):0)$$

where sigIndex is the predictor index, res1' is the first jointly coded value, and res2' is the second jointly coded value.

5. The method of claim 1, wherein based on a quantity of predictors in the predictor list being equal to 2:

reconstructing the first residual value comprises calculating:

$$res1 = \text{sign}(res1')*(|res1'| \gg 1)$$

where res1 is the first residual value and res1' is the first jointly coded value;

reconstructing the second residual value comprises calculating:

$$res2 = res2'$$

where res2 is the second residual value and res2' is the second jointly coded value; and determining the predictor index comprises calculating:

$$\text{sigIndex} = (|res1'|\&1))$$

where sigIndex is the predictor index and res1' is the first jointly coded value.

6. The method of claim 1, wherein determining the predicted attribute values comprises:

determining, based on a syntax element, whether the predictor list includes a default predictor, each predictor in the predictor list indicating a respective set of attribute values; and determining, based on the predictor index, the predictor in the predictor list, wherein the predictor indicates the predicted attribute values.

7. The method of claim 1, wherein the threshold is a lifting adaptive prediction threshold, and the method further comprises determining, based on a first syntax element indicating that a maximum number of direct predictors is greater than 0, that a bitstream includes a lifting adaptive prediction threshold syntax element that indicates the lifting adaptive prediction threshold.

8. A method of encoding a point cloud, the method comprising:

based on a maximum difference value being less than a threshold, determining a predictor index for a current point of the point cloud that indicates a predictor in a predictor list, wherein predictors in the predictor list are based on attribute values of one or more neighbor points;

generating a first jointly coded value based on (i) a first residual value for attribute values of the current point and (ii) the predictor index;

generating a second jointly coded value based on (i) a second residual value for the attribute values of the current point and (ii) the predictor index; and signaling the first and second jointly coded values.

9. The method of claim 8, wherein, based on a quantity of predictors in the predictor list being equal to 4;

generating the first jointly coded value comprises determining:

$$res1' = \text{sign}(res1)*(|res1| \ll 1 + \text{sigIndex} \gg 1)$$

generating the second jointly coded value comprises determining:

$$res2' = \text{sign}(res2)*(|res2|* \ll 1 + \text{sigIndex}\&1)$$

where res1' is the first jointly coded value, res2' is the second jointly coded value, res1 is the first residual value, res2 is the second residual value, and sigIndex is the predictor index.

10. The method of claim 8, wherein, based on a quantity of predictors in the predictor list being equal to 3;

generating the first jointly coded value comprises determining:

$$res1' = \text{sign}(res1)*(|res1| \ll 1 + (\text{sigIndex} > 0))$$

generating the second jointly coded value comprises determining:

$$res2' = (\text{sigIndex} > 0)?\text{sign}(res2)*(|res2| \ll 1 + (\text{sigIndex} - 1)):res2$$

where res1' is the first jointly coded value, res2' is the second jointly coded value, res1 is the first residual value, res2 is the second residual value, and sigIndex is the predictor index.

11. The method of claim 8, wherein, based on a quantity of predictors in the predictor list being equal to 2;

generating the first jointly coded value comprises determining:

$$res1' = \text{sign}(res1)*(|res1| \ll 1 + (\text{sigIndex}\&1))$$

generating the second jointly coded value comprises determining:

$$res2' = res2$$

where res1' is the first jointly coded value, res2' is the second jointly coded value, res1 is the first residual value, res2 is the second residual value, and sigIndex is the predictor index.

12. The method of claim 8, further comprising:

determining a predictor in the predictor list, wherein each predictor in the predictor list of predictors indicates a respective set of attribute values, wherein the predictor indicates predicted attribute values for the current point; and signaling a syntax element that indicates whether the predictor list includes a default predictor.

13. The method of claim 8, wherein the threshold is a lifting adaptive prediction threshold, and the method further comprises:
   based on a maximum number of direct predictors being greater than 0, signaling, in a bitstream, a lifting adaptive prediction threshold syntax element that indicates the lifting adaptive prediction threshold.

14. A device for decoding a point cloud, the device comprising:
   a memory to store point cloud data representing the point cloud; and
   one or more processors coupled to the memory and implemented in circuitry, the one or more processors configured to:
      based on a comparison of a maximum difference value and a threshold;
         reconstruct, based on a first jointly coded value, a first residual value of a current point of the point cloud;
         reconstruct, based on a second jointly coded value, a second residual value of the current point; and
         determine a predictor index based on the first and second jointly coded values, wherein the predictor index indicates a predictor in a predictor list, wherein predictors in the predictor list are based on attribute values of one or more neighbor points;
      determine predicted attribute values based on the predictor index; and
      reconstruct attribute values of the current point based on the first and second residual values and the predicted attribute values.

15. The device of claim 14, wherein the one or more processors are configured to, as part of determining the predictor index, determine the predictor index based on modulo 2 of the first jointly coded value and the second jointly coded value.

16. The device of claim 14, wherein, based on a quantity of predictors in the predictor list being equal to 4:
   the one or more processors are configured to, as part of reconstructing the first residual value, calculate:

$res1 = \text{sign}(res1') * (|res1'| >> 1)$ where res1 is the first residual value and res1' is the first jointly coded value;
   the one or more processors are configured to, as part of reconstructing the second residual value, calculate:

$res2 = \text{sign}(res2') * (|res2'| >> 1)$ where res2 is the second residual value and res2' is the second jointly coded value; and
   the one or more processors are configured to, as part of determining the predictor index, calculate:

$\text{sigIndex} = (|res1'| \& 1) << 1 + (|res2'| \& 1)$ where sigIndex is the predictor index, res1' is the first jointly coded value, and res2' is the second jointly coded value.

17. The device of claim 14, wherein, based on a quantity of predictors in the predictor list being equal to 3:
   the one or more processors are configured to, as part of reconstructing the first residual value, calculate:

$res1 = \text{sign}(res1') * (|res1'| >> 1)$ where res1 is the first residual value and res1' is the first jointly coded value;
   the one or more processors are configured to, as part of reconstructing the second residual value, calculate:

$res2 = (|res1'| \& 1 > 0)?\text{sign}(res2') * (|res2'| >> 1):res2'$ where res2 is the second residual value and res2' is the second jointly coded value; and
   the one or more processors are configured to, as part of determining the predictor index, calculate:

$\text{sigIndex} = (|res1'| \& 1) + ((|res1'| \& 1 > 0)?(|res2'| \& 1):0)$ where sigIndex is the predictor index, res1' is the first jointly coded value, and res2' is the second jointly coded value.

18. The device of claim 14, wherein, based on a quantity of predictors in the predictor list being equal to 2:
   the one or more processors are configured to, as part of reconstructing the first residual value, calculate:

$res1 = \text{sign}(res1') * (|res1'| >> 1)$ where res1 is the first residual value and res1' is the first jointly coded value,
   the one or more processors are configured to, as part of reconstructing the second residual value, calculate:

$res2 = res2'$ where res2 is the second residual value and res2' is the second jointly coded value; and
   the one or more processors are configured to, as part of determining the predictor index, calculate:

$\text{sigIndex} = (|res1'| \& 1)$ where sigIndex is the predictor index and res1' is the first jointly coded value.

19. The device of claim 14, wherein the one or more processors are configured to, as part of determining the predicted attribute values:
   determine, based on a syntax element, whether the predictor list includes a default predictor, each predictor in the predictor list indicating a respective set of attribute values; and
   determine, based on the predictor index, the predictor in the predictor list, wherein the predictor indicates the predicted attribute values.

20. The device of claim 14, wherein the threshold is a lifting adaptive prediction threshold, and the one or more processors are further configured to determine, based on a first syntax element indicating that a maximum number of direct predictors is greater than 0, that a bitstream includes a lifting adaptive prediction threshold syntax element that indicates the lifting adaptive prediction threshold.

21. The device of claim 14, further comprising a display to present imagery based on the point cloud data.

22. A device for encoding a point cloud, the device comprising:
   a memory to store point cloud data representing the point cloud; and
   one or more processors coupled to the memory and implemented in circuitry, the one or more processors configured to:
      based on a maximum difference value being less than a threshold, determine a predictor index for a current point of the point cloud that indicates a predictor in a predictor list, wherein predictors in the predictor list are based on attribute values of one or more neighbor points;
      generate a first jointly coded value based on (i) a first residual value for attribute values of the current point and (ii) the predictor index;
      generate a second jointly coded value based on (i) a second residual value for the attribute values of the current point and (ii) the predictor index; and
      signal the first and second jointly coded values.

23. The device of claim 22, wherein, based on a quantity of predictors in the predictor list being equal to 4, the one or more processors are configured to;
as part of generating the first jointly coded value, determine:

$$res1'=\text{sign}(res1)*(|res1|<<1+\text{sigIndex}>>1)$$

as part of generating the second jointly coded value, determine:

$$res2'=\text{sign}(res2)*(|res2|*<<1+\text{sigIndex}\&1)$$

where res1' is the first jointly coded value, res2' is the second jointly coded value, res1 is the first residual value, res2 is the second residual value, and sigIndex is the predictor index.

24. The device of claim 22, wherein, based on a quantity of predictors in the predictor list being equal to 3, the one or more processors are configured to;
as part of generating the first jointly coded value, determine:

$$res1'=\text{sign}(res1)*(|res1|<<1+(\text{sigIndex}>0))$$

as part of generating the second jointly coded value, determine:

$$res2'=(\text{sigIndex}>0)?\text{sign}(res2)*(|res2|<<1+(\text{sigIndex}-1)):res2$$

where res1' is the first jointly coded value in the set of jointly coded values, res2' is the second jointly coded value in the set of jointly coded values, res1 is the first residual value in the set of residual values, res2 is the second residual value in the set of residual values, and sigIndex is the predictor index.

25. The device of claim 22, wherein, based on a quantity of predictors in the predictor list being equal to 2;
as part of generating the first jointly coded value, determine:

$$res1'=\text{sign}(res1)*(|res1|<<1+(\text{sigIndex}\&1))$$

as part of generating the second jointly coded value, determine:

$$res2'=res2$$

where res1' is the first jointly coded value, res2' is the second jointly coded value, res1 is the first residual value, res2 is the second residual value, and sigIndex is the predictor index.

26. The device of claim 22, wherein the one or more processors are further configured to:
determine the predictor in the predictor list, wherein each predictor in the predictor list indicates a respective set of attribute values, wherein the predictor indicates predicted attribute values for the current point; and
signal a syntax element that indicates whether the list of predictors includes a default predictor.

27. The device of claim 22, wherein the threshold is a lifting adaptive prediction threshold, and the one or more processors are further configured to, based on a maximum number of direct predictors being greater than 0, signal, in a bitstream, a lifting adaptive prediction threshold syntax element that indicates the lifting adaptive prediction threshold.

28. The device of claim 22, further comprising a device to generate the point cloud data.

29. A device for decoding a point cloud, the device comprising:
means for, based on a comparison of a maximum difference value and a threshold;
reconstructing, based on a first jointly coded value, a first residual value of a current point of the point cloud;
reconstructing, based on a second jointly coded value, a second residual value of the current point; and
determining a predictor index based on the first and second jointly coded values, wherein the predictor index indicates a predictor in a predictor list, wherein predictors in the predictor list are based on attribute values of one or more neighbor points;
means for determining predicted attribute values based on the predictor index; and
means for reconstructing attribute values of the current point based on the first and second residual values and the predicted attribute values.

30. A device for encoding a point cloud, the device comprising:
means for determining, based on a maximum difference value being less than a threshold, a predictor index for a current point of the point cloud that indicates a predictor in a predictor list, wherein predictors in the predictor list are based on attribute values of one or more neighbor points;
means for generating a first jointly coded value based on (i) a first residual value for attribute values of the current point and (ii) the predictor index;
means for generating a second jointly coded value based on (i) a second residual value for the attribute values of the current point and (ii) the predictor index; and
means for signaling the first and second jointly coded values.

31. A non-transitory computer-readable storage medium having stored thereon instructions that, when executed, cause one or more processors to:
based on a comparison of a maximum difference value and a threshold;
reconstruct, based on a first jointly coded value, a first residual value of a current point of a point cloud;
reconstruct, based on a second jointly coded value, a second residual value of the current point; and
determine a predictor index based on the first and second jointly coded values, wherein the predictor index indicates a predictor in a predictor list, wherein predictors in the predictor list are based on attribute values of one or more neighbor points;
determine predicted attribute values based on the predictor index; and
reconstruct attribute values of the current point based on the first and second residual values and the predicted attribute values.

32. A non-transitory computer-readable storage medium having stored thereon instructions that, when executed, cause one or more processors to:
based on a maximum difference value being less than a threshold, determine a predictor index for a current point of a point cloud that indicates a predictor in a predictor list, wherein predictors in the predictor list are based on attribute values of one or more neighbor points;
generate a first jointly coded value based on (i) a first residual value for attribute values of the current point and (ii) the predictor index;

generate a second jointly coded value based on (i) a
  second residual value for the attribute values of the
  current point and (ii) the predictor index; and
signal the first and second jointly coded values.

\* \* \* \* \*